US010987616B2

(12) United States Patent
Thrasher et al.

(10) Patent No.: US 10,987,616 B2
(45) Date of Patent: *Apr. 27, 2021

(54) TUMBLER SYSTEMS AND METHODS

(71) Applicant: GALA INDUSTRIES, INC., Eagle Rock, VA (US)

(72) Inventors: Richard Thrasher, Troutville, VA (US); Duane Boothe, Clifton Forge, VA (US); Kerry P. Morris, Troutville, VA (US); David Bryan, Buchanan, VA (US); George N. Benoit, Clifton Forge, VA (US)

(73) Assignee: Gala Industies, Inc., Eagle Rock, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,974

(22) Filed: Jun. 18, 2019

(65) Prior Publication Data
US 2019/0299131 A1 Oct. 3, 2019

Related U.S. Application Data

(63) Continuation of application No. 15/728,033, filed on Oct. 9, 2017, now Pat. No. 10,363,499, which is a (Continued)

(51) Int. Cl.
*B01D 33/11* (2006.01)
*F26B 11/02* (2006.01)
(Continued)

(52) U.S. Cl.
CPC ............ *B01D 33/11* (2013.01); *B01D 33/067* (2013.01); *B01D 33/663* (2013.01); *B01D 33/76* (2013.01);
(Continued)

(58) Field of Classification Search
CPC .... B01D 33/11; B01D 33/067; B01D 33/663; B01D 33/71; F26B 11/024; F26B 11/026; F26B 11/04
(Continued)

(56) References Cited

U.S. PATENT DOCUMENTS 484,821 A 10/1892 Rappleye
2,127,137 A 8/1938 Price
(Continued)

FOREIGN PATENT DOCUMENTS

CN 1516613 A 7/2004
CN 200949997 Y 9/2007
(Continued)

OTHER PUBLICATIONS

Crown Rotary Dryers, <http://www.cdli.com/rotary_dryers>; accessed Feb. 12, 2016.
(Continued)

*Primary Examiner* — Stephen M Gravini
(74) *Attorney, Agent, or Firm* — Troutman Pepper Hamilton Sanders LLP

(57) ABSTRACT

A tumbler may be used as defluidizer, dryer, coater, classifier, or dynamic filter. The tumbler includes a rotatable drum that receives a solid/fluid slurry through an inlet chute. As the slurry travels through the drum, fluid exits the drum through a plurality of apertures in screens attached to the sides of the drum, while the solids continue along the drum's length until they reach one or more openings and exit the drum into an outlet chute. The outlet chute includes ridges that wrap around rings extending from the openings of the drum to prevent solids from escaping the outlet chute. To further dry the solids before they exit the drum, an air tube at least partially disposed within the drum is configured to introduce a flow of air into the drum.

24 Claims, 33 Drawing Sheets

Related U.S. Application Data continuation of application No. 15/060,740, filed on Mar. 4, 2016, now Pat. No. 9,782,705.

(60) Provisional application No. 62/257,446, filed on Nov. 19, 2015, provisional application No. 62/128,737, filed on Mar. 5, 2015.

(51) Int. Cl.
*F26B 11/04* (2006.01)
*B01D 33/067* (2006.01)
*B01D 33/66* (2006.01)
*B01D 33/76* (2006.01)

(52) U.S. Cl.
CPC .......... *F26B 11/024* (2013.01); *F26B 11/026* (2013.01); *F26B 11/04* (2013.01)

(58) Field of Classification Search
USPC .......................................................... 34/166
See application file for complete search history.

(56) References Cited

U.S. PATENT DOCUMENTS

| | | |
|---|---|---|
| 2,213,056 A | 8/1940 | Skoog et al. |
| 2,304,382 A | 12/1942 | Shoeld |
| 2,359,322 A | 10/1944 | Lupo |
| 2,674,522 A | 4/1954 | Takewell et al. |
| 2,709,833 A | 6/1955 | Wiklund |
| 2,728,940 A | 1/1956 | Yesberger |
| 2,745,193 A | 5/1956 | Ladd |
| 2,803,038 A | 8/1957 | Holland et al. |
| 2,938,230 A | 5/1960 | Sainty |
| 3,039,165 A | 6/1962 | Old |
| 3,101,040 A | 8/1963 | Lanz |
| 3,126,577 A | 3/1964 | Loewen |
| 3,285,223 A | 11/1966 | Sahlan |
| 3,502,304 A | 3/1970 | Pfrengle |
| 3,713,633 A | 1/1973 | Burnett et al. |
| 3,740,861 A | 6/1973 | Myers |
| 3,771,971 A | 11/1973 | Capes et al. |
| 3,834,850 A | 9/1974 | Odom et al. |
| 3,941,536 A | 3/1976 | Akerlow |
| 3,942,930 A | 3/1976 | Whitehead |
| 3,981,659 A | 9/1976 | Myers |
| 4,046,496 A | 9/1977 | Gorin et al. |
| 4,050,869 A | 9/1977 | Takewell et al. |
| 4,065,240 A | 12/1977 | Cole |
| 4,082,489 A | 4/1978 | Kent |
| 4,083,669 A | 4/1978 | Cole |
| 4,113,413 A | 9/1978 | Pietrusza et al. |
| 4,212,615 A | 7/1980 | Bennethum |
| 4,272,234 A | 6/1981 | Tse |
| 4,363,285 A | 12/1982 | Yoshida et al. |
| 4,455,762 A | 6/1984 | Saeman |
| 4,476,019 A | 10/1984 | Nowisch et al. |
| 4,507,335 A | 3/1985 | Mathur |
| 4,535,550 A | 8/1985 | Walter |
| 4,563,315 A | 1/1986 | Walter et al. |
| 4,639,383 A | 1/1987 | Casey |
| 4,692,248 A | 9/1987 | Stannard et al. |
| 4,785,759 A | 11/1988 | Motoyama et al. |
| 4,810,270 A | 3/1989 | Terry et al. |
| 4,909,181 A | 3/1990 | Smith |
| 4,916,831 A | 4/1990 | Yasumura et al. |
| 4,918,660 A | 4/1990 | Perrot |
| 5,033,405 A | 7/1991 | Yamada et al. |
| H980 H | 11/1991 | Harrison |
| 5,182,119 A | 1/1993 | Edens |
| 5,238,494 A | 8/1993 | Dunajtschik |
| 5,265,347 A | 11/1993 | Woodson et al. |
| 5,437,374 A | 8/1995 | Bills et al. |
| 5,514,030 A | 5/1996 | Suhner et al. |
| 5,531,826 A | 7/1996 | Fusejima et al. |
| 5,628,913 A | 5/1997 | Modig et al. |
| 5,638,606 A | 6/1997 | Bryan et al. |
| 5,733,450 A | 3/1998 | Langner et al. |
| 5,945,134 A | 8/1999 | Strait et al. |
| 6,138,375 A | 10/2000 | Humphries, II et al. |
| 6,142,095 A | 11/2000 | Long et al. |
| 6,659,756 B2 | 12/2003 | Strait et al. |
| 6,739,457 B2 | 5/2004 | Humphries, II et al. |
| 6,770,298 B1 | 8/2004 | Debregeas et al. |
| 6,783,975 B2 | 8/2004 | Windle |
| 7,024,794 B1 | 4/2006 | Mynes |
| 7,171,762 B2 | 2/2007 | Roberts et al. |
| 7,421,802 B2 | 9/2008 | Roberts et al. |
| 7,614,359 B2 | 11/2009 | Hasegawa et al. |
| 8,037,618 B2 | 10/2011 | Hehenberger et al. |
| 8,171,601 B1 | 5/2012 | Yurkon |
| 8,220,177 B2 | 7/2012 | Bryan |
| 8,601,711 B2 | 12/2013 | Kim |
| 8,714,467 B2 | 5/2014 | Lucas et al. |
| 9,032,641 B2 | 7/2015 | Eloo et al. |
| 9,782,705 B2 * | 10/2017 | Thrasher ............... F26B 11/024 |
| 10,363,499 B2 * | 7/2019 | Thrasher ............... F26B 11/026 |
| 2004/0130964 A1 | 7/2004 | Didion |
| 2007/0074998 A1 | 4/2007 | Langner |
| 2008/0193632 A1 | 8/2008 | O'Hara et al. |
| 2013/0043179 A1 | 2/2013 | Bugg |
| 2014/0137797 A1 | 5/2014 | Hasegawa et al. |
| 2014/0231560 A1 | 8/2014 | Lucas et al. |
| 2018/0028948 A1 | 2/2018 | Thrasher et al. |
| 2019/0299131 A1 * | 10/2019 | Thrasher ................ B01D 33/11 |

FOREIGN PATENT DOCUMENTS

| | | | |
|---|---|---|---|
| CN | 201625629 U | 11/2010 | |
| CN | 102120160 A | 7/2011 | |
| CN | 104275123 A | 1/2015 | |
| EP | 3265217 B1 * | 4/2020 | ............. B01D 33/11 |
| EP | 3632529 A1 * | 4/2020 | ........... B01D 33/067 |
| GB | 286855 A | 3/1928 | |
| GB | 812265 A | 4/1959 | |
| GB | 976004 A | 11/1964 | |
| JP | 2000297987 A | 10/2000 | |
| JP | 2014021144 A | 2/2014 | |
| WO | 01/76720 A1 | 10/2001 | |
| WO | 2013035800 A1 | 3/2013 | |
| WO | WO-2016141278 A1 * | 9/2016 | ............ F26B 11/026 |

OTHER PUBLICATIONS

PCT International Search Report and Written Opinion dated May 20, 2016 for related PCT Patent Application No. PCT/US16/20856, 12 pages.

Extended European Search Report for European Patent Application No. 16759565.1 dated Oct. 1, 2018 (9 pages).

* cited by examiner

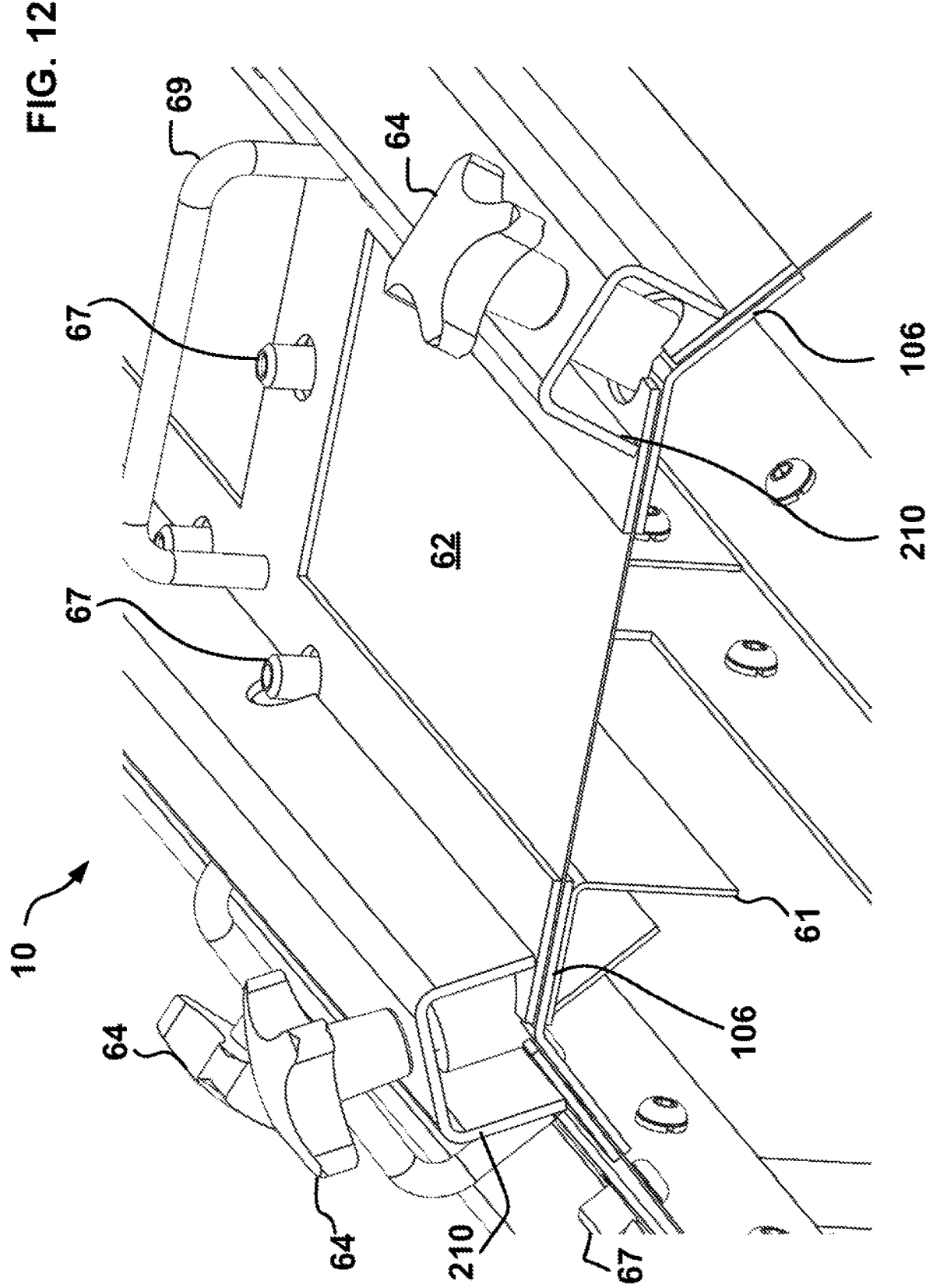

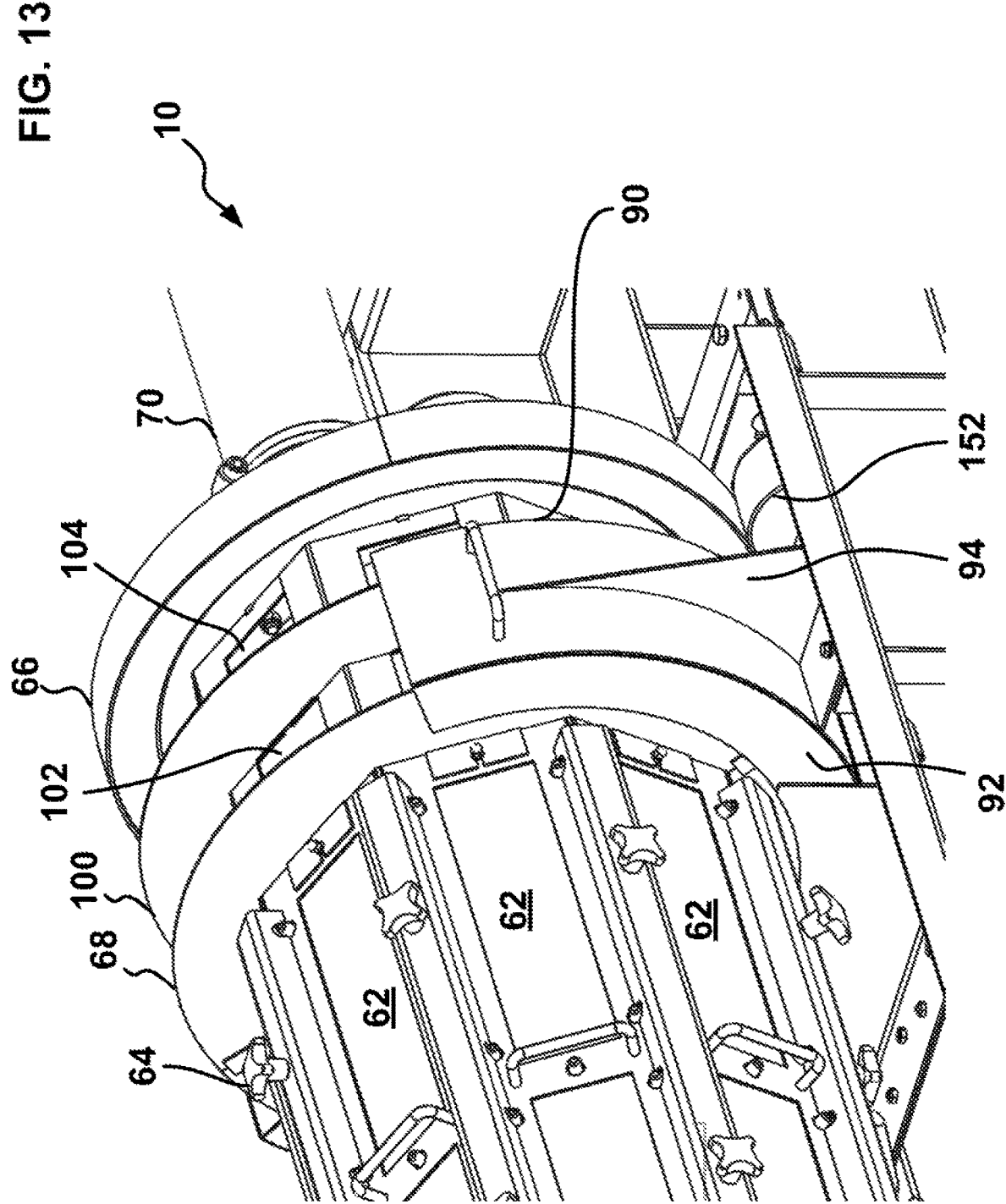

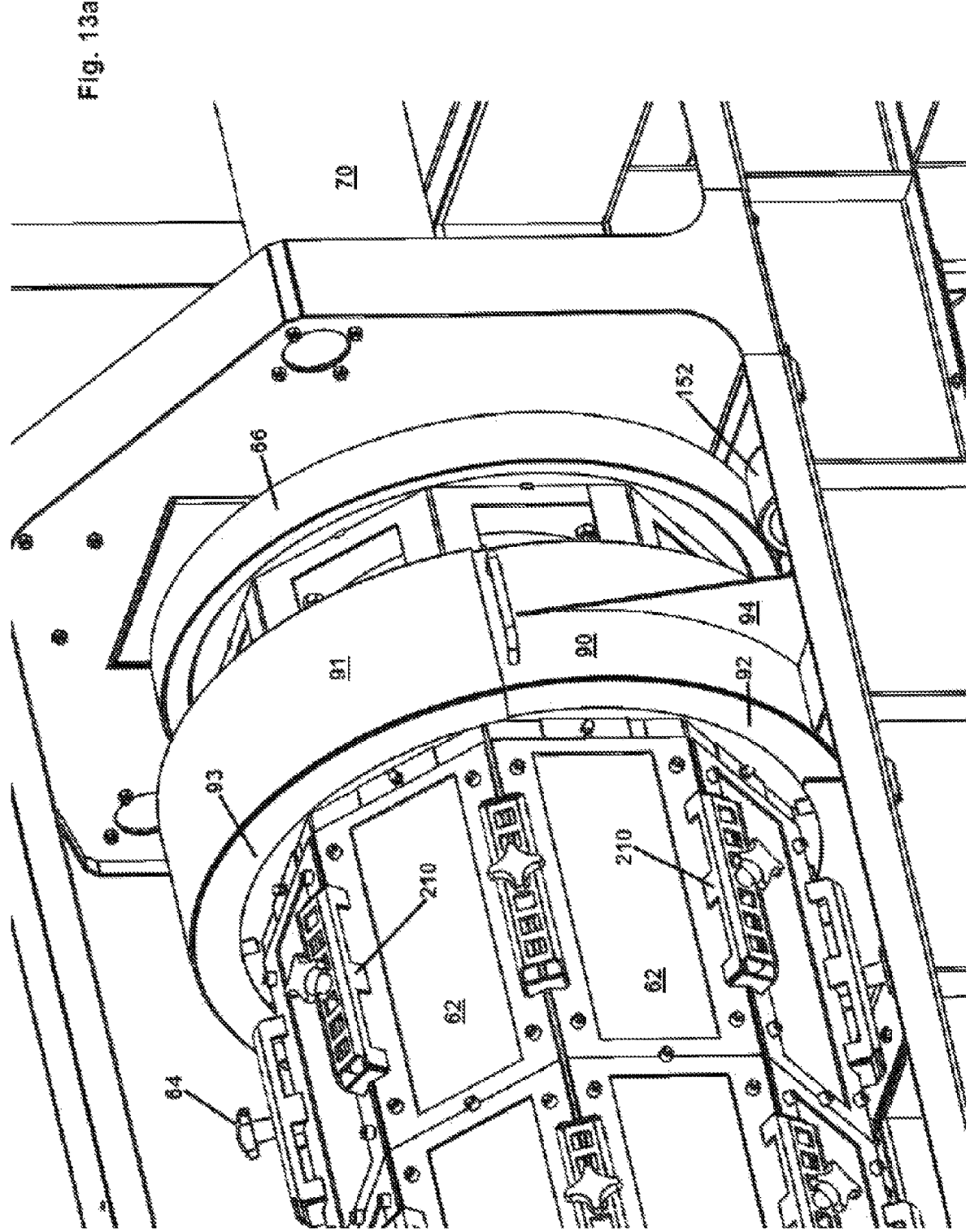

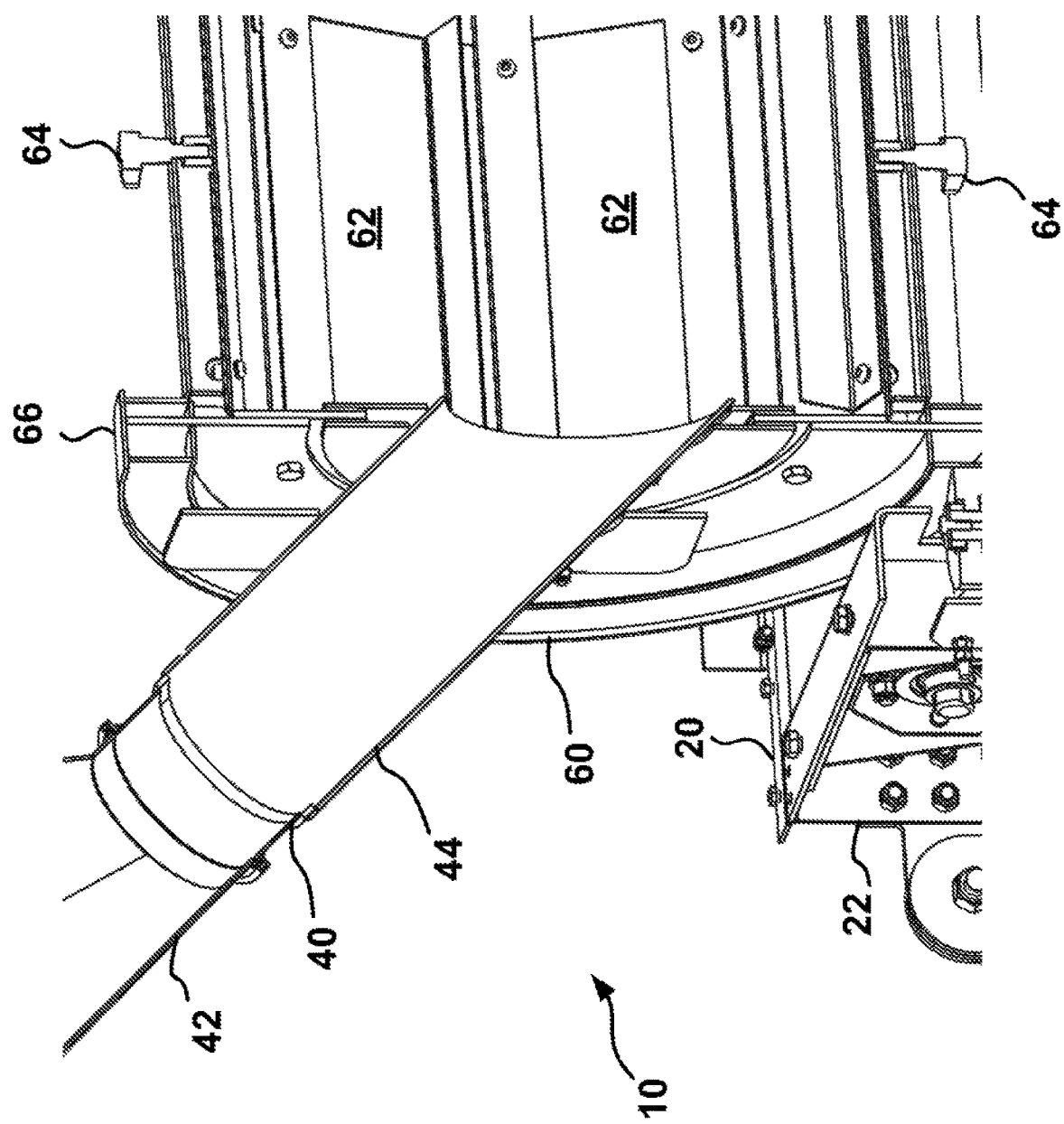

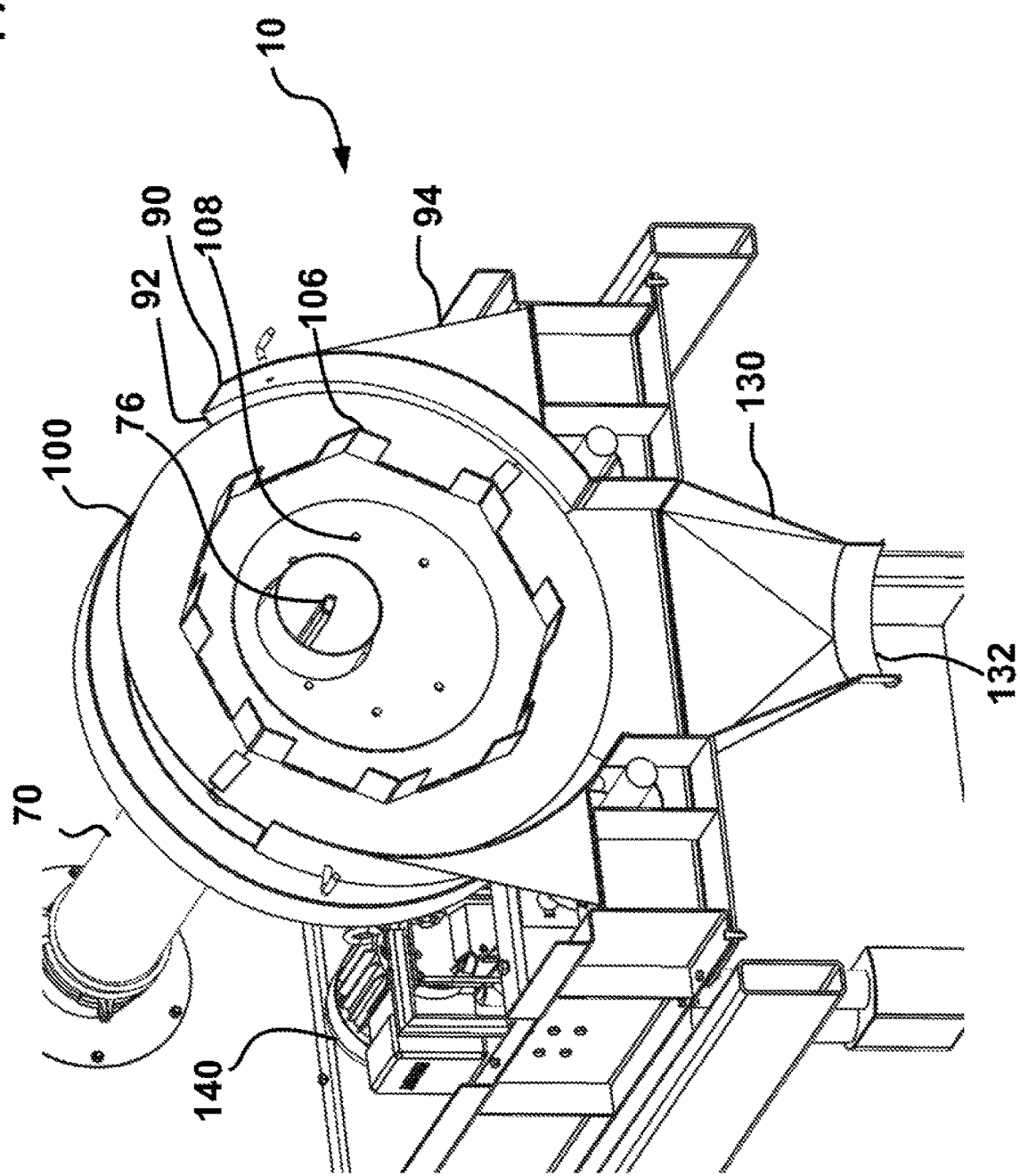

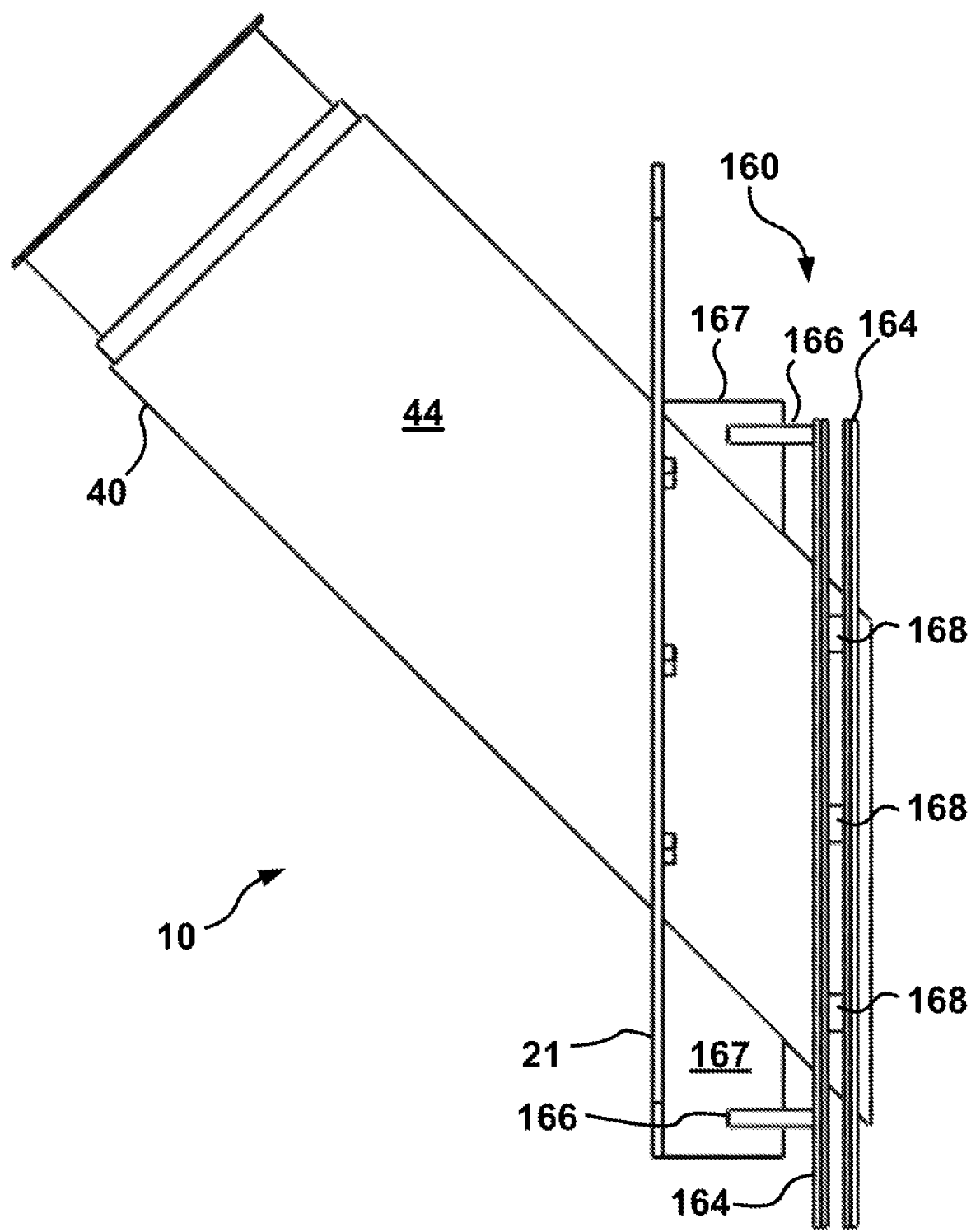

TUMBLER SYSTEMS AND METHODS

CROSS-REFERENCE TO RELATED APPLICATIONS

This application is a continuation of U.S. patent application Ser. No. 15/728,033, filed Oct. 9, 2017, now allowed, entitled, "TUMBLER SYSTEMS AND METHODS," which is a continuation of U.S. patent application Ser. No. 15/060,740, filed Mar. 4, 2016, now U.S. Pat. No. 9,782,705, entitled, "TUMBLER SYSTEMS AND METHODS," which claims the benefit, under 35 U.S.C. § 119(e), of U.S. Provisional Patent Application No. 62/257,446, filed Nov. 19, 2015, entitled "TUMBLER SYSTEMS AND METHODS," and U.S. Provisional Patent Application No. 62/128,737, filed Mar. 5, 2015, entitled "TUMBLER SYSTEMS AND METHODS," all of which are fully incorporated by reference.

FIELD OF THE INVENTION

The presently disclosed subject matter relates generally to systems and methods for a tumbler, particularly systems and methods for using a tumbler as a defluidizer, dryer, coater, classifier, dynamic filter, washer, or finishing machine.

BACKGROUND

Rotating screening devices are commonly used for separating solids from a fluid (i.e., defluidizing), drying solids, and applying powder coating(s) to the solids for pelletized polymers and/or tacky materials, sewage treatment, food processing, and the like. For example, a screening device may be used in lieu of a centrifugal dryer, which may be too rough on brittle materials, to remove the bulk of the fluid (e.g., water) from pellets (e.g., pelletized polymers and/or tacky materials) prior to additional drying, coating, and/or bagging. Alternatively, a screening device can be used downstream of another dryer to further dry the pellets or to coat the dried pellets with a powder that may help dry the pellets or prevent them from adhering to one another or to equipment during bagging.

Conventional screening devices typically include a hollow screening cylinder rotatably mounted on supporting rollers at a horizontal axis. A slurry of pellets and fluid is directed into an inlet end of the cylinder and flows through the cylinder as it rotates. Openings in the screen allow the fluid in the slurry to escape under the force of gravity, but retain and direct the pellets out of the cylinder at an outlet end. A dish placed under the outlet end catches the pellets as they exit the cylinder. In some designs, a housing surrounds the cylinder to shield the immediate area from undesired spray or exposure and to prevent contamination within the cylinder.

While helpful in defluidizing, drying, or coating pellets, these conventional screening cylinders may have several limitations. For instance, they may not effectively and adequately dry the pellets, and the remaining moisture may negatively alter the pellets' properties or result in misshaped pellets. Additionally, conventional screening cylinders may not efficiently dry the pellets, thereby requiring increased residence times or the use of multiple cylinders, and thus, delaying the drying and bagging process. The housing, while helpful in shielding sprays and preventing contamination, may make it difficult for an operator to observe activity within the cylinder and easily access the cylinder for maintenance or repairs. Further, as the screen(s) typically extend the entire length of the cylinder, conventional cylinders may not allow for classification of pellets based on size or shape, and may require additional expense for maintenance or repairs.

Accordingly, there is a need for improved systems and methods to address the above-mentioned deficiencies. Embodiments of the present disclosure are directed to these and other considerations.

SUMMARY

Briefly described, embodiments of the presently disclosed subject matter relate to a systems and methods for using tumbler. Specifically, the tumbler may be used as a defluidizer, dryer, coater, classifier, or dynamic filter in various embodiments. The tumbler may include a rotatable drum having an inlet end, an outlet end opposite the inlet end, a plurality of lateral frame members extending from the inlet end to the outlet end and defining a plurality of sides, and one or more outwardly extending annular rings. The sides defined by the plurality of lateral frame members may each house one or more removable screens each having a plurality of apertures to permit fluid (or small particles or fines) to escape the drum. As fluid exits the drum, it may be collected in a fluid pan underneath the drum and directed to a fluid outlet. One or more of the sides may have a non-screened opening (e.g., portions without a screen) proximate the outlet end of the drum, which allow pellets to exit the drum from its side(s). In this manner, pellets may travel along the length of the drum before exiting the sides of the drum though the openings, and then enter a pellet outlet chute. The one or more outwardly extending annular rings may border a side of the non-screened opening of the one or more sides proximate the outlet end of the drum. To prevent pellets from escaping during the exchange between the drum and a pellet outlet chute, which receives a flow of conditional materials exiting the drum, the pellet outlet chute may have ridges that extend towards the drum and overlap with rings extending outwardly from the edges of the openings on the drum. Opposite the pellet outlet chute, a slurry inlet chute may be connected to an inlet end of the drum and configured to direct a flow of pellets into the drum.

In some embodiments, to further dry the pellets as they pass through the drum, a fluid tube (e.g., an air tube) may be disposed within the drum. The air tube may introduce a flow of air from inside the drum through the screens to an air outlet duct located outside of the drum. The air tube may be removable, and configured to slidably enter the outlet end of the drum opposite the slurry inlet chute. The air tube may be attachable to the drum at a variety of angles and positions, allowing the outgoing air flow introduced from within the drum to be manipulated as desired. To introduce the flow of air within the drum, the air tube may have one or more holes, slots, or openings positioned along a length of the tube. In one embodiment, holes may be arranged into two lines each about 45° away from a central length axis proximate the bottom of the air tube and extending along at least a portion of a length of the air tube (e.g., extending along the portion of the air tube that is inserted into the drum). The air tube may be inserted approximately two thirds of the length of the drum to effect optimum conditioning of the pellets. In other embodiments, a single row of holes may extend proximate a central length axis along the bottom of at least a portion of a length of the air tube (e.g., extending along the portion of the air tube that is inserted into the drum). The air tube may be inserted into the entire length of the drum, or to any extent deemed optimum for the materials to be conditioned. In some embodiments, the air tube may be about six inches in diameter and have a constant diameter along its length.

To help an operator see the flow of pellets within the drum, one or more lights may be placed within the tumbler to illuminate the drum. In some embodiments, the lights may be disposed in or housed on the air tube. In other embodiments, the lights may attach onto the outside of the screens. In further embodiments, the lights may attach onto the housing at the inlet and/or outlet ends of the drum.

The drum may vary in shape. For example, in one embodiment, the drum may be octagonal and have at least one screen on each of its eight sides. Further, the drum may include several screens positioned in series on each side. By including several smaller screens, the screens of the octagonal drum may be easier and less expensive to repair and replace. In other embodiments, the drum may be cylindrical or polygonal (e.g., rectangular, pentagonal, hexagonal, heptagonal, nonagonal, etc.). Further, the drum may vary in size and/or shape along its length. For example, in one embodiment, the drum may be cylindrical in a powdering/coating section at the inlet end and transition to being octagonal in a drying section at the outlet end. The cylindrical powdering/coating section may allow for more uniform flow of powders or coating materials with the pellets, helping the materials adhere to the pellets, before subjecting the pellets to harsher movement experienced in the octagonal drying section. Varying the size and/or shape of the drum may also advantageously allow an operator to control the pellet flow through the drum (e.g., controlling residence time in the drum and/or in each section). Regardless of the shape of the drum, drum wheels at the inlet and outlet ends of the drum may be round, allowing the drum to roll true as it rotates on the rollers.

The screens may attach onto the drum in different ways. In some embodiments, the frame of the drum may be configured to receive an L or T-shaped clamp for attaching the screens. The clamp may be screwed or snapped into place in some embodiments. Once the clamp is in place, an edge of a screen may slide under the clamp and an opposing edge of the screen may be held in place by a connector (e.g., a screw, bolt, or snap-fit connector). In this manner, the screens may be quickly attached and unattached to the drum. Alternatively, in other embodiments, the screens may attach to the drum via screws, bolts, or other connectors.

In some embodiments, one or more doors may fit over the housing and be configured to cover the tumbler. For example, in some embodiments, one or more drum doors may cover a drum portion of the tumbler, allowing an operator to access and service the drum. The drum doors may include windows to allow the operator to see the flow of pellets within the drum. In other embodiments, one or more service doors may cover a motor and air intake portions of the tumbler, allowing an operator to access and service the motor and air intake. In certain embodiments, the drum doors and the service doors may open and close independently.

The housing of the tumbler may be supported by a frame that holds the tumbler off of a ground surface. In some embodiments, the frame may include a tilt mechanism configured to adjust the angle of the drum within the tumbler relative to the frame. The tilt mechanism may be positioned at one end of the tumbler (e.g., the inlet or outlet end), while a connector pivotally connects the frame to the housing on the opposing end of the tumbler. By changing the tilt of the drum, which may be indicated by a tilt angle indicator in communication with the tilt mechanism, an operator may change the residence time of pellets flowing through the drum.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

FIG. 12 provides an isometric view of a screen attached to a drum in accordance with some embodiments of the present disclosure.

FIG. 13 is an isometric view of pellet outlet portion of a tumbler in accordance with some embodiments of the present disclosure.

FIG. 13a is an isometric view of pellet outlet portion of a tumbler in accordance with other embodiments of the present disclosure.

FIG. 15 is an isometric view of a slurry inlet portion of a tumbler in accordance with some embodiments of the present disclosure.

FIG. 16 provides a cutaway isometric cross-sectional view of an end plate of a tumbler having its housing and doors removed in accordance with some embodiments of the present disclosure.

FIG. 23 is a side view of a seal box around a pellet inlet chute of a tumbler in accordance with some embodiments of the present disclosure.

DETAILED DESCRIPTION

Figure 1:
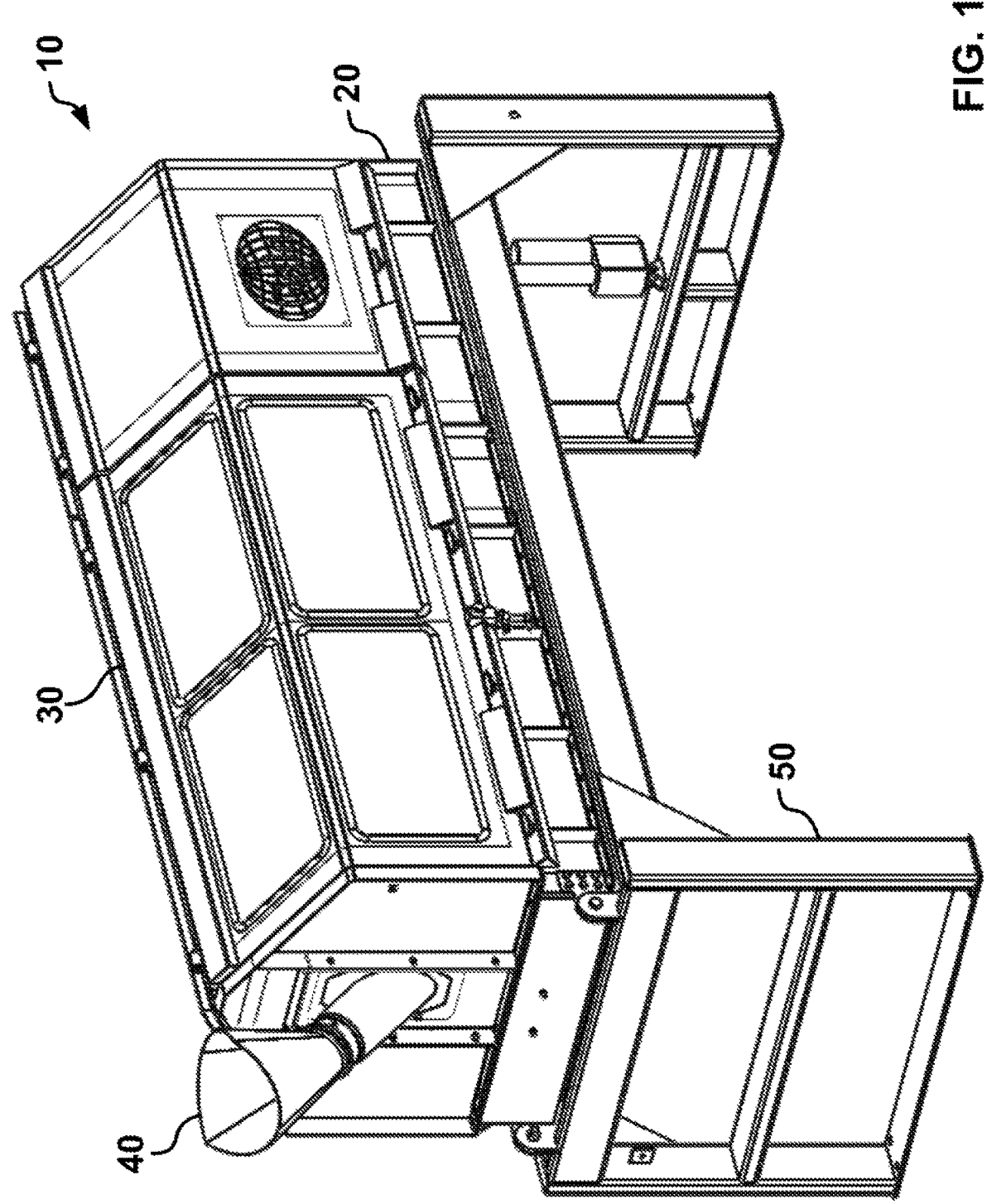
FIG. 1 is an isometric front view of a tumbler having closed doors in accordance with some embodiments of the present disclosure.

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

The term "pellet" used herein, for example, can include, and be interchangeable with, micropellets or particulates. Such pellets/micropellets/particulates can take on a variety of shapes, and are typified by regular or irregular shaped discrete particles without limitation to their dimensions, including flakes, stars, spheres, cylindrical pellets, lenticular or disc-shaped pellets, chopped fibers, rubber crumb pellets, and/or other shapes. They can also be round, square, rectangular, triangular, pentagonal, hexagonal or otherwise geometric in cross-section, star-shaped or other decorative designs, and can be the same or different when viewed in a second cross-section perpendicularly to the first. It shall also be understood that the pellets do not have to be solid pieces, but may include particles defining openings or hollow shapes. Additionally, the pellets may include expanding agents, foaming agents, or volatiles, which may be partially or wholly expanded to produce low (or lower) bulk density particles.

The pellets can comprise many materials including, but not limited to, polyethylene materials such as linear low density polyethylene (LLDPE), low density polyethylene (LDPE), medium density polyethylene (MDPE), and high density polyethylene (HDPE), polypropylenes, polyesters, polyamides, styrenic materials such as PS, ABS, and SAN, thermoplastic elastomers such as TPU, EPDM, and TPO, polycarbonates, PMMA, EVA, vinyls, plasticized and non-plasticized PVC, polyolefins, adhesives, asphalts and/or bitumen. In addition, these materials can cover a range of molecular weights, crystallinity, hardness, etc., which are in the solid phase upon entering and exiting the dryer and irrespective of color, additives, fillers, clarity, and/or degree of transparency or opaqueness.

The term "fluid" can comprise many fluids including, but not limited to, water and water with one or more additives, other liquids, and/or gases including but not limited to those disclosed, described, and/or claimed in U.S. Pat. Nos. 7,157,032, 8,361,364, 8,366,428, 8,007,701, and 8,011,912, and U.S. Pat. Pub. No. 2012/0228794, all of which are hereby incorporated by reference.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required. The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

To facilitate an understanding of the principles and features of the invention, various illustrative embodiments are explained below. In particular, the presently disclosed subject matter is described in the context of being a tumbler.

In some embodiments, a conditioning unit for conditioning materials (e.g. pellets) may include a housing having a plurality of rollers. The conditioning unit may also include a removable screened drum having a circular inlet drum wheel proximate an inlet end of the drum, a circular outlet drum wheel proximate an outlet end of the drum, and a plurality of lateral frame members extending from the inlet drum wheel to the outlet drum wheel and defining a plurality of sides. The inlet and outlet drum wheels may be rotatably supported by the plurality of rollers of the housing. Each of the sides may house one or more removable screens, which may be perforated or non-perforated. In some embodiments, each side may house a plurality of removable screens, which may be easier to handle and assemble and less expensive to replace than a screen that occupies an entire side. One or more of the sides may have a non-screened opening proximate the outlet end of the drum. The conditioning unit may also include an inlet chute in fluid communication with the inlet end of the drum, the inlet chute being configured to direct a flow of materials into the drum. The conditioning unit may also include an inlet faceplate proximate the inlet end of the drum, the inlet faceplate being configured to support the inlet chute and to prevent the flow of materials from exiting the inlet end of the housing. Further, the conditioning unit may have an outlet faceplate proximate the outlet end of the drum, the outlet faceplate being configured to prevent the flow of conditioned materials from exiting the outlet end of the housing. In communication with the non-screened opening of the one or more sides proximate the outlet end of the drum, an outlet chute of the conditioning unit may be configured to collect the flow of conditioned materials exiting the drum. The conditioning unit may further include a removable fluid tube slidably insertable into the drum through the outlet faceplate such that at least a portion of the fluid tube parallels a central length axis of the drum, the fluid tube being configured to introduce a flow of fluid (e.g., air) into the drum.

The conditioning unit may include one or more screen connectors directly attachable to a first lateral frame member of the lateral frame members. The one or more screen connectors may each have a bottom surface configured to, in cooperation with a top surface of the first lateral frame member, slidably receive and hold in place at least one edge of the one or more screens. Further, at least one of the one or more screens may be readily attachable and detachable to the drum.

The inlet chute may include at least one curved portion and house one or more defluidizing screens disposed within the inlet chute proximate the at least one curved portion.

The drum may have one or more outwardly extending annular rings each bordering a side of the non-screened opening of the one or more sides proximate the outlet end of the drum. The outlet chute may have one or more ridges configured to at least partially overlap with the one or more rings of the drum to contain the flow of conditioned materials exiting the drum within the outlet chute.

The inlet faceplate may include a first floating seal formed between the inlet chute and the inlet end of the drum. The first floating seal may have one or more dynamic inner walls and one or more static outer walls, wherein the one or more inner walls is connected to, and configured to rotate with, the drum. The outlet faceplate may include a second floating seal formed between the fluid tube and the outlet end of the drum. The second floating seal may have one or more dynamic inner walls and one or more static outer walls, wherein the one or more inner walls is connected to, and configured to rotate with, the drum.

The housing may include one or more doors configured to cover at least a portion of the drum. The one or more doors may be configured to selectively transition from a closed state blocking access to the drum to an open state providing access to the drum.

The fluid tube may include one or more openings along a length of the fluid tube inserted into the drum, and positioned away from a central length axis of the fluid tube.

The conditioning unit may include one or more illumination devices disposed within the housing.

The conditioning unit may also include a frame supporting a base, the base supporting the plurality of rollers. The frame may have a tilt mechanism configured to selectively adjust an angle of the drum within the housing relative to the frame.

In other embodiments, a tumbler for conditioning materials (e.g., pellets) may include a housing having a plurality of rollers. The tumbler may also include a removable screened drum having a circular inlet drum wheel proximate an inlet end of the drum, a circular outlet drum wheel proximate an outlet end of the drum, and a plurality of lateral frame members extending from the inlet drum wheel to the outlet drum wheel and defining a plurality of sides. The inlet and outlet drum wheels may be rotatably supported by the plurality of rollers of the housing. Each of the sides may house one or more readily attachable and detachable screens, which may be perforated or non-perforated. One or more of the sides may have a non-screened opening proximate the outlet end of the drum. The tumbler may also include a first outwardly extending annular ring connected to the drum upstream of the non-screened opening of the one or more sides. Further, the tumbler may include a second outwardly extending annular ring connected to the drum downstream of the non-screened opening of the one or more sides. In fluid communication with the inlet end of the drum, the tumbler may include an inlet chute configured to direct a flow of materials into the drum. The tumbler may also include an outlet chute in fluid communication with the non-screened opening of the one or more sides proximate the outlet end of the drum. The outlet chute may have a first ridge and a second ridge configured to at least partially overlap with the first and second rings of the drum, respectively, to contain the flow of conditioned materials exiting the drum within the outlet chute.

The tumbler may also include one or more screen connectors directly attachable to a first lateral frame member of the lateral frame members. The one or more screen connectors may each have a bottom surface configured to, in cooperation with a top surface of the first lateral frame member, slidably receive and hold in place at least one edge of the one or more screens.

The inlet chute may include at least one curved portion and houses one or more defluidizing screens disposed within the inlet chute proximate the at least one curved portion.

The tumbler may also include a first floating seal formed between the inlet chute and the inlet end of the drum, and a second floating seal formed between the fluid tube and the outlet end of the drum. The first floating seal may have one or more dynamic inner walls and one or more static outer walls, wherein the one or more inner walls is connected to, and configured to rotate with, the drum. The second floating seal may have one or more dynamic inner walls and one or more static outer walls, wherein the one or more inner walls is connected to, and configured to rotate with, the drum.

In further embodiments, a method for conditioning materials in a tumbler may include directing a flow of materials into a removable screened drum of the tumbler. The drum may have an inlet end, an outlet end, and a plurality of lateral frame members extending from the inlet end to the outlet end and defining a plurality of sides. Each of the sides may house one or more removable screens, which may be perforated screens, and one or more of the sides may have a non-screened opening proximate the outlet end of the drum. The method may include rotating the drum containing the flow of materials. The method may include tilting the drum to a predetermined adjustment angle to direct the flow of materials to travel at least a portion of the length of the drum. Further, the method may include conditioning the flow of materials within the rotating drum. Conditioning the flow of materials may include releasing at least a portion of fluid from the flow of materials from the drum through the one or more of screens. The method may include directing a flow of air from a removable air tube at least partially disposed within the drum through the drum (e.g., through one or more of the screens). At least a portion of the air tube may extend in parallel to the length of the drum. The method may include releasing the flow of conditioned materials from the drum via the non-screened opening of the one or more sides.

To prepare the drum for use, the method may also include directly attaching one or more screen connectors to a first lateral frame member of the lateral frame members. The method may include slidably receiving and holding in place at least one edge of the one or more screens via a bottom surface of the one or more screen connectors and a top surface of the first lateral frame member.

The method may also include receiving, in a curved inlet chute of the tumbler, the flow of materials, and defluidizing the flow of materials via one or more defluidizing screens housed in the inlet chute.

The method may also include illuminating at least a portion of the flow of materials within the drum.

In one embodiment, the tumbler may include a rotatable screened drum supported by a plurality of rollers. The drum may receive a flow of pellets and fluid from a slurry inlet chute connected to an inlet end of the drum. As the pellets move along the length of the drum, the fluid may exit the drum through a plurality of apertures in the screens. This exiting fluid may be collected in a fluid pan underneath the drum, and directed to a fluid outlet. The size or shape of the pellets may prevent them from passing through the screens, and instead the pellets may continue to travel within the drum until they reach one or more openings (e.g., portions without a screen) on the drum. Once the pellets reach an opening, they may pass through the opening and into a pellet outlet chute. To prevent pellets from escaping during the exchange between the drum and the pellet outlet chute, ridges may extend from the pellet outlet chute and overlap rings extending from the edges of the openings on the drum.

The tumbler may also include an air tube disposed within the drum to further dry the pellets. In one embodiment, the air tube may extend from the outlet end of the drum, opposite the slurry inlet chute, about two thirds the length of the drum and be about six inches in diameter. In other embodiments, the length and diameter of the air tube may vary. The air tube may introduce a flow of air via a plurality of holes from inside the drum through the screens to an air blower outlet located outside of the drum. The holes may be arranged into two lines each about 45° away from the bottom of the air tube and extending about two thirds the length of the air tube from its distal end. The holes may be arranged differently, however, in other embodiments.

In some embodiments, one or more lights may be placed within the tumbler to illuminate the drum. For example, the lights may be disposed in or housed on the air tube, attach onto the outside of the screens, and/or attach onto the housing at the inlet and outlet ends of the drum. These lights may allow an operator to observe the flow of pellets within the drum and confirm the tumbler is operating as desired.

The screens may attach to the tumbler in a number of ways. In some embodiments, the screens may be configured to slidably attach to the frame by sliding under one or more knobs, which may be screwed or otherwise connected to the frame. After sliding an edge of the screen under a knob, a connector may hold an opposing edge of the screen in place, avoiding the need to fasten several connectors for each individual screen during assembly and disassembly. In other embodiments, other attachment mechanisms (e.g., screws, clamps, bolts, snaps, etc.) may be used to attach the screens to the drum.

To ease access to components within the tumbler, thereby decreasing the cost and difficulty of repairs and replacements, the tumbler may include one or more doors that fit over the housing and cover the tumbler. In one embodiment, one or more drum doors may cover a drum portion of the tumbler, allowing an operator to access the drum. The drum doors may include windows to allow the operator to see the flow of pellets within the drum. In another embodiment, one or more service doors may cover a motor and air intake portions of the tumbler, allowing an operator to access the motor and air intake. In certain embodiments, the drum doors and the service doors may open independently of one another.

A frame may support the housing of the tumbler and hold the tumbler off of a ground surface. In some embodiments, the frame may include a tilt mechanism configured to adjust the angle of the housing and, in turn, the drum. A tilt angle indicator configured to detect and display the drum's angle of tilt may be used in conjunction with the tilt mechanism. By changing the tilt of the drum, an operator may change the residence time of pellets flowing through the drum. Embodiments of the disclosed tumbler will now be described with respect to the figures.

FIG. 1 shows one embodiment of a tumbler 10 having a housing 20, one or more doors 30, a slurry inlet chute 40, and a frame 50. As shown, the doors 30 are closed to contain a slurry of fluid and pellets within the tumbler 10 and to prevent unwanted objects from entering the tumbler 10. In contrast, the doors 30 are opened in FIG. 2 and removed in FIGS. 3 and 4, revealing other components of the tumbler 10 including a rotatable drum 60, an air tube 70, a tilt mechanism 80, a pellet outlet chute 90, and a stop ring 100.

Figure 3:
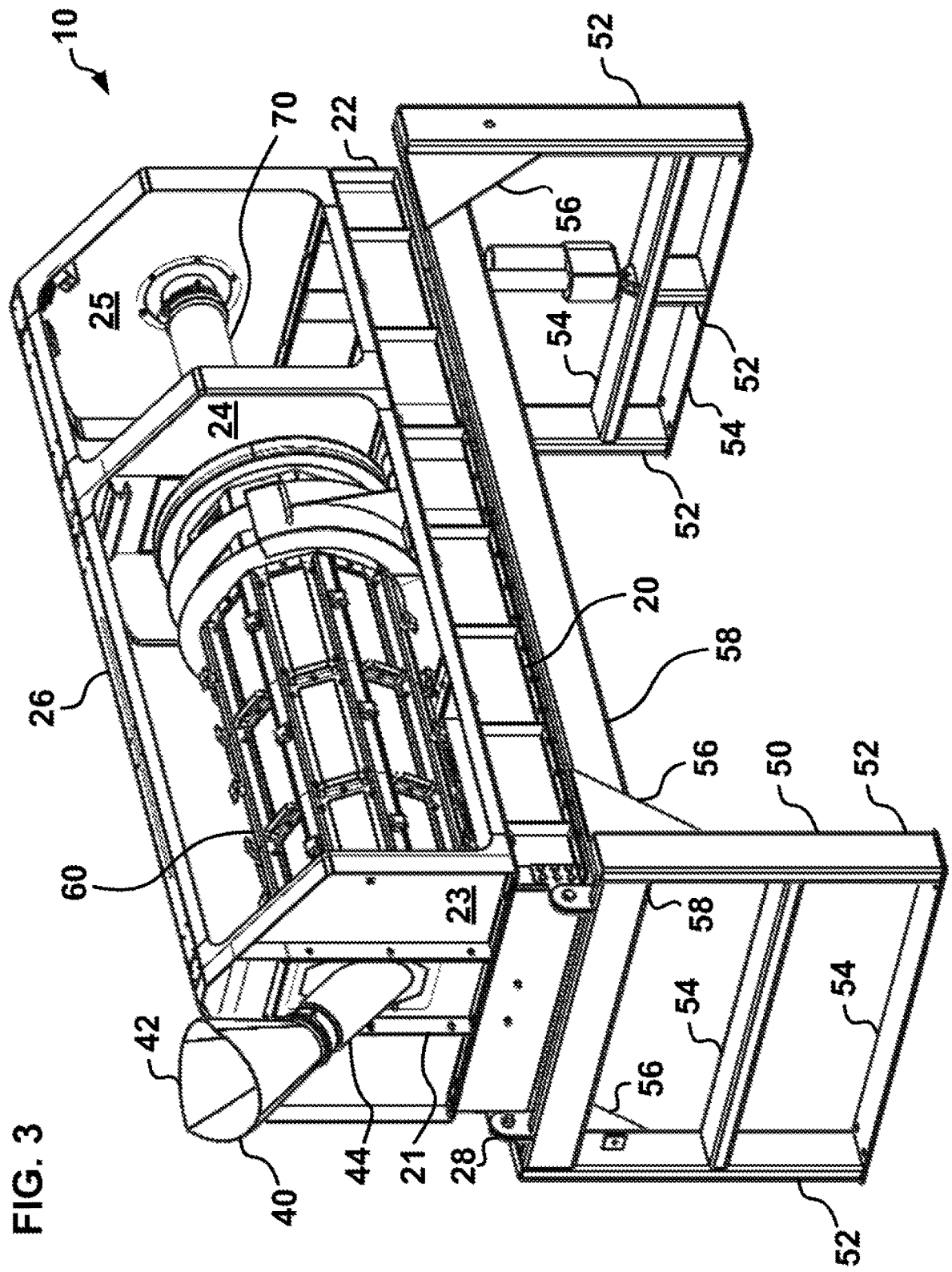
FIG. 3 provides a cutaway isometric front view of a tumbler having its doors removed and a rotatable drum in accordance with some embodiments of the present disclosure.
Figure 4:
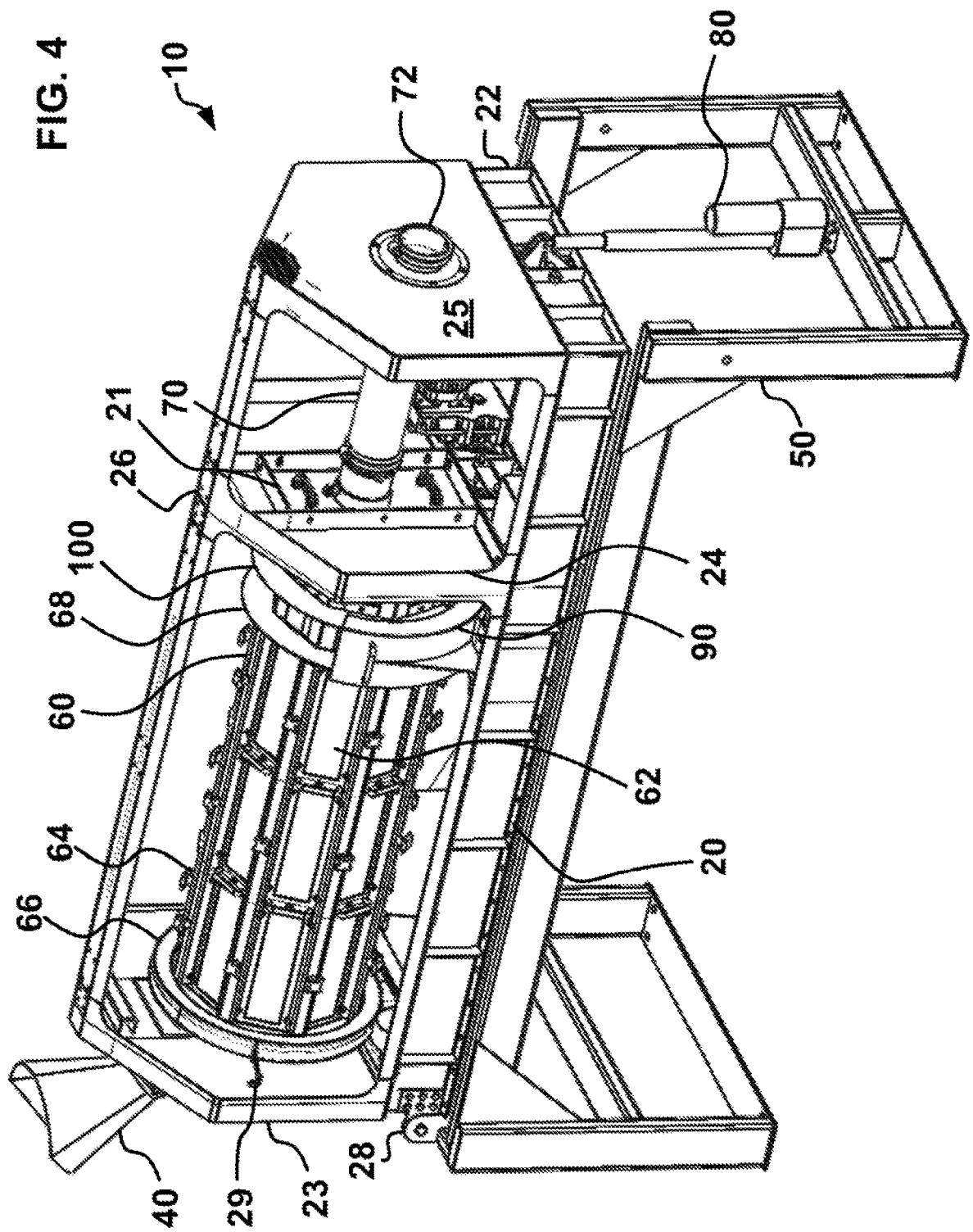
FIG. 4 shows a cutaway isometric rear view of a tumbler having its doors removed and a rotatable drum in accordance with some embodiments of the present disclosure.

Shown in more detail in FIGS. 3 and 4, the housing 20 may be configured to support the doors 30 and the drum 60 of the tumbler 10. In one embodiment, the housing 20 may include a base 22, an inlet faceplate 23, an outlet faceplate 24, a back faceplate 25, an upper member 26, one or more connectors 28, and a static dissipation brush 29. Specifically, the base 22 may serve as a horizontal platform that supports the rest of the housing 20 above the frame 50, while faceplates 23, 24, and 25 extend vertically from the base 22 and are connected to the upper member 26, which extends horizontally along the top surface of the faceplates 23, 24, 25.

The base 22 may be constructed from a metal, wood, or hard plastic, and be configured to withstand the force of the drum's 60 rotation and weight, and support the remainder of the housing 20 and the doors 30. For example, in some embodiments, the base 22 may be a stainless steel, such as 304 stainless steel, which allows for easy welding. In other embodiments, the base 22 may be a carbon steel. In further embodiments, the base 22 may be an aluminum, advantageously reducing its weight. The base 22 may vary in shape. For example, in some embodiments, the base 22 may be rectangular and include four I-beams or other beams, which may be attached to one another by means known in the art (e.g., welding, bolts, clamps, etc.). The base 22 may take on dimensions as needed to fit other components of the tumbler 10, particularly the drum 60.

Extending vertically from the base 22, the faceplates 23, 24, 25 may contain the inner components (e.g., the drum 60, the air tube 70, etc.) of the tumbler 10. The inlet faceplate 23 may extend vertically from the inlet end of the base 22 (i.e., the end of the tumbler 10 having the slurry inlet chute 40), and be configured to support the slurry inlet chute 40 as it extends through the inlet faceplate 23 to attach to the drum 60, as shown in FIG. 15. The inlet faceplate 23 may house a floating seal 160, which may be configured to prevent the slurry from exiting the drum back through the inlet faceplate 23. For example, in one embodiment, the slurry must pass through the floating seal 160, as shown in FIGS. 21-24, or a similar device as it enters the drum 60. The floating seal 160, which may be formed as part of a removable seal box 21 as shown in FIGS. 4, 6, and 21-25, may allow the slurry to flow into the drum 60, while preventing the slurry from flowing out of the drum 60.

Figure 24:
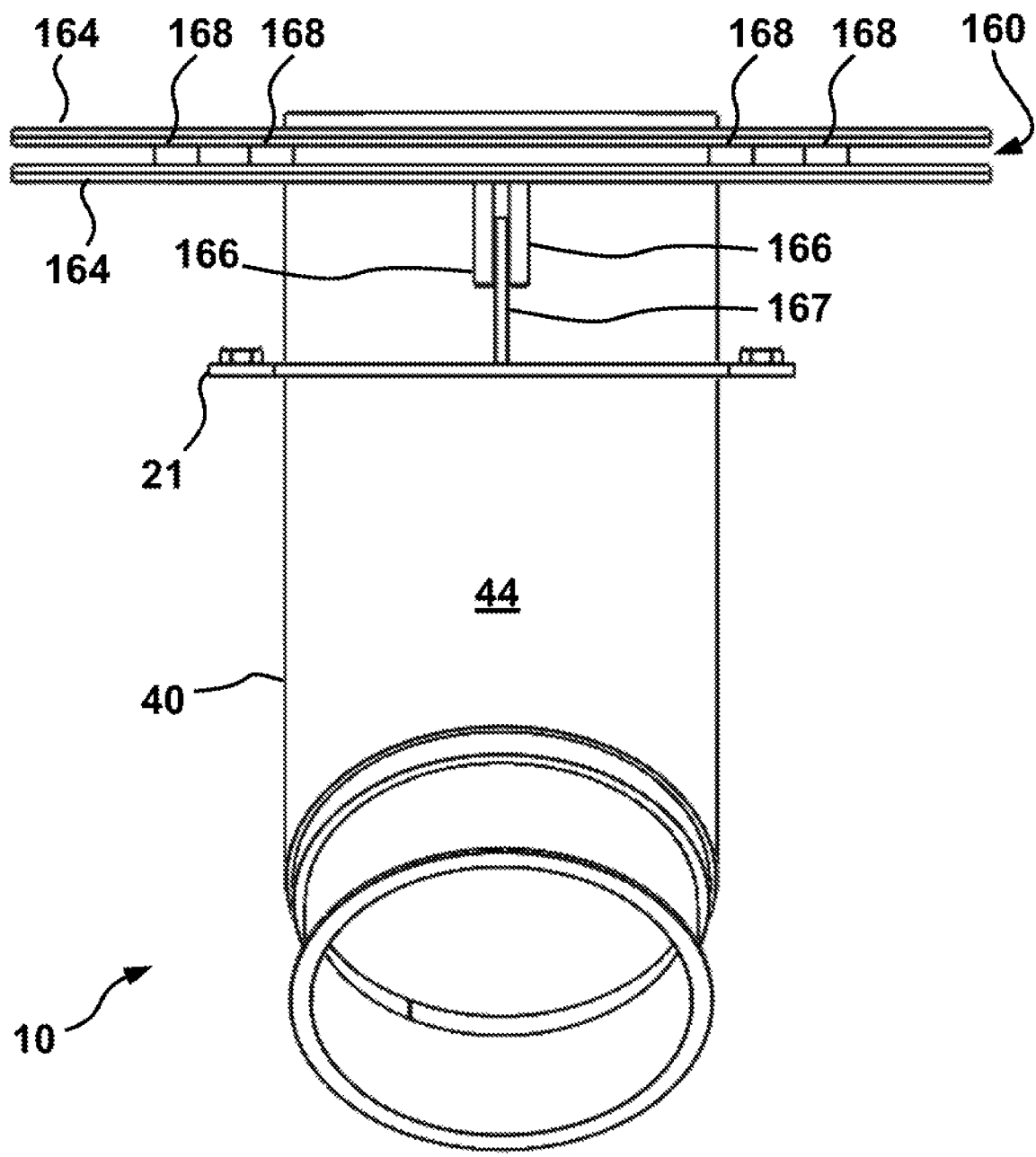
FIG. 24 provides a top view of a seal box around a pellet inlet chute of a tumbler in accordance with some embodiments of the present disclosure.

In some embodiments, as shown in FIGS. 21-24, several components may collectively form the floating seal 160. Specifically, one or more inner walls 162 may reside between and at least partially overlap one or more outer walls 164. In some embodiments, a layer of felt, plastic (e.g., polytetrafluoroethlyene), or another soft material may be disposed between the inner walls 162 and the outer walls 164 to form a seal between the two and allow for rotation. The inner walls 162 may be connected to the inlet end of the drum 60, and configured to rotate as the drum 60 rotates. Wrapped around at least a portion of the slurry inlet chute 40, the outer walls 164 may be held in place such that they "float" relative to the inner walls 162. In some embodiments, the outer wall 164 facing the inlet end of the tumbler 10 may have one or more tabs 166 extending therefrom. The tabs 166 may be attachable and detachable or permanently connected. The tabs 166 may surround one or more fins 167 extending from the frame of the seal box 21 or from the slurry inlet chute 40, as shown in FIG. 24, to prevent the outer walls 164 from rotating. It is contemplated that the tabs 166 may have a clearance around the fins 167 to allow for limited rotation of the outer walls 164 in some embodiments. In other embodiments, other methods known in the art may be used to hold the outer walls 164 in place. One or more spacers 168 may connect the outer walls 164 to one another to provide clearance around the inner wall(s) 162, and allow the drum 60 to rotate. The spacers 168 may connect to the outer walls 164 by any mechanical or chemical connection (e.g., welding, glue, screws, etc.). For example, in one embodiment, the spacers 168 may be welded to one of the outer walls 164 (e.g., the wall 164 facing the drum 60) and connect to the other outer wall 164 (e.g., the wall 164 facing the inlet) via a screw disposed within one or more apertures 169.

The floating seal 160 may advantageously overcome issues with conventional seals. For example, pellets rotating within the drum 60 often climb static surfaces and enter the seal itself, ultimately damaging the seal or other components or disrupting rotation of the drum 60. As described in the embodiment above, the inner wall 162 rotates with the drum 60, thereby preventing, at least partially, pellets from climbing the wall and entering the seal. Further, the soft material separating the inner wall 162 and the outer walls 164 may be sized and shaped to prevent pellets from entering the seal while allowing the drum 60 to rotate. Additionally, the floating seal 160 may be removable with the seal box 21, allowing for easy replacement of the seal or components thereof, or for quick assembly/disassembly of the tumbler 10.

Figure 25:
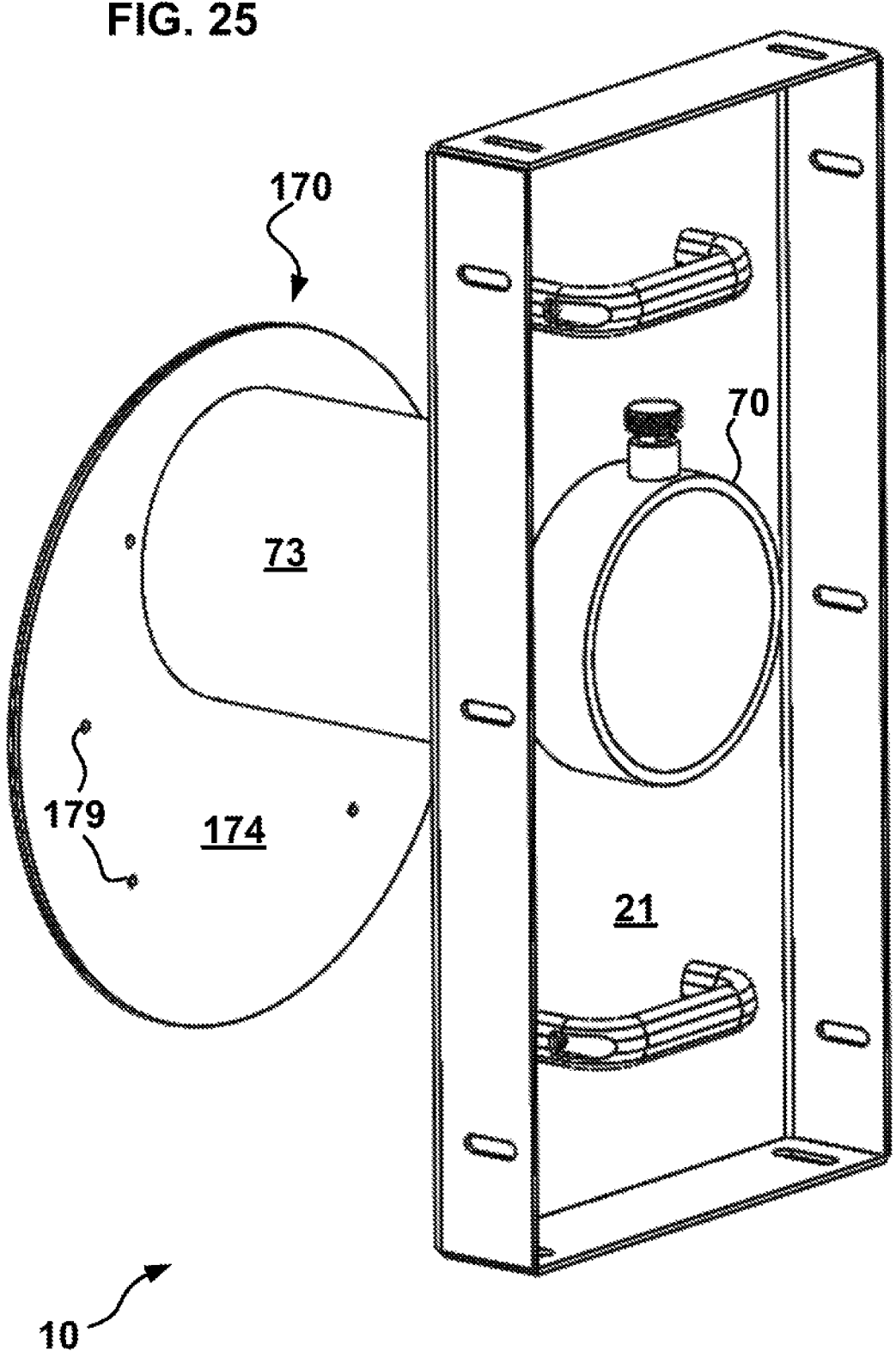
FIG. 25 is an isometric view of seal box around an air tube of a tumbler in accordance with some embodiments of the present disclosure.

The outlet faceplate 24 may extend vertically from the base 22 at the outlet end of the drum 60 (i.e., opposite the slurry inlet chute 40), and be configured to support the air tube 70 as it extends through the outlet faceplate 24 and inside of the drum 60. The outlet faceplate 24 may also be configured to prevent the flow of pellets and fluid beyond the outlet faceplate 24. In some embodiments, the outlet faceplate 24 may include a floating seal 170, as shown in FIG. 25, or a similar device to prevent pellets from escaping the drum 60 through a gap between the outlet faceplate 24 and the air tube 70. The floating seal 170 may be configured to allow the air tube 70 to be removed or adjusted to a desired angle while keeping pellets from undesirably exiting the drum 60. For example, in some embodiments, the floating seal 170 may be configured similarly or identically to the floating seal 160 used at the inlet end of the tumbler 10. In such embodiments, as shown in FIG. 25, the floating seal 170 may include two or more outer walls 174 configured to at least partially overlap an inner wall (not shown). The outer walls 174 may be separated by one or more spacers (not shown) connectable to the outer walls 174 via screws at apertures 179. In other embodiments, the floating seal 170 may instead be non-floating and rotate with the drum 60. Like with the floating seal 160 on the inlet end, the floating seal 170 on the outlet end of the tumbler 10 may be removable via the seal box 21, as shown in FIGS. 4 and 25. The back faceplate 25 may extend vertically from the base 22 at the back end of the tumbler (i.e., opposite the slurry inlet chute 40 and downstream of the outlet faceplate 24), and be configured to support the air tube 70 as it extends through the back faceplate 25 to the outlet faceplate 24.

The faceplates 23, 24, 25 may be constructed from a metal, wood, or hard plastic, and be configured to withstand the force of the drum's 60 rotation and weight, and support the doors 30. For example, in some embodiments, the faceplates 23, 24, 25 may be constructed from stainless steel, carbon steel, or aluminum. In some embodiments, the faceplates 23, 24, 25 may have similar dimensions. For example, in one embodiment, the faceplates 23, 24, 25 may each be pentagonal having square bottom portion and a triangular top portion. In other embodiments, the faceplates 23, 24, 25 may be sized and shaped to contain the drum 60 and other inner components within the tumbler 10. The upper member 26 may be constructed from a metal, wood, or hard plastic, and be configured to horizontally support the top of the faceplates 23, 24, 25. For example, the upper member 26 may be constructed from stainless steel, carbon steel, or aluminum. In some embodiments, the upper member 26 may form an isosceles trapezoid that has a wider bottom face than the top face, as shown in FIG. 3. In other embodiments, the upper member 26 may take on other shapes, such as a rectangle, cylinder, or other shape configured to connect to the faceplates 23, 24, 25 and allow movement of the doors 30. It is contemplated that the upper member 26 may include one or more handles or attachment points for transportation of the tumbler 10. Additionally, in some embodiments, multiple upper members 26 may be used based on the desired shape of the tumbler 10.

In one embodiment, the connectors 28 may be positioned on opposing sides of the inlet end of the tumbler 10. In other embodiments, however, the connectors 28 may be positioned on the outlet end of the tumbler 10 if the tilt mechanism 80 is switched to the inlet end of the tumbler 10. In some embodiments, the connectors 28 may form a pivot connection between the housing 20 and the frame 50, as shown in FIG. 4. For example, the connectors 28 may include two or more members having a hole connected via a bolt or shaft. In this embodiment, one or more spacers may be used to separate the members of the connector 28 to help facilitate pivoting of the connector 28. The connectors 28 may rotate relative to their pivot points as the tilt mechanism 80 adjusts. That is, as the tilt mechanism 80 adjusts, the angle of the housing, and in turn, the drum 60, may increase or decrease relative to a horizontal plane as the connectors 28 remain at a fixed height. In this manner, the tilt mechanism 80 may adjust the residence time of pellets within the drum 60. In some embodiments, the connectors 28 may be constructed form a metal, wood, or hard plastic. In other embodiments, the connectors 28 may be coated in a material to prevent rust or decay that may result from exposure to fluids handled in the tumbler 10. Further, as the connectors 28 may be moving parts of the tumbler 10, they may be oiled and/or greased in some embodiments to help facilitate movement.

In other embodiments, the tumbler 10 may not include a frame 50. Instead, the base 22 may be suspended from an above point via cables, ropes, beams, etc. For example, in one embodiment, the inlet and outlet ends of the tumbler 10 may be suspended above the ground surface via a cable. It is contemplated that the tumbler 10 may be configured such that its height off of the ground surface is adjustable, either via the cables or an adjustable height feature of the frame 50.

In some embodiments, the static dissipation brush 29 may be housed on the back side of the inlet faceplate 23 facing the drum 60, as shown in FIG. 4. The static dissipation brush 29 may slowly draw an electric charge from the drum 60, which could prevent an operator from being undesirably shocked. To help the static dissipation brush 29 slowly conduct the electric charge and prevent shock, it may be placed in a position to contact or almost contact the drum 60. In one embodiment, the static dissipation brush 29 may extend from the inlet faceplate 23 such that it may conduct an electric charge from the drum 60 without impeding rotational movement of the drum 60. In some embodiments, the static dissipation brush 29 may be constructed from any static dissipative material, which may have a resistivity value between about $10^5$ to about $10^{12}$ ohm-meters. In other embodiments, the tumbler 10 may have a grounding feature, which may be advantageous in hazard areas. For example, in one embodiment, a wire or brush may extend from the ceiling at an angle such that the wire or brush remains in contact with the drum 60 as it rotates. For example, the wire or brush may be angled to contact the side of the drum 60 that rotates downwardly. As such, the wire or brush may be upkeep sufficient contact for grounding purposes without impeding rotation of the drum 60. In other embodiments, other methods of grounding or static dissipation known in the art may be used.

Figure 2:
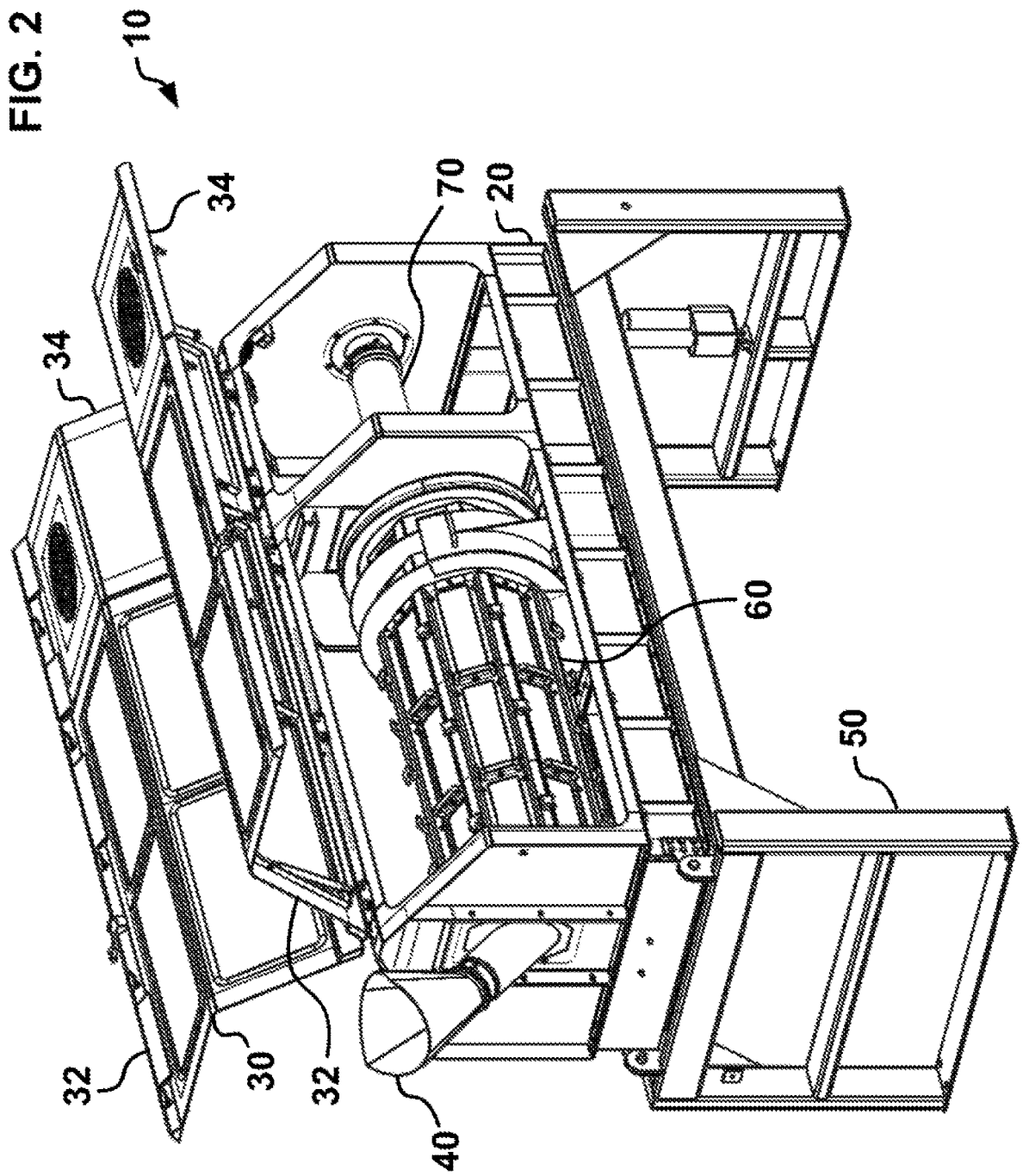
FIG. 2 shows an isometric front view of a tumbler having open doors and a rotatable drum in accordance with some embodiments of the present disclosure.

As shown in FIG. 2, the doors 30 may include one or more drum doors 32 and one or more service doors 34 each extending from the upper member 26 of the housing 20. In one embodiment, the doors 30 may open and close together. In another embodiment, the drum door 32 and the service door 34 may be configured to open and close independently. The doors 30 may bend as they extend downwardly such that they cover a portion of the top and side of the tumbler 10. Alternatively, in other embodiments, the doors 30 may only cover the top or a side of the tumbler 10.

Figure 19:
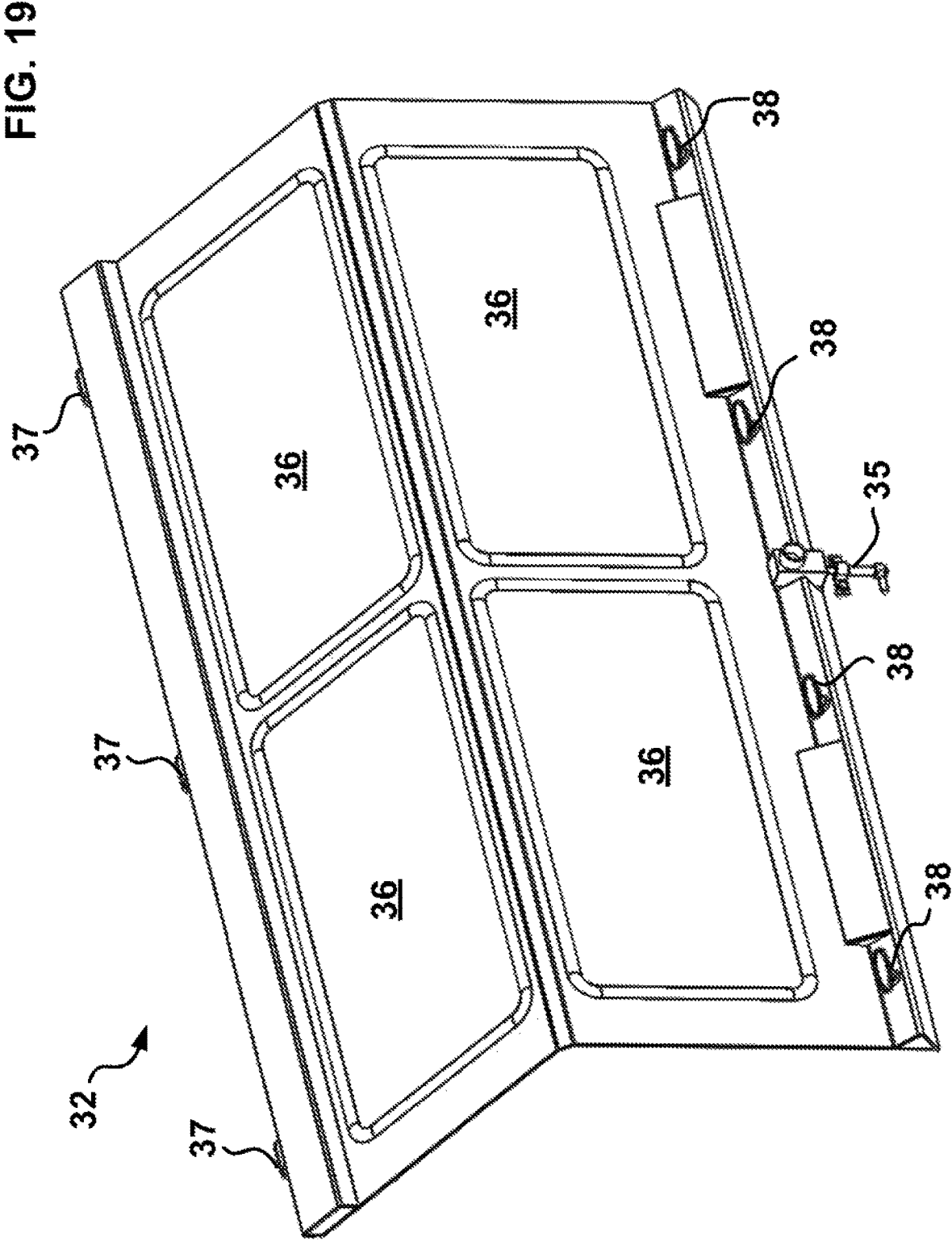
FIG. 19 is an isometric view of a drum door for a tumbler in accordance with some embodiments of the present disclosure.

Shown in more detail in FIG. 19, the drum door 32 may include a lock 35, one or more windows 36, one or more hinges 37, and one or more latches 38. In some embodiments, the drum door 32 may attach to the upper member 26 of the housing 20 via the hinges 37 or another pivot connection allowing the drum door 32 to swing upwardly to open. In other embodiments, the hinges 37 may be positioned elsewhere on the drum door 32 and connectable to other points on the housing 20 (e.g., on the faceplates 23, 24, 25 or on the base 22) and configured to swing sideways or downwardly to open. The lock 35 may be configured to hold the drum door 32 in a closed position when locked 35. Optionally, in some embodiments, the lock 35 may be a key lock that requires a key for locking and unlocking to secure the tumbler 10. The windows 36 may be arranged, sized, and appropriately numbered to increase visibility within the tumbler 10 as desired. In one embodiment, as shown, the tumbler 10 may include four windows 36 on each drum door 32, with two windows 36 positioned on an upper portion of the drum door 32 and two windows 36 positioned on a lower portion of the drum door 32. In this manner, the windows may increase visibility from the ground level (e.g., for an operator standing beside the tumbler 10) and from above (e.g., for an operator standing on stairs or a platform above the tumbler 10). The latches 38 may be rotatable to seat and fix the drum door 32 in a closed position.

Figure 20:
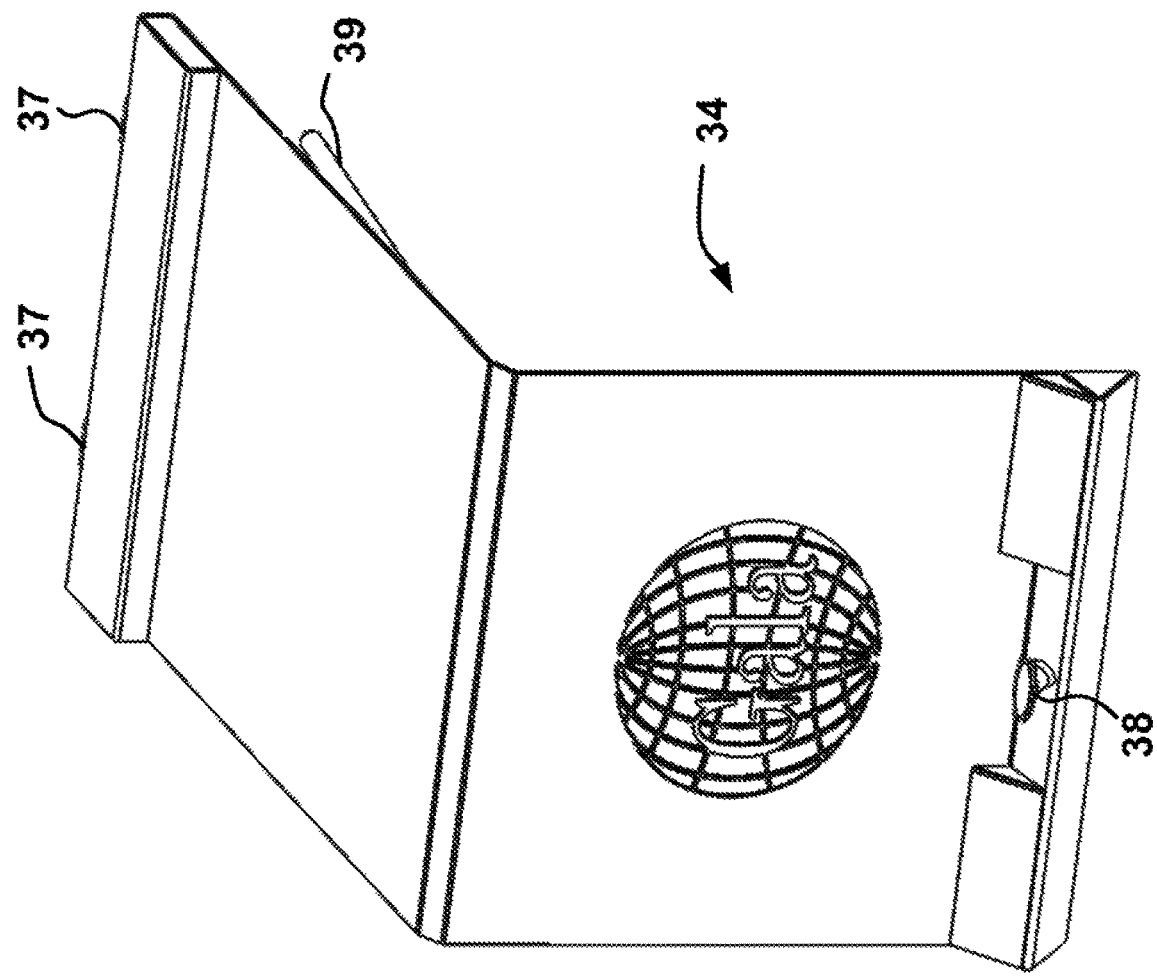
FIG. 20 provides an isometric view of a motor door for a tumbler in accordance with some embodiments of the present disclosure.

Similarly, as shown in more detail in FIG. 20, the service door 34 may include one or more hinges 37, one or more latches 38, and one or more gas shocks 39. In some embodiments, the service door 34 may attach to the upper member 26 of the housing 20 via the hinges 37 or another pivot connection allowing the service door 34 to swing upwardly to open. In other embodiments, the hinges 37 may be positioned elsewhere on the service door 34 and connectable to other points on the housing 20 (e.g., on the faceplates 23, 24, 25 or on the base 22) and configured to swing sideways or downwardly to open. In some embodiments, the gas shocks 39 may help lift the service door 34 open and hold it in an open position until the service door 34 is moved down by a force that overpowers the gas shocks 39. The gas shocks 39 may be included on the drum door 32 as well, in some embodiments. Although not included in the embodiment shown in FIG. 20, the service door 34 may include a lock 35 and/or windows 36.

Once the doors 30 are closed and the tumbler 10 is ready for operation, the slurry inlet chute 40 may be configured to receive and direct a slurry of pellets and fluid into the drum 60 of the tumbler 10. In some embodiments, as shown in FIGS. 1 and 2 and in more detail in FIG. 3, the slurry inlet chute 40 may include a funnel 42 connected to a conduit 44. The funnel 42 may be configured to receive the slurry from an upstream component (e.g., a pelletizer, a dryer, a defluidizer, or another tumbler) and direct the slurry into the conduit 44.

In some embodiments, the funnel 42 may be conically shaped and constructed from a metal, wood, or hard plastic. For example, in one embodiment, the funnel 42 may be rolled sheet metal. The funnel 42 may have a lower opening with a diameter about the same as that of the conduit 44, and a larger, upper opening for collecting the slurry. In other embodiments, the slurry inlet chute 40 may not include a funnel 42 as the conduit 44 may be directly attached to an outlet of an upstream component.

Figure 21:
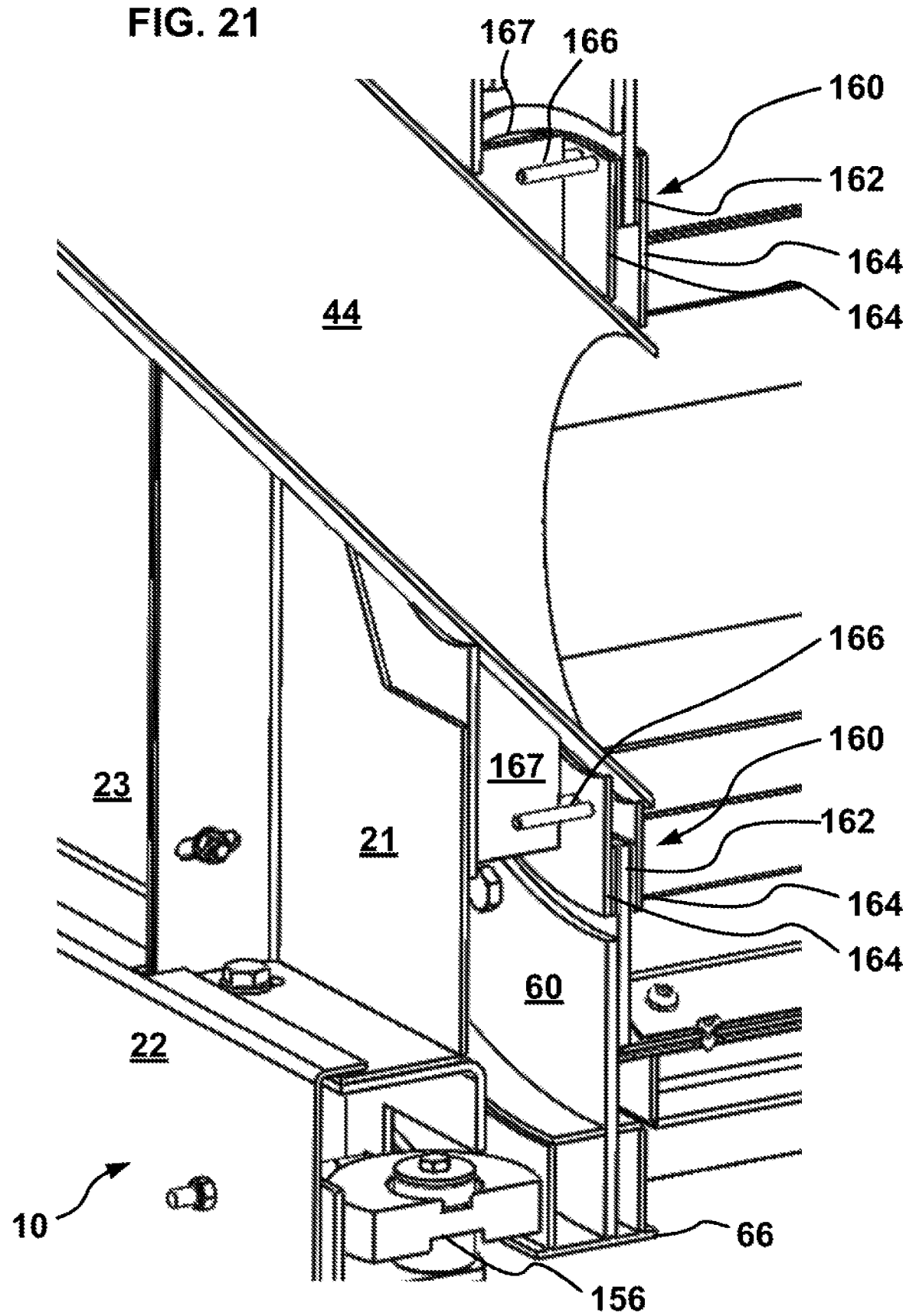
FIG. 21 is an isometric view of a floating seal at an inlet portion of a tumbler in accordance with some embodiments of the present disclosure.

The conduit 44 may be a hollow cylinder configured to transport the slurry into the drum 60, as shown in FIG. 21. In some embodiments, the conduit 44 may be sized to fit through the inlet faceplate 23 with minimal clearance room. It is contemplated that the conduit 44 may have the same diameter throughout its length. For example, in one embodiment, the conduit 44 may pass through an expandable member in the inlet faceplate 23 that snugly fits around the conduit 44 to prevent the slurry from escaping the tumbler through the inlet faceplate 23 and foreign objects from entering the tumbler 10. It is contemplated that the floating seal 160 or similar device may be used to hold the conduit 44 in place and allow the slurry to enter the drum 60 while preventing the slurry from leaking out of the conduit 44 before entering the drum 60. The vertical cross-section of the conduit 44 may be elliptical as it enters the floating seal 160, as shown in FIG. 21. Additionally, seals (e.g., nylon seals) may be used to seal the connection between the conduit 44 and the inlet faceplate 23. In other embodiments, the dimensions of the conduit 44 may change as it extends based on the desired flow of the slurry into the drum 60. The conduit 44 may house a powder feeder (not shown) or otherwise introduce powder for coating the pellets in some embodiments.

Figure 15A:
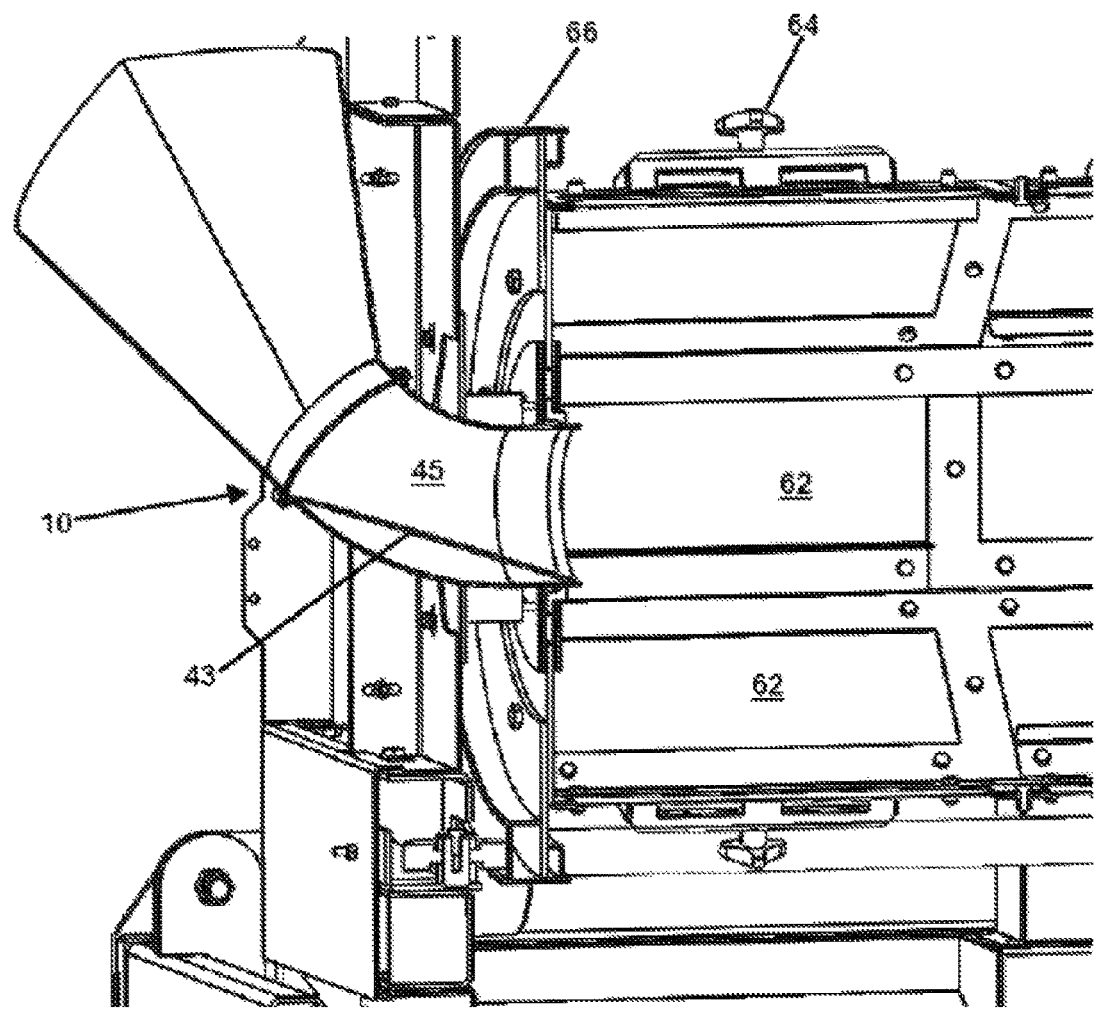
FIG. 15a is an isometric view of a slurry inlet portion of a tumbler in accordance with other embodiments of the present disclosure.
Figure 17:
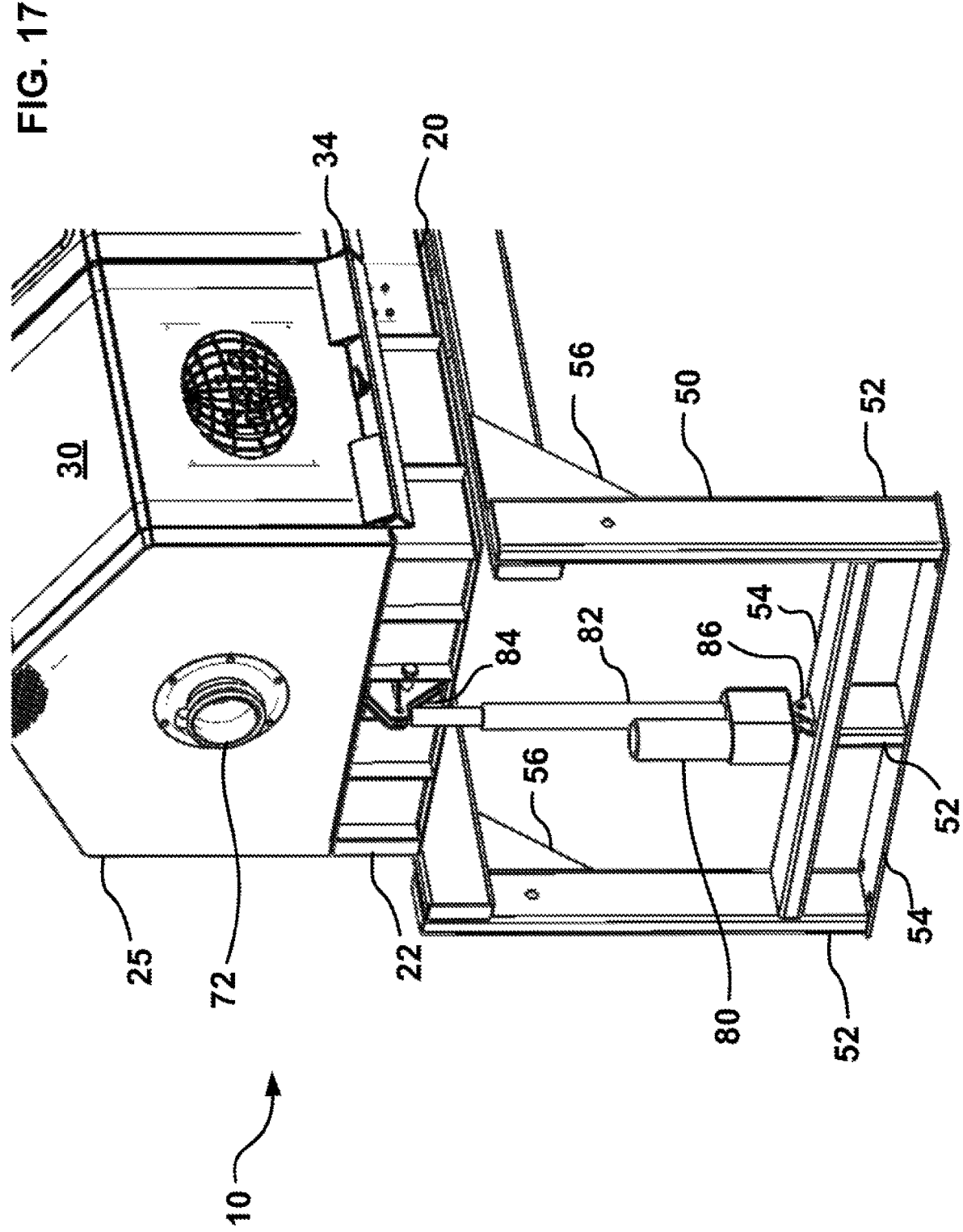
FIG. 17 is an isometric view of an air intake portion of a tumbler in accordance with some embodiments of the present disclosure.
Figure 22:
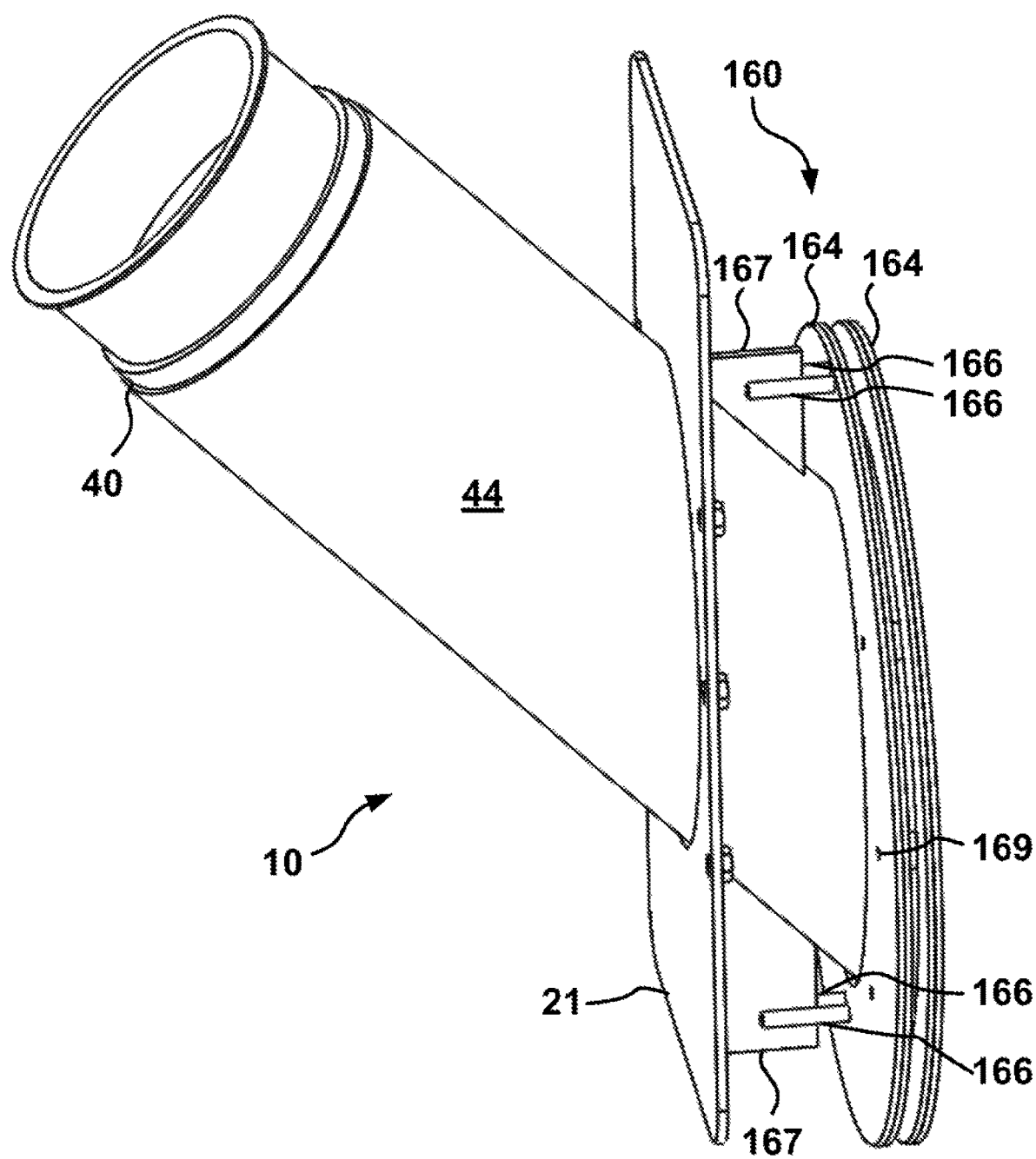
FIG. 22 shows an isometric view of a seal box around a pellet inlet chute of a tumbler in accordance with some embodiments of the present disclosure.
Figure 22A:
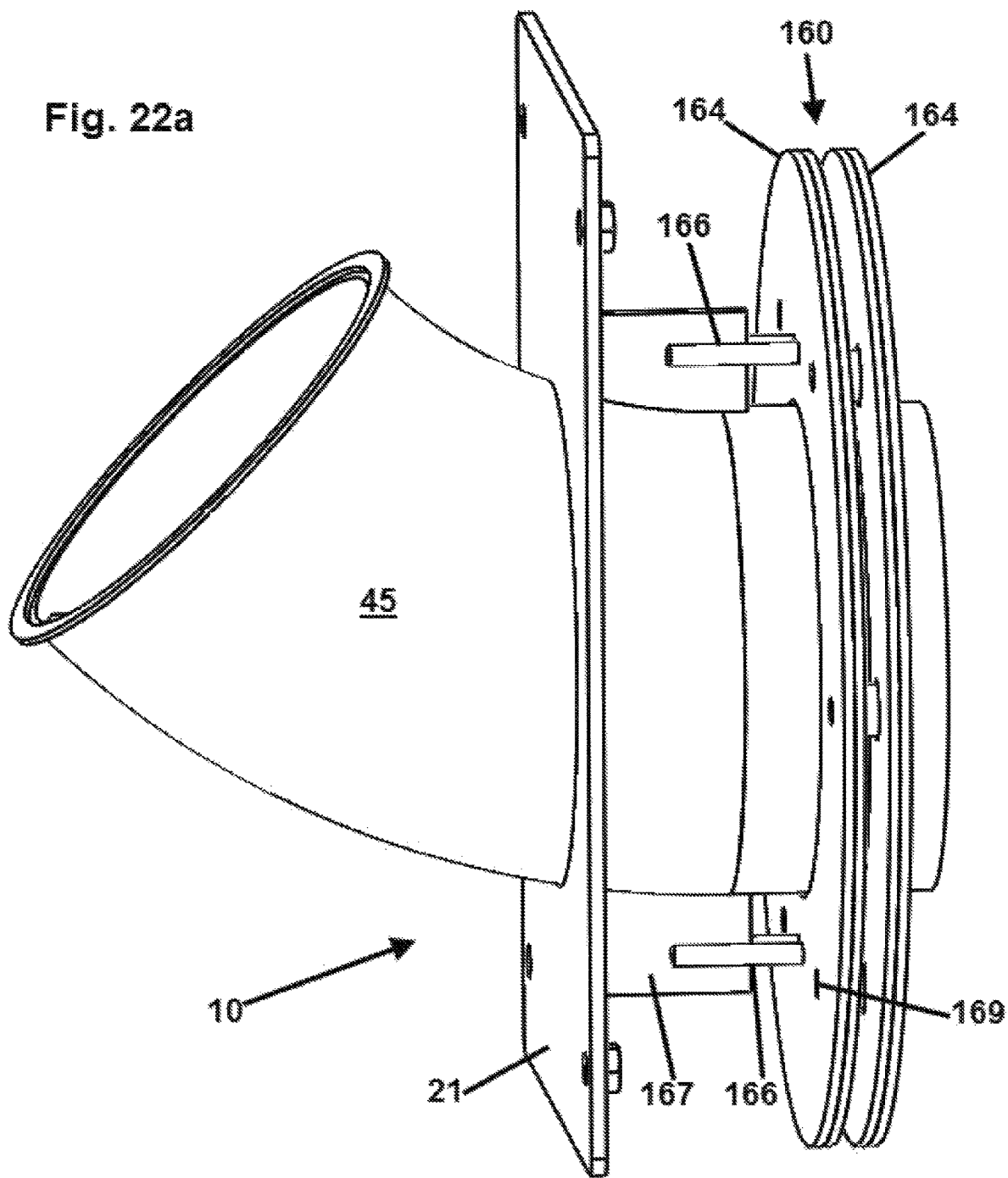
FIG. 22a shows an isometric view of a seal box around a pellet inlet chute of a tumbler in accordance with other embodiments of the present disclosure.

In other embodiments, an elbow-shaped conduit 45 may be used at the inlet of the tumbler 10 in lieu of the conduit 44, as shown in FIGS. 15a and 22a. The vertical cross-section of the elbow-shaped conduit 45 may be circular as it enters the floating seal 160 perpendicular thereto. In some embodiments, as shown in FIG. 15a, a flat plate 43 may be welded or otherwise attached in the interior of the elbow, along the outside radius thereof, to aid in the flow of the pellet slurry into the interior of the tumbler 10. In this configuration, the flat plate 43 may provide a downward incline along which the slurry may flow. In some embodiments, the flat plate 43 may include one or more apertures configured to direct pellets down the surface of the flat plate 43 while allowing at least a portion of the moisture of the pellet slurry to pass through the flat plate 43. In other embodiments, the flat plate 43 may not include any apertures so the flat plate 43 can direct the entirety of the pellet slurry down the surface of the flat plate 43. It is contemplated that the flat plate 43 may extend over the entire lower curved portion of the elbow-shaped conduit 45 or a portion thereof and/or form a predetermined angle relative to floating seal 160 based on the desired directional flow of the pellet slurry as it enters the tumbler 10. In addition to floating seal 160, a pipe grommet 163 may be added to surround the circular cross-section of elbow-shaped conduit 45 as it passes through the floating seal 160, as shown in FIG. 15a. The pipe grommet 163 may add another level of sealing to the interior of drum 60.

Supporting the housing 20 off of the ground surface, the frame 50 is shown in FIGS. 1, 2, and 4, and in more detail in FIG. 3. In some embodiments, the frame 50 may include one or more vertical members 52, one or more cross members 54, one or more corner support members 56, and one or more horizontal members 58. The frame 50 may be constructed from a metal, wood, or hard plastic, and be configured to, collectively, withstand the force of the drum's 60 rotation and weight and support the remainder of the tumbler 10. In one embodiment, the frame 50 may be constructed from aluminum to limit its weight. As previously noted, in other embodiments, the tumbler 10 may replace the frame 50 with a suspension device configured to suspend the drum 60 above the ground surface. In some embodiments, the vertical members 52 may extend proximate a vertical axis along the four corners of the tumbler 10. In other embodiments, one or more vertical members 52 may be spaced along the length of the tumbler 10 as needed to support the tumbler 10 or as desired. For example, in one embodiment, three vertical members 52 may extend downwardly from the housing 20 and support the tumbler 10 to prevent the tumbler 10 from wobbling on even ground or when the vertical members 52 are not exactly the same length. The vertical members 52 may be shaped as needed to structurally support the tumbler 10. In some embodiments, the vertical members 52 may be rectangular and straight such that they are configured to attach to other components of the frame 50 at right angles. In other embodiments, the vertical members 52 may be cylindrical and/or curved to provide clearance for other components or to decrease the ground space required for the tumbler 10. In further embodiments, the vertical members 52 may be hollow to decrease their weight. In other embodiments, the vertical members 52 may be solid or filled with a material to weight the frame 50 to prevent the tumbler 10 from moving despite its vibrations from the rotating drum 60.

The cross members 54 may, in some embodiments, extend proximate a horizontal axis and connect one or more of the vertical members 52 to one another. The cross members 54 may be shaped as needed to structurally support the tumbler 10. In some embodiments, the cross members 54 may be rectangular and straight such that they are configured to attach to other components of the frame 50 at right angles. In other embodiments, the cross members 54 may be cylindrical and/or curved to provide clearance for other components. In further embodiments, the cross members 54 may be hollow to decrease their weight. In other embodiments, the cross members 54 may be solid or filled with a material to weight the frame 50 to prevent the tumbler 10 from moving despite its vibrations from the rotating drum 60.

In some embodiments, the corner support members 56 may connect the corners formed by at least some of the vertical members 52 and the horizontal members 58. The corner support members 56 may be triangular and configured to structurally support the frame 50 by keeping the vertical members 52 upright. It is also contemplated that the corner support members 56 may support other joints in the frame 50, including joints between the vertical members 52 and the cross members 54.

In other embodiments, the horizontal members 58 may extend proximate a horizontal axis and connect the top of the vertical members 52 to one another. The horizontal members 58 may be configured to receive the housing 20 such that the housing 20 fits snugly on top of the horizontal members 58. In some embodiments, the horizontal members may be configured to pivotally attach to the housing 20 via the connectors 28. In some embodiments, the horizontal member 58 may be a solid single surface that covers the bottom of the housing 20. The surface of the horizontal members 58 may include a rough surface to grip the housing 20 and prevent the housing 20 from sliding as the drum 60 rotates. In other embodiments, the horizontal members 58 may surround the perimeter of the housing 20. The horizontal members 58 may be hollow in some embodiments to reduce their weight, and solid in other embodiments for strength.

Figure 10:
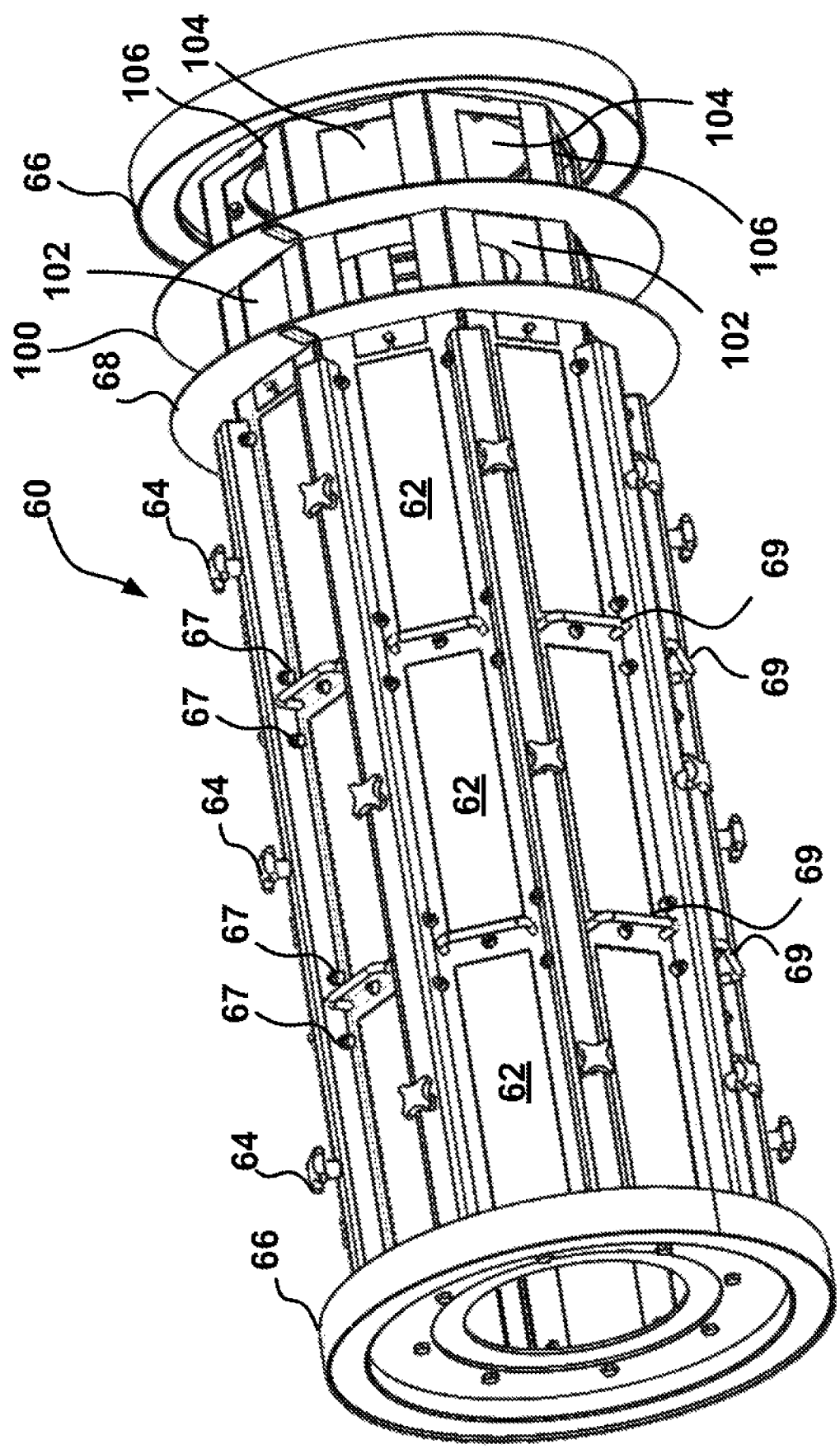
FIG. 10 shows an isometric front view of a drum in accordance with some embodiments of the present disclosure.

Shown in greater detail in FIGS. 4 and 10, the drum 60 may be configured to receive the slurry, separate fluid from the pellets, and direct the pellets to the pellet outlet chute 90. In some embodiments, the drum 60 may include a plurality of screens 62 each connected to the drum 60 via a plurality of knobs 64 and connectors 67. In between each screen 62, the drum 60 may include a hand bar 69 to assist an operator in manually rotating or carrying the drum 60. The drum 60 may also include two or more drum wheels 66 configured to roll to rotate the drum 60. The drum 60 may further include one or more rings 68 to, along with the stop ring 100, prevent pellets from escaping the pellet exit chute 90 as they exit the drum 60 through one or more openings 102 (e.g., sections without a screen 62). Optionally, in some embodiments, the drum may include one or more openings 104 downstream of the stop ring 100, the openings 104 being defined by a plurality of frame members 106. The frame members 106 may extend along the length of the drum 60 and be configured to attachably receive the screens 62.

Figure 11:
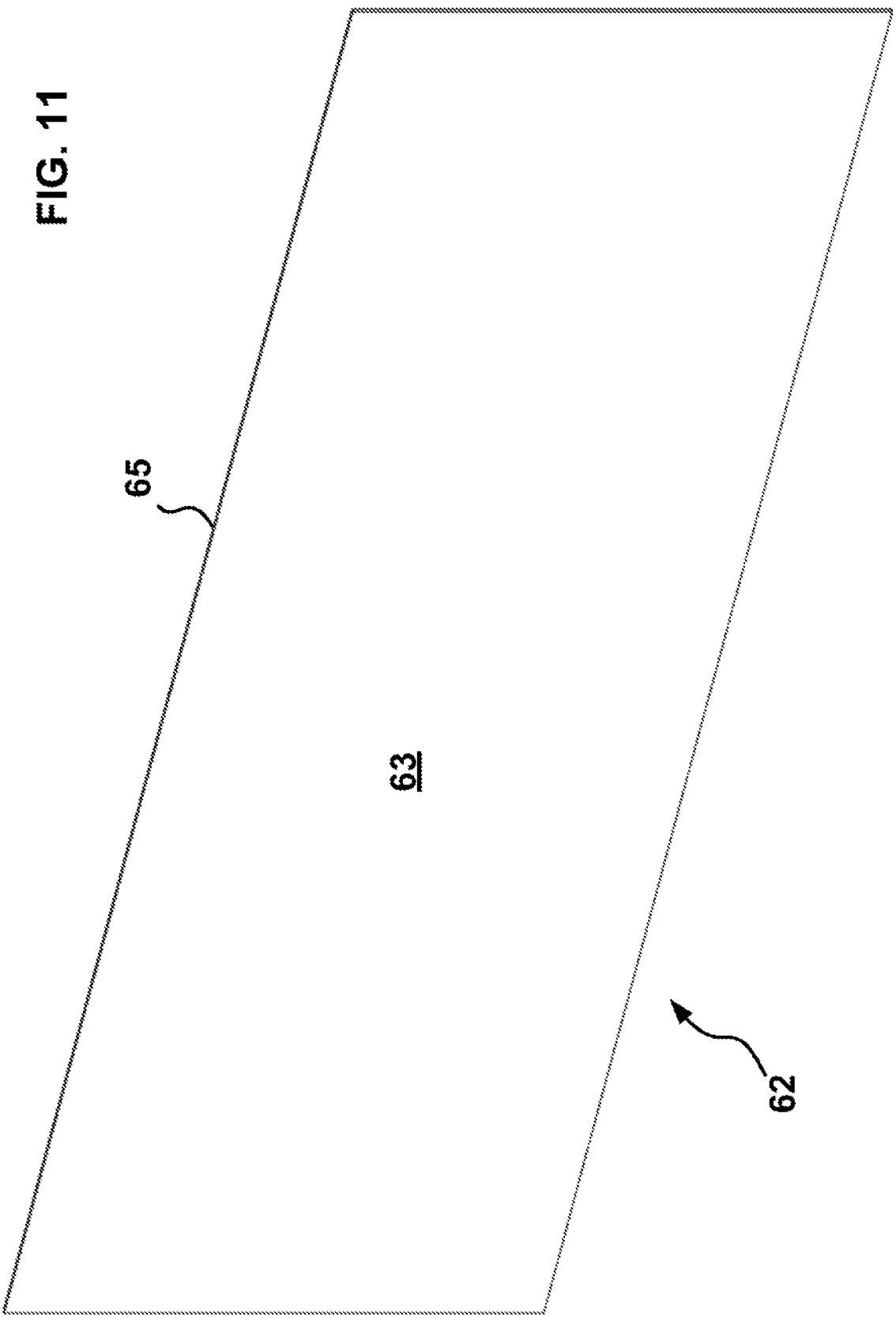
FIG. 11 is an isometric front view of a screen in accordance with some embodiments of the present disclosure.

In some embodiments, each screen 62 may include a perforated wire mesh section 63 and a screen frame 65, as shown in FIG. 11. The wire mesh section 63 may be constructed from metal wire in some embodiments, though any hard material, including plastics, may be used. In lieu of the wire mesh section 63, other sheets of material containing apertures may be used. For example, material containing particular patterns or shapes or apertures that correspond with the size and/or shape of the pellets may be used. In other embodiments, the screens 62 may be the screens described in U.S. Pat. App. Pub. No. 2009/0126216 (e.g., ¶¶[0046-][0050] and FIGS. 13-17), which is incorporated herein by reference. The apertures of the wire mesh section 63 may vary in size and shape based on the pellets. Further, multi-layered screens 62 may be used to more easily allow air to pass through while containing the pellets. It is contemplated that wire mesh sections 63 having multiple apertures sizes may be used on the drum 60 at the same time. For example, screens 62 having smaller apertures may be placed on the drum 60 closer to the inlet end while screens 62 having larger apertures may be used on the drum 60 closer to the outlet end.

The knobs 64 and connectors 67 may have mating elements (e.g., other connectors or holes) for attaching the screens 62 onto the frame members 106. In some embodiments, as shown in FIG. 12, the screens 62 may slidably attach to the frame members 106 and are fixed in place by screwing in one or more of the knobs 64. To secure the alignment of the screens 62, the screen frame 65 may include holes configured to fit around the connectors 67. In some embodiments, the screens 62 may snap onto the connectors 67.

In other embodiments, the knobs 64 may be positioned to slidably receive one or more edges of the screen 62 (or several screens 62). After sliding the edge of the screen 62 under the knob 64, an opposing edge of the screen 62 may be fastened to the drum 60 via the connector(s) 67. In this embodiment, the required number of connectors 67 may be limited by the use of the knobs 64. Further, the knobs 64 and connectors 67 may be configured to screw in, clip, latch and/or snap on such that an operator can quickly connect the screen 62 to or remove the screen 62 from the drum 60 without the use of tools (thereby making the screen 62 "readily attachable and detachable"). In other embodiments, the screens 62 may be bolted, welded, hinged and latched, clamped, and/or sealed to the drum 60. Additionally, seals or gaskets may be used at the connection points to help contain pellets and micropellets within the drum 60. In further embodiments, one or more screen holders 210 may be used to secure the screens 62 to the drum 60 via the knobs 64, as shown in FIG. 12. For example, in the exemplary embodiment shown in FIG. 12, the screen holders 210 may be U-shaped or W-shaped and extend along the connection line between the screens 62, and span across the edges of adjacent screens 62 and extend along the length of drum 60, holding the screens 62 to the screen frame 65 via pressure exerted on them by the knobs 64. In other embodiments, the screen holder 210 may be in the form of individual holding devices arranged between adjacent pairs of the screens 62. The individual screen holders 210 may have slots or perforations therein, and cutout portions along their length, as shown in FIG. 13a, to allow fluid that contacts the screen holders 210 (e.g., fluid exiting the screens 62) to escape.

On the inside of the drum 60, as shown in FIG. 12, one or more baffles 61 may connect to the screen frame 65 and extend toward the center of the drum 60. The baffles 61 may be shaped and positioned to help agitate the pellets within the drum 60 as it rotates. For example, in one embodiment, the baffles 61 may be L-shaped and form a right angle such that a portion of each baffle 61 is perpendicular to the other portion. Alternatively, in other embodiments, the baffles 61 may form an acute or an obtuse angle. The angle of the baffles 61 may affect the duration and extend at which the pellets are transported upwardly by the baffles 61 as the drum 60 rotates. Other geometries for the baffles 61 are also contemplated. For example, in some embodiments, the baffles 61 may be thick or thin flat bar, curved, or spiraled to achieve the desired effect.

In some embodiments, the baffles 61 and/or other components within the tumbler 10 may be treated with various coatings, as desired. For example, in one embodiment, the baffles 61 may be treated with a wear resistant coating to help improve their durability. It is contemplated that any coatings or surfaces treatments may be used, including those described in U.S. Pat. No. 8,080,196 (e.g., Cols. 16:65-22: 53), which is incorporated by reference herein.

The hand bars 69 may be U-shaped and extend outwardly from the exterior of the drum 60, as shown in FIG. 12. In some embodiments, the hand bars 69 may be positioned and sized to assist in manually rotating or transporting the drum 60. In other embodiments, the hand bars 69 may snap or other connect to the frame members 106 to help hold the screens 62 in place.

As shown in FIG. 4 and in more detail in FIG. 13, the drum wheels 66 may be round and configured to be mechanically driven to rotate the drum 60. By being round, the drum wheels 66 may allow for even, steady rotation of the drum 60 even though the drum may be non-circular (e.g., octagonal). The outer surface of the drum wheels 66 may be smooth to improve the steady rotation of the drum 60. In some embodiments, the outer diameter of the drum wheels 66 may be greater than that of the remainder of the drum 60. For example, in some embodiments, the drum wheels 66 may have an outer diameter of about 28 inches and the remainder of the drum 60 may have an outer diameter of about 20 inches. Other diameters for the drum 60 and/or drum wheels 66 may be used as desired. Regardless of the outer diameter of the drum wheels 66 relative to that of the remainder of the drum 60, it is contemplated that the drum wheels 66 may include an inwardly extending wall portion, which may be integrally formed with the drum wheels 66 or attachable thereto, as shown in FIG. 10. In some embodiments, the wall portion of the drum wheels 66 may extend inwardly and radially to bridge the size gap between the drum wheels 66 and the remainder of the drum 60. In other embodiments, the wall portion of the drum wheels 66 may extend inwardly and radially beyond the inner diameter of the remainder of the drum 60 to at least partially restrict the flow of pellets out of the inlet and/or outlet ends of the drum 60. The wall portion of one of the drum wheels 66 may be configured to serve as an attachment point between the drum 60 and the inner wall 162 of the floating seal 160 (or similarly, the inner wall of the floating seal 170). In other embodiments, the inner wall 162 of the floating seal 160 (or similarly, the inner wall of the floating seal 170) may form the inner wall of the drum wheel 66 or be connectable to the drum wheel 66 or to another component of the drum 60. The drum wheels 66 may be constructed from a metal, wood, or hard plastic and configured to support the weight of the drum 60. In some embodiments, the drum wheels 66 may be the only attachment points between the drum 60 and the remainder of the tumbler 10. In such embodiments, the frame members 106 may be configured to maintain the structure of the drum 60 and its contents without bending as the drum 60 rotates. Further, as the drum 60 may be configured to rest on the drum wheels 66 without being fastened to the tumbler 10, it may be easily removable for transport, repair, or replacement.

Shown in detail in FIGS. 10 and 13, the ring 68 and the stop ring 100 may extend from the exterior of the drum 60 and configured to overlap with the pellet outlet chute 90 to prevent pellets from undesirably escaping the drum 60 before reaching the pellet outlet 132. In some embodiments, the ring 68 may only extend outwardly from the screens 62, while the stop ring 100 may extend inwardly and outward from the screens 62. In this configuration, the ring 68 may allow the pellets inside of the drum 60 to pass to the pellet outlet chute 90. As some pellets may attempt to bounce past the pellet outlet chute 90, the stop ring 100 may stop the pellets from continuing along the length of the drum 60 and, instead, fall into the pellet outlet chute 90. In some embodiments, the stop ring 100 may have a hole configured to allow the air tube 70 to pass through it, as shown in FIG. 16. It is contemplated that the hole may be configured to snugly fit the air tube 70 or that one or more seals may close any gap between the hole of the stop ring 100 and the air tube 70 to prevent pellets from passing through the stop ring 100. The ring 68 and the stop ring 100 may be constructed from a metal, wood, or hard plastic.

In between the ring 68 and the stop ring 100, the openings 102 may be configured to allow pellets to pass into the pellet outlet chute 90. In some embodiments, the openings 102, as defined by the space between the frame members 106, may be sized and shaped to allow all of the pellets to pass. In other embodiments, the openings 102 may be sized or shaped to limit the flow of the pellets to a rate or volume desired for a downstream process (e.g., bagging).

Downstream of the stop ring 100, the openings 104 may be defined by the space between the frame members 106. In some embodiments, the pellets are prevented from passing to this section of the drum 60, and accordingly, the screens 62 are not useful in this section.

In some embodiments, the frame members 106 may extend horizontally along the entire length of the drum 60 and connect the drum wheels 66 to one another. The frame members 106 may serve as a structural support for other components, such as the screens 62, the knobs 64, and the connectors 67, to connect to. In some embodiments, the frame members 106 may define the size and shape of the openings 102 and 104, as shown in FIGS. 13 and 16.

Depending on the number of frame members 106, the drum 60 may vary in shape. In some embodiments, the drum 60 may be octagonal and include eight frame members 106. This octagonal shape may be advantageous over a round shape as it defines smaller screens 62 than would be used for a single round drum 60. The smaller screens 62, which may be rectangular and extend the entire length of the drum 60 or only a portion of the length of the drum 60, may be easier and less expensive to install, remove, and repair. Additionally, for embodiments with screens 62 that only extend a portion of the length of the drum 60, the drum 60 may be configurable to have cross-sections with different attributes (e.g., blank, non-perforated screens vs. perforated screens, size of screen apertures, etc.). As the total number of frame members 106 increases, the shape of the drum 60 may become more rounded, allowing for smoother pellet flow within the drum 60. Conversely, a non-round shape of the drum 60 may help to dry the pellets as they are jostled around within the drum 60.

Figure 8:
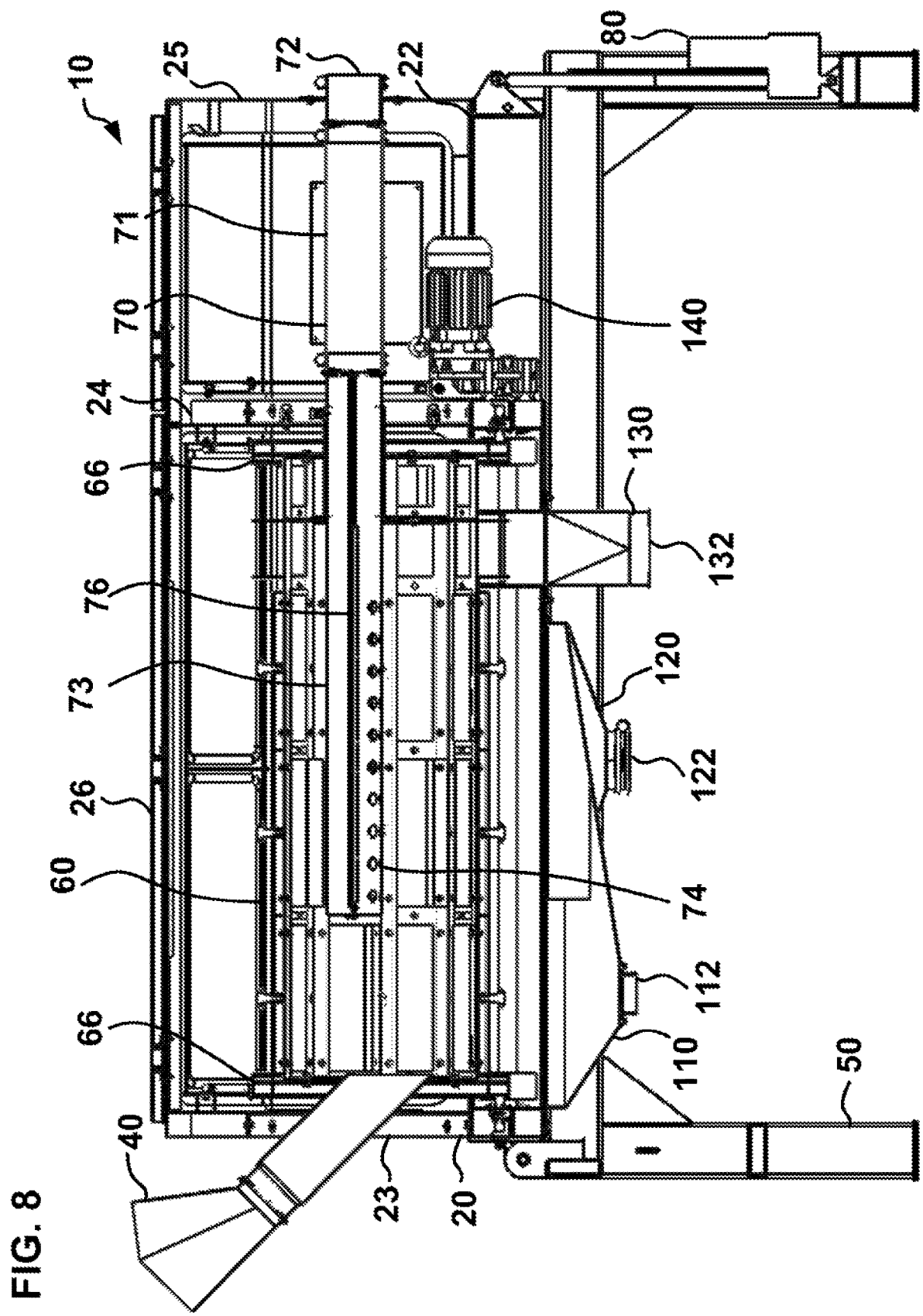
FIG. 8 shows a side cross-sectional view of a tumbler having an air tube disposed within its drum in accordance with some embodiments of the present disclosure.
Figure 9:
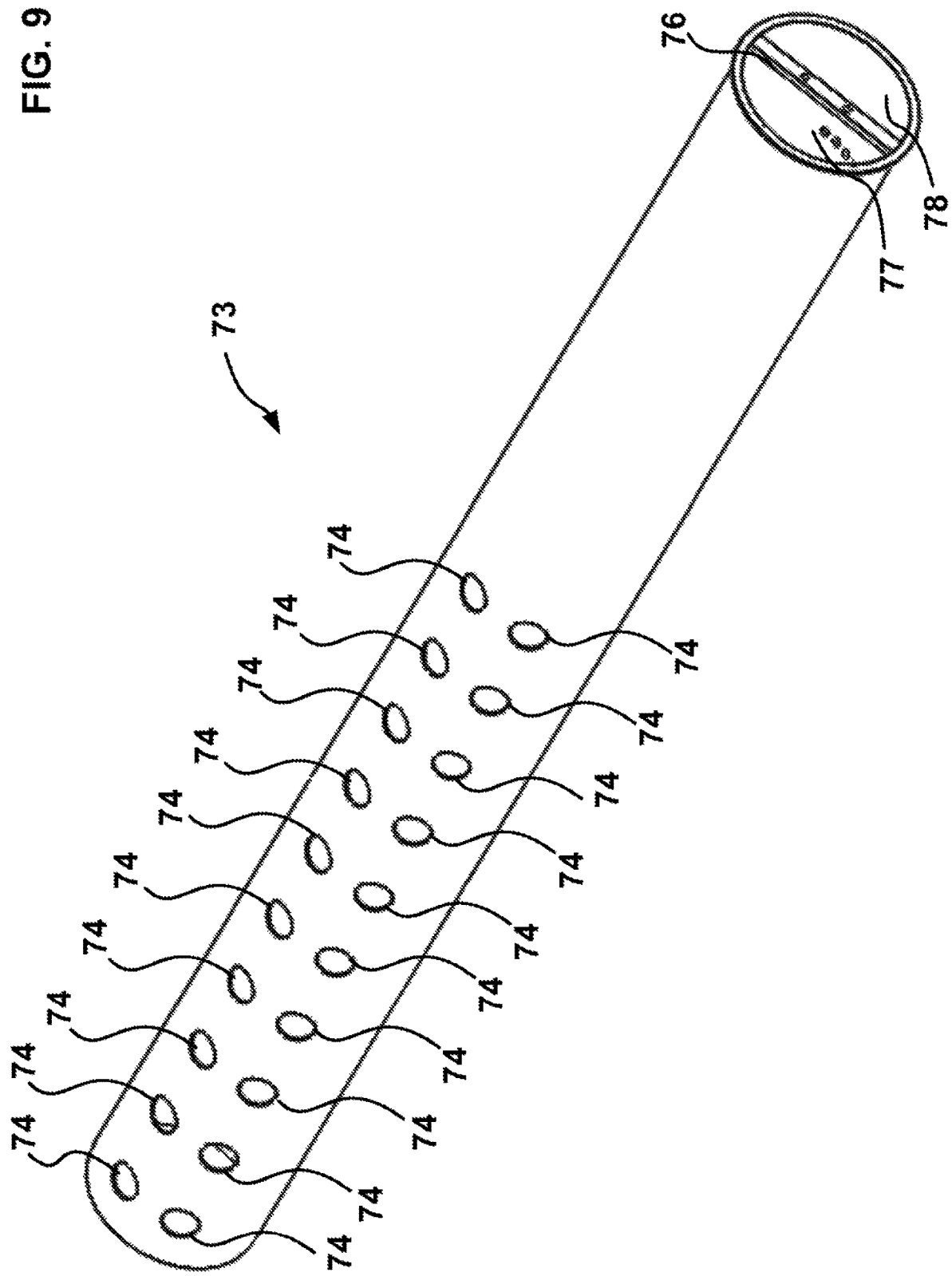
FIG. 9 provides an isometric bottom view of an air tube in accordance with some embodiments of the present disclosure.
Figure 18:
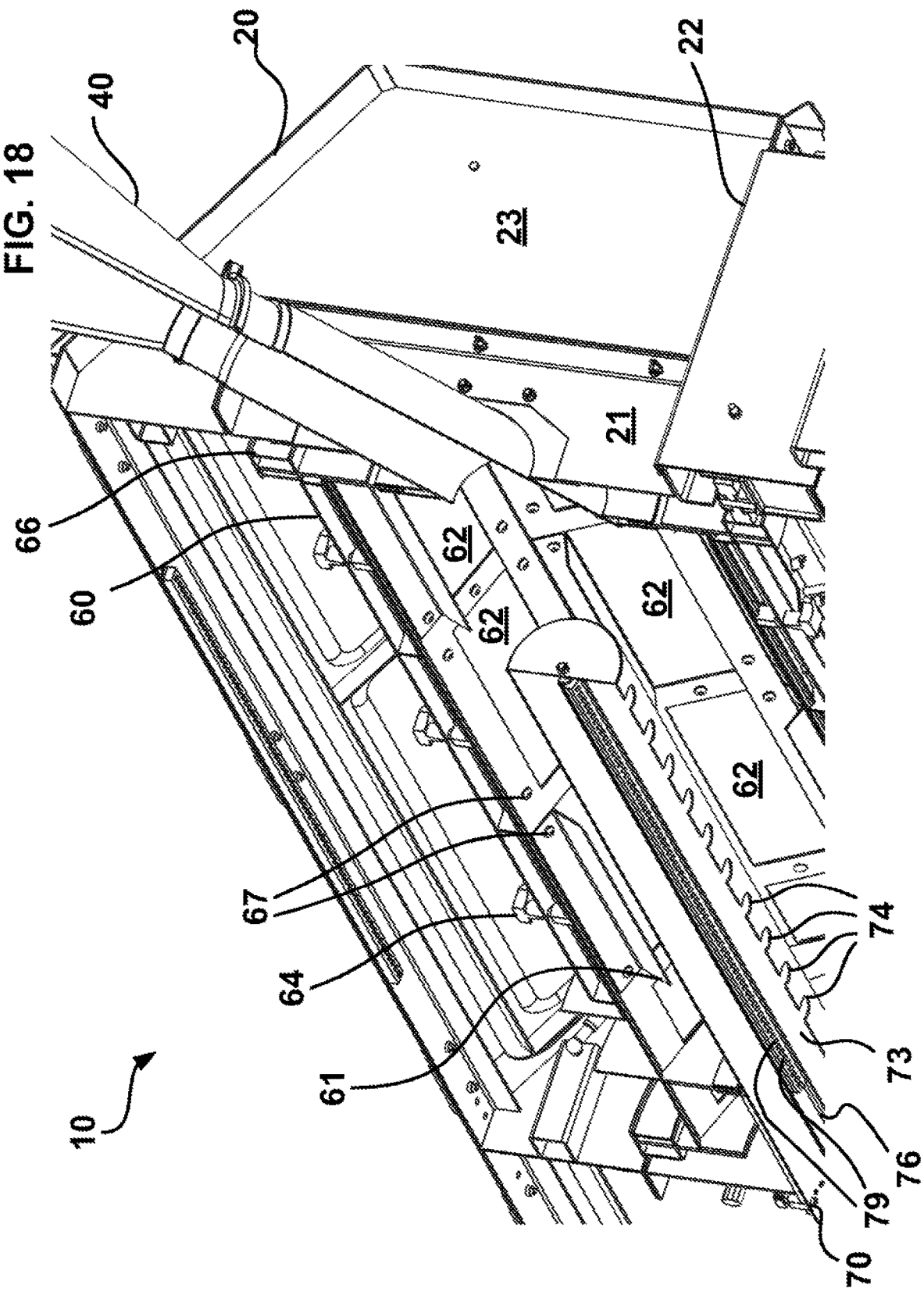
FIG. 18 shows a bottom isometric cross-sectional view of a tumbler having an air tube disposed within its drum in accordance with some embodiments of the present disclosure.

Partially disposed within the drum 60, as shown in FIG. 4 and in more detail in FIGS. 6, 8, 9, and 18, the air tube 70 may include an intake section 71 and a blower section 73. Feeding the intake section 71 with air, an air intake 72 may draw in ambient air outside of the back faceplate 25. The blower section 73 may direct air received from the intake section 71 to the drum 60 via one or more apertures 74. In some embodiments, a blower member 76 may be disposed within the blower section 73 to separate a lower section 77 and an upper section 78, as shown in FIG. 9. Using the blower member 76 to separate the lower and upper sections 77, 78 may help to more evenly distribute the air flow out of the air tube 70. For example, in one embodiment, the air from the lower section 77 may be directed to the apertures 74 closer to the outlet end of the drum 60, while the air from the upper section 78 is directed to the apertures closer to the inlet end of the drum 60. These separated air flow sections may help ensure that the distal end of the air tube 70 receives a portion of the air flow. In other embodiments, as shown in FIG. 18, the blower member 76 may extend the length of the blower section 73 and house a plurality of lights 79 configured to illuminate the pellet flow within the drum 60. The air tube 70 may be removable in some embodiments, making is easy to transport or disassemble for replacement or repair. In other embodiments, the air tube 70 may be configured to rotate or have an adjustable angle at which it extends within the drum 60, allowing for delivery of air within the drum 60 as desired. In one embodiment, the air tube 70 may be about six inches in diameter. It is contemplated that the air tube 70 may take on any diameter or length as desired. Further, in some embodiments, the air tube 70 may vary in diameter or shape. In some embodiments, the intake section 71 may include the portion of the air tube 70 that extends outside of the drum 60. In one embodiment, as shown in FIG. 8, the intake section 71 may extend from about the outlet faceplate 24 to at least the outer surface of the back faceplate 25. At or beyond the outer surface of the back faceplate 25, the air intake 72 may draw in ambient air. For example, in one embodiment, the intake section may draw in air (via a blower) at about 1600 standard cubic feet per minute (SCFM). In other embodiments, other air flow rates may be used as desired. The temperature of the air, pellets, and/or fluid entering the tumbler 10 may impact efficiency of the blower, and the size, shape, arrangement, and air flow rates of the air tube 70 may be tailored to accommodate the temperature(s) to achieve the desired blower efficiency. Further, the air flow may be tailored to accommodate the dimensions (e.g., length, diameter) of the drum 60. The intake section 71 may be cylindrical and sized based on the desired air flow within the air tube 70. In some embodiments, the entire air tube 70 may be removable. In other embodiments, the intake section 81 and the blower section 73 may each be independently removable. It is contemplated that the intake section 71 may be hollow and have thin walls to minimize the weight of the air tube 70 while being strong enough to tolerate the air flow. While air is provided as an exemplary embodiment, any fluid or gas (e.g., nitrogen gas) may be directed through the air tube 70. In some embodiments, the intake section 71 may be constructed from a metal, wood, or hard plastic. In some embodiments, the air tube may include one or more secondary air tubes (not shown) that are configured to introduce air away from the central length axis of the drum. For example, the secondary air tubes may be flexible and downwardly extend from the air tube 70 and have one or more downwardly facing holes configured to direct a flow of air proximate pellets collecting at the bottom of the drum 60. The secondary air tubes may contain a plurality of holes at different height levels within the drum 60 to customize how the flow of air is introduced within the drum 60.

In some embodiments, rather than drawing in ambient air, the intake section 71 may draw in heated air from an attached heater (e.g., an electric, steam, or oil heater), not shown. Alternatively, in other embodiments, a heater may be disposed within the air tube 70 and configured to heat air as is passes into the drum 60. By directing heated air into the drum 60, the air tube 70 may accelerate drying of the pellets. It is also contemplated that conditioned air, such as dehumidified air, could be directed within the air tube 70. Further, in other embodiments, an attached cooling device may cool and provide air or an air mist to help cool the pellets within the tumbler 10.

In other embodiments, the blower section 73 may include the portion of the air tube 70 that extends within the drum 60. In one embodiment, as shown in FIG. 8, the blower section 73 may extend from about the outlet faceplate 25 along about two thirds the length of the drum 60. In other embodiments, the blower section 73 may extend along varying lengths within the drum 60 based on the desired points for introducing air into the drum 60. For example, in some embodiments, to introduce air closer to the inlet end of the drum 60, the blower section 73 may extend further within the drum 60. Similarly, in other embodiments, to introduce the air further away from the inlet end of the drum 60, the blower section 73 may be shorter such that it does not extend as far within the drum 60. As the air tube 70 and, in some embodiments, the intake section 71 and the blower section 73 individually may be removable, it is also contemplated that blower sections 73 of different lengths may be interchangeably used with the tumbler 10. In other embodiments, the blower section 73 may be adjustable in length.

In some embodiments, the blower section 73 may include the apertures 74. For example, in one embodiment, the apertures may be spaced along a bottom portion of the blower section 73 in two lines at about 45° apart from the vertical axis. In other embodiments, the apertures 74 may be lined at other angles relative to each other and to the drum 60. Further, the blower section 73 may be rotatable such that the apertures may be positioned in different locations simply by rotating the blower section 73. In some embodiments, the apertures 74 may be offset from one another. In other embodiments, the apertures 74 may vary in size. For example, the blower section 73 may include three lines of apertures 74 with smaller apertures 74 in a center line at the bottom of the blower section and larger apertures 74 at the 4 o'clock and 8 o'clock positions. By having smaller apertures 74 at the 6 o'clock position, the blower section 73 may direct less air flow straight down, while directing more air flow through the larger apertures 74 towards the sides of the drum 60. Thus, the placement and size of the apertures 74 may be used to tailor the air delivery within the drum 60 based on the desired drying of the pellets.

As shown in FIG. 4, in some embodiments, the housing 20 may include one or more holes 27 configured to allow air to enter or exit the tumbler 10 or to pass between the section of the tumbler 10 housing the drum 60 and the section housing the air intake section 71 of the air tube 70. The holes 27 may provide a safety mechanism if the air intake 72 is closed or if an object disposed within the air tube 70 is blocking air flow.

On the back end of the tumbler 10, the tilting mechanism 80 may be connected to the frame 50 and the housing 20, and configured to change the angle of the drum 60 to control the residence time of the pellets. In some embodiments, the tilting mechanism 80 may be a jack configured to lift or let down one end of the tumbler 10. As shown in FIG. 4 and in more detail in FIG. 17, the tilting mechanism 80 may include an extendable member 82 and two attachment points 84 and 86. The tilting mechanism 80 may be manually adjustable and/or automatically adjustable via an electronic controller (not shown). Further, in some embodiments, an angle indicator (not shown) may be in communication with the tilting mechanism 80 and configured to determine and display the angle of the housing 20 and, in turn, the drum 60. While the tilting mechanism 80 may be configured to change the angle of the drum 60 as desired, the angle may be limited to a predetermined range in some embodiments (e.g., +/−3 degrees). When the angle is too low, the pellets may not be sufficiently directed towards the outlet end of the tumbler 10. When the angle is too great, the pellets may inconsistently flow into a bagging unit downstream of the tumbler 10, which can present problems for the bagging unit, particularly time-based bagging units. It is also contemplated that the tumbler 10 may be tilted at varying degrees based on its intended use. For example, in some embodiments, the tumbler 10 may have a near horizontal tilt when used as a defluidizer. In other embodiments, when the tumbler 10 is used as a coater, the outlet end of the tumbler 10 may be inclined about 3 degrees from the inlet end. To clean the tumbler 10, it may be tilted downwardly to help fluid and pellets exit the outlet end.

Figure 7:
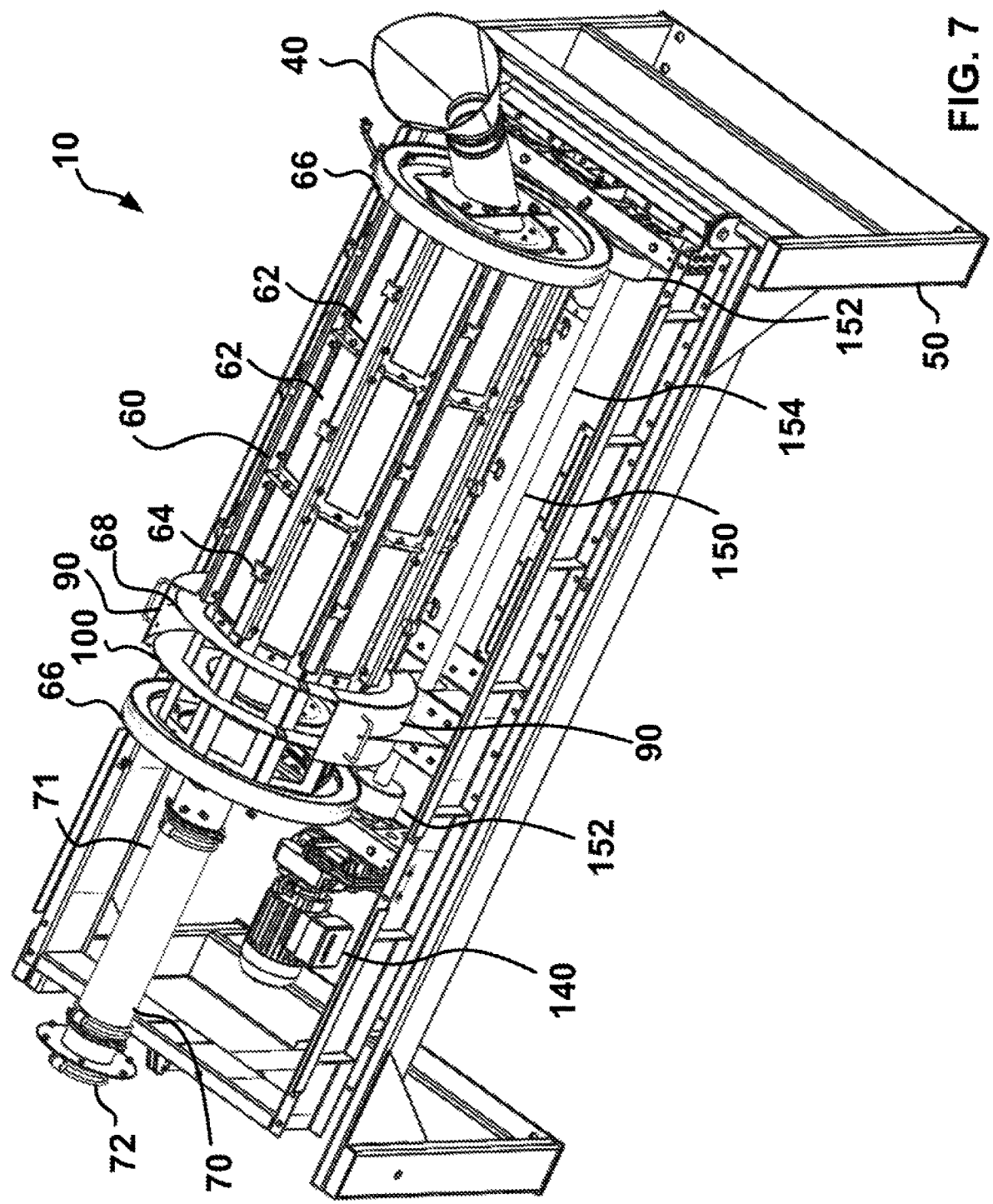
FIG. 7 is a cutaway isometric rear view of a tumbler having its housing and doors removed in accordance with some embodiments of the present disclosure.

In some embodiments, the pellet outlet chute 90 may include one or more ridges 92 and a structural support 94, as shown in FIGS. 4 and 7 and in more detail in FIG. 13. The ridges 92 may extend towards the drum 60 and, at least partially, overlap the ring 68 and the stop ring 100. In some embodiments, the ridges 92 may be positioned to overlap the outside of the ring 68 and the stop ring 100. The ridges 92 may extend along the entire height of the pellet outlet chute 90. In some embodiments, the pellet outlet chute 90 and ridges 92 may be formed as a single piece. The pellet outlet chute 90, the ridges 92, and the structural support 94 may be constructed from a metal, wood, or hard plastic, and be configured to withstand the force of the pellets exiting the drum 60. It is contemplated that the ridges 92 and pellet outlet chute 90 may be shaped to direct pellets towards the pellet outlet 132 in a particular manner. For example, in one embodiment, the pellet outlet chute 90 may be parabolic with the ridges 92 to direct pellets towards a central point as they flow towards the pellet outlet 132 to help prevent pellets from undesirably escaping the sides of the pellet outlet chute 90. In other embodiments, the ridges 92 and the pellet outlet chute 90 may be perpendicular. In the embodiment shown in FIG. 13, the pellet outlet chute 90 and ridges 92 may only partially surround the ring 68 and stop ring 100. However, in some applications, such as drying micropellets, it has been found that pellets may be blown out from above the pellet outlet chute 90. In this case, as shown in FIG. 13a, the pellet outlet chute 90 and ridges 92 may be extended by a pellet chute 91 having additional ridges 93 extending therefrom, which completely surround upper portions of the ring 68 and stop ring 100, to thereby prevent pellet escape therefrom. In some embodiments, the pellet outlet chute 90 and/or the ridges 92 may at least partially overlap with the pellet chute 91 and/or the additional ridges 93 to better prevent pellets escaping therefrom. In further embodiments, a removeable seal (not shown) may be used to seal the connection between the pellet outlet chute 90 and ridges 92 with the pellet chute 91 and additional ridges 93.

Figure 5:
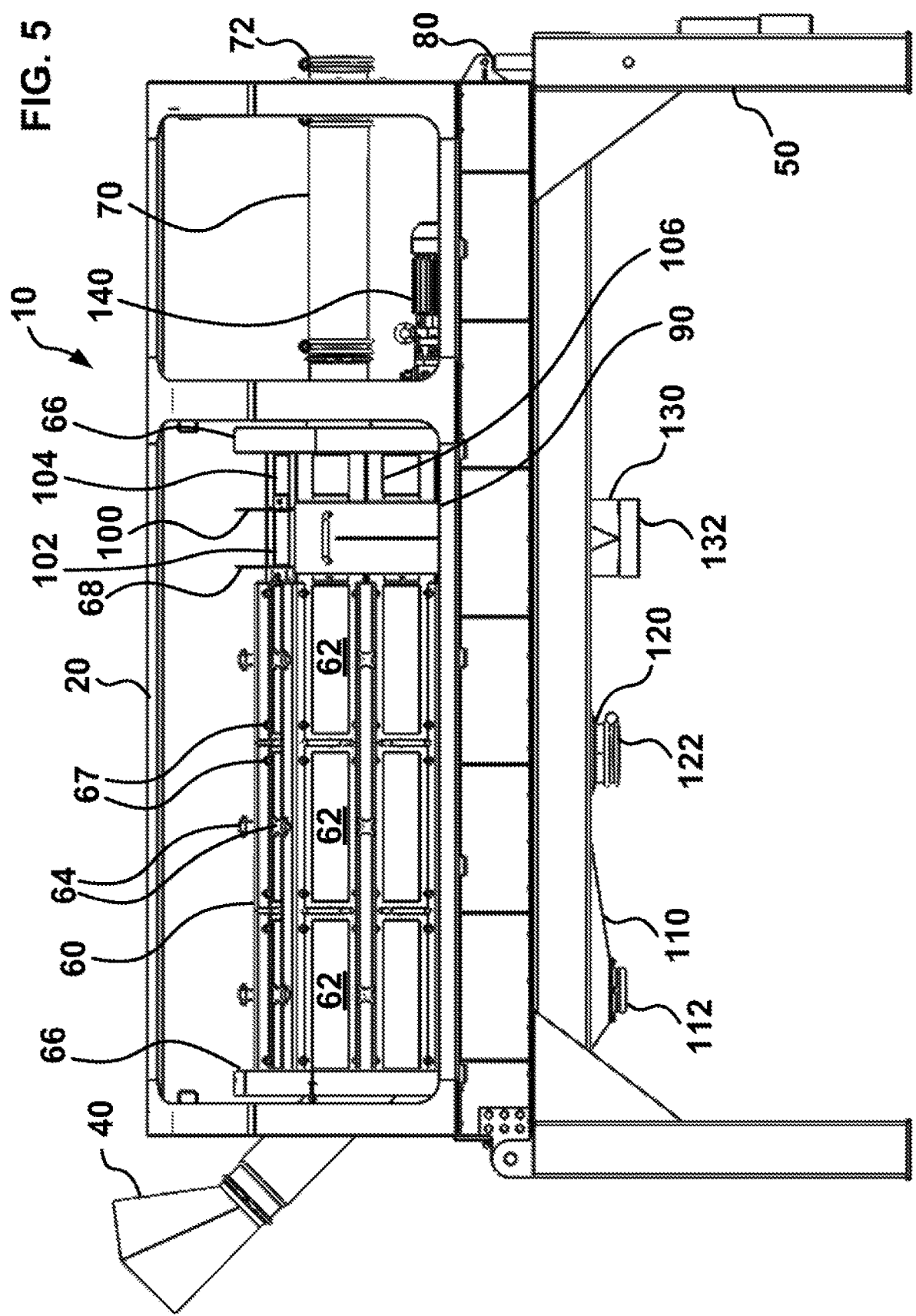
FIG. 5 is a cutaway side view of a tumbler having its doors removed and a rotatable drum in accordance with some embodiments of the present disclosure.
Figure 6:
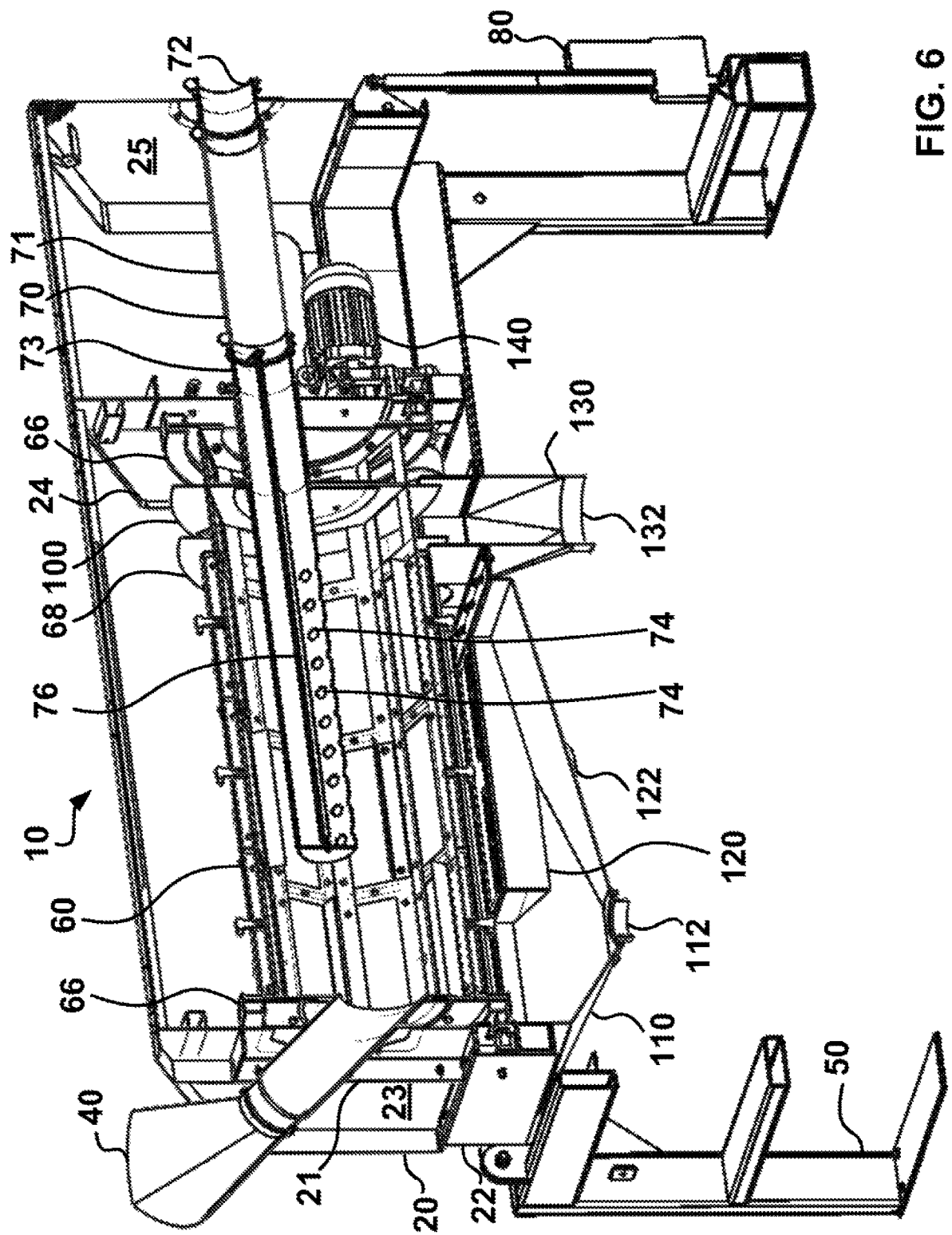
FIG. 6 provides an isometric front cross-sectional view of a tumbler having an air tube disposed within its drum in accordance with some embodiments of the present disclosure.

FIGS. 5, 6, and 8 show a side view and cross-sectional isometric and side views of an embodiment of the tumbler 10. As shown, the tumbler 10 may include the housing 20, the slurry inlet chute 40, the frame 50, the drum 60, the air tube 70, the tilt mechanism 80, the pellet outlet chute 90, a fluid pan 110, an air outlet duct 120, a pellet outlet conduit 130, and a motor 140. The drum 60 may have a plurality of screens 62, knobs 64, drum wheels 66, connectors 67, ring 68, stop ring 100, openings 102 and 104, and frame members 106. The fluid pan 110 may collect and direct fluid that exits the drum 60 to a fluid outlet 112. The air outlet duct 120 may collect and direct air that exits the drum 60 to an air outlet 122. The pellet outlet conduit 130 may transport pellets exiting the drum 60 via the pellet exit chute 90 to a pellet outlet 132. The motor 140 may be the power source configured to drive the rotation of the drum 60 and/or operate one or more blowers (not shown) that suction air into the air tube 70 and into the air outlet duct 120.

The fluid pan 110, as shown in FIGS. 5 and 6, may be shaped, sized, and positioned to collect fluid exiting the drum 60. In some embodiments, the fluid pan 110 may decline, at least slightly, towards the fluid outlet 112 to direct the fluid towards the fluid outlet 112. The fluid pan 110 may be constructed from a metal, wood, or hard plastic.

In some embodiments, the air outlet duct 120 may be shaped, sized, and positioned to suction air from inside of the drum 60 through the screens 62. In some embodiments, the air outlet duct 120 may be positioned below the drum 60. In other embodiments, the air outlet duct 120 may extend, at least partially around the sides of the drum 60 to suction air from the sides of the drum 60 as opposed to or in addition to suctioning air from the bottom of the drum 60. By controlling where the air is introduced into the drum 60 via the length of the blower section 71 and the positions of the apertures 74 and where the air is suctioned out of the drum 60 via the placement of the air outlet duct 120, the air flows into and out of the drum 60 and their effect on removing fluid from the pellets may also be controlled. It is contemplated that the volume of air suctioned from the drum 60 can be any volume that efficiently allows for the drying of the pellets passing through drum 60. For example, in some embodiments, the air suction duct 120 may suction air (via a blower) at about 1600 SCFM. In other embodiments, any flow rate up to 1600 SCFM, or even greater than 1600 SCFM, may be used, depending on the application. For example, for larger and/or denser materials, higher air flow rates may be advantageous (e.g., to adequately move or efficiently/effectively dry the materials), while lower air flow rates may be advantageous for smaller and/or less dense materials (e.g., to prevent damage or inefficient/ineffective drying of the materials). It is contemplated that the air outlet duct 120 may be constructed from a metal, wood, or hard plastic, and configured to withstand the force of the suctioned air exiting the drum 60. In one embodiment, the air outlet duct 120 may be constructed from rolled sheet metal to limit its weight.

In other embodiments, the pellet outlet conduit 130 may be conically shaped and attach to the pellet outlet chute 90 to receive pellets exiting the drum 60. In other embodiments, the pellet outlet conduit 130 may be cylindrical or another shape as needed based on space requirements and configured to transport the pellets from the pellet outlet chute 90 to the pellet outlet 132. The pellet outlet conduit 130 may be constructed from a metal, wood, or hard plastic, and configured to withstand the force of the pellets exiting the pellet outlet chute 90.

The motor 140, which is more clearly shown in FIGS. 7 and 8, may be housed within the tumbler 10. In some embodiments, the motor 140 may be housed in between the outlet faceplate 24 and the rear faceplate 25. It is contemplated, however, that the motor 140 may be located on either side (e.g., inlet or outlet) of the tumbler 10. The motor 140 may be any device configured to generate mechanical power. For example, in some embodiments, the motor 140 may be an electric motor configured to convert electricity into mechanical motion. In other embodiments, the motor 140 may be an engine or a hydraulic motor. In one embodiment, the motor 140 may include a gear box.

Figure 14:
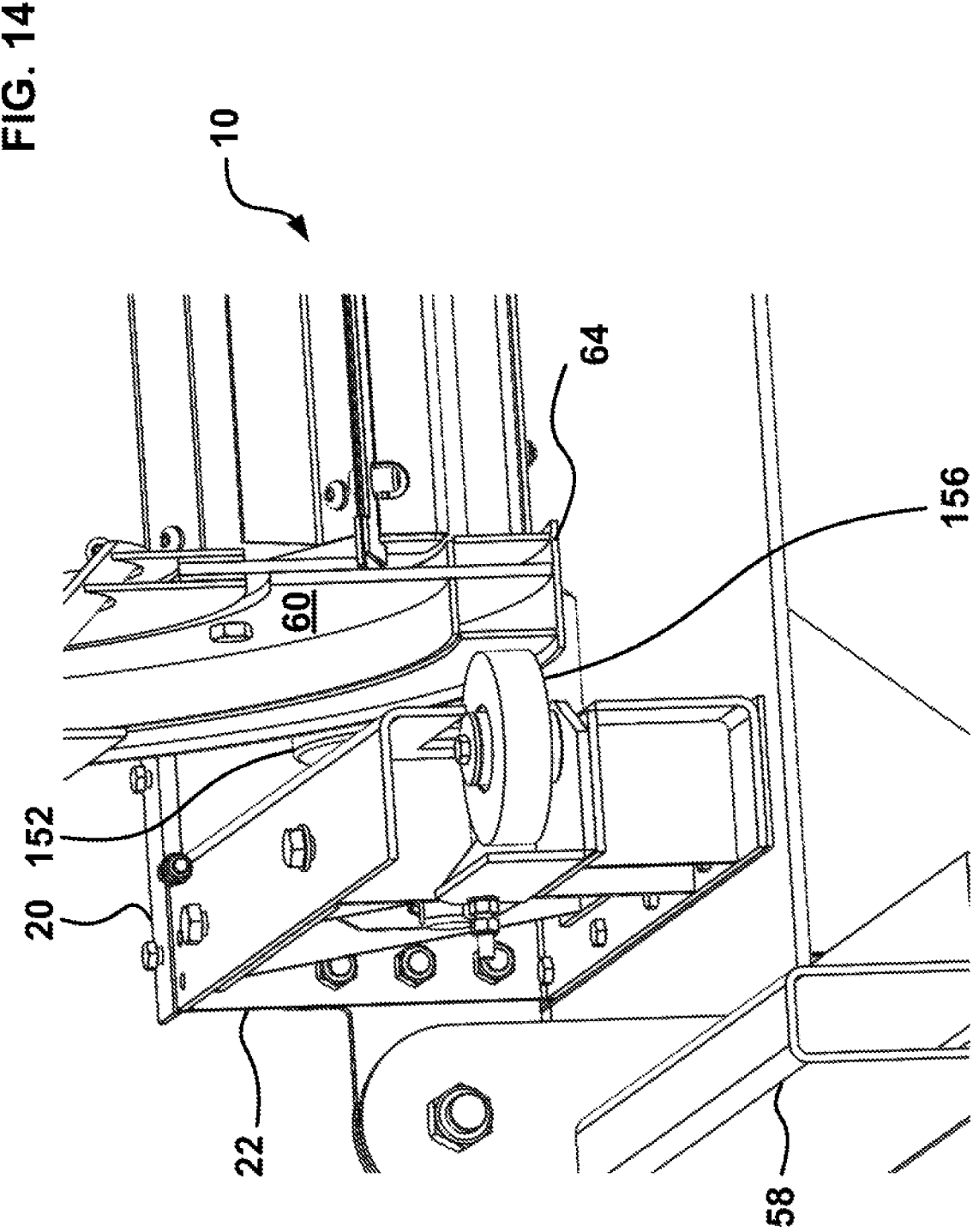
FIG. 14 shows an isometric view of a rotating wheel for a tumbler in accordance with some embodiments of the present disclosure.

Extending from the motor 140 in FIG. 7, a driveshaft 150 may include one or more rollers 152 connected via a shaft 154. These rollers 152 may collectively support and rotate the drum wheels 66, as shown in FIGS. 13 and 14. As shown, the motor 140 may connect to and drive the driveshaft 150 and, in turn, rotate the drum 60. Optionally, in some embodiments, additional belts may be used such that the motor 140 drives multiple rollers 152. In some embodiments, the rollers 152 may be rolled sheet metal to limit their weight, though other materials may be used. The rollers 152 may be cylindrical and have smooth outer surfaces. The diameter of the rollers 152 may vary based on the desired rotational speed of the drum 60, the force output and desired efficiency of the motor 140, and the available space within the tumbler 10. The shaft 154 may be cylindrical and have a smaller diameter than the rollers 152 in some embodiments. In some embodiments, the shaft 154 may be a hollow shaft to decrease its weight. The driveshaft 150 may be constructed from any metal, wood, or plastic. For example, in some embodiments, the driveshaft 150 may be constructed from stainless steel, carbon steel, and/or aluminum.

In one embodiment, the tumbler 10 may also include one or more idler rollers 156 to keep the drum 60 in place axially during rotation, as shown more clearly in FIG. 14. By using the idler rollers 156, the tumbler 10 may maintain the position of the drum 60 regardless of the tilt. In some embodiments, the idler rollers 156 may be cylindrical and constructed from a metal, wood, or hard plastic. In other embodiments, the idler rollers 156 may be spherical and configured to operate as bearings allowing for limited movement of the drum 60 in multiple directions. The drum 60 may be held in place solely by the rollers 152 and the idler rollers 156, making the drum 60 easily removable for transportation, repair, or replacement.

In some embodiments, the drum wheels 66 may be placed away from the slurry and/or powders. By spacing the drum wheels 66 away from the pellets, moisture, and powders, the life of the drum wheels 66 may be extended. Additionally, the placement of the drum wheels 66 away from the powders may help keep the powders from interfering with movement of the drum wheels (e.g., by building up between the drum wheels 66 and the rollers 152 and idler rollers 156). In some embodiments, the idler rollers may be rolled sheet metal to limit their weight, though other materials may be used.

The disclosed tumbler 10 may be applicable to any defluidizing (e.g., dewatering), drying, coating, classifying, or dynamic filtering process. For example, in some embodiments, the tumbler 10 may be used as a defluidizer to remove the bulk of the fluid from pellets.

Using the tumbler 10 as a defluidizer may be advantageous over using other defluidizers and dryers (e.g., a centrifugal dryer), which may be too rough and damage the pellets or ineffective at sufficiently defluidizing the pellets. This may be particularly important when the pellets are a brittle material. In one embodiment, the tumbler 10 may be configured to remove between about 75% to about 99% of fluid from the pellets. In another embodiment, the tumbler 10 may be configured to remove about 98% of fluid from the pellets. To remove this fluid, the slurry inlet chute 40 may receive a slurry of pellets and fluid from an upstream device (e.g., a pelletizer). The funnel 42 may catch and direct the slurry to the drum 60 via the conduit 44. Upon entering the drum 60, the fluid may exit the drum upstream of the pellet exit chute 90 via apertures in the perforated wire mesh section 63 of the screens 62. In one embodiment, the screens 62 may be positioned along the length of the drum 60 from at least the inlet end of the drum 60 to the pellet outlet chute 90. In other embodiments, one or more non-perforated screens 62 may be used and configured to not pass the pellets or the fluid. The non-perforated screens 62 may be alternatingly used with perforated screens 62 along a single cross-section of the drum 60, or non-perforated screens 62 may be used for an entire cross-section of the drum 60 while perforated screens 62 are used for another cross-section of the drum 60. In some embodiments, non-perforated screens may be used throughout the entire drum, for example when no drying is needed, but coating or other conditioning of the materials is intended. In further embodiments, screens 62 having different sized apertures may be used, for example, to help filter out smaller pellets and/or debris along with the fluid. The fluid that exits the drum 60 may collect in the fluid pan 110 and exit the tumbler 10 via the fluid outlet 112.

As the fluid, or at least a portion thereof, exits the drum 60 via the screens 62, the pellets may continue to travel along the length of the drum 60 until they reach the openings 102 at the pellet outlet chute 90. The pellets may bounce around or otherwise move through the drum 60 due to the force of the slurry entering the drum 60 and the rotation and/or tilt of the drum 60. Additionally, in some embodiments, the blower section 73 of the air tube 70 may release a flow of air from within the drum 60 via the apertures 74. This air being blown into the drum 60 may be suctioned through the screens 62 and into the air intake duct 120, forcing the air to pass through the screens 62 and pull moisture away from the pellets. In some embodiments, the air tube 70 may house the blower member 76 having lights 79, and the lights 79 may illuminate the drum 60 through the apertures 74. In other embodiments, the lights 79 may be positioned elsewhere (e.g., on the outside of the air tube 70, on the inside of the faceplates 23 or 24, or on the inside of the screens 62 or the frame members 106). Illuminating the inside of the drum 60 may be advantageous because it allows an operator to see the pellet flow within the drum 60 and confirm that the tumbler 10 is operating as desired.

To control the manner in which the pellets are defluidized, the tumbler 10 may be customized in several ways. For example, the apertures 74 may be positioned in a variety of ways on the air tube 70, thereby directing the air flow as desired. Additionally, the force of the air being directed into the drum 60 via the air tube 70 and/or the force of the air being suctioned out of the drum 60 and into the air outlet duct 120 may be adjusted to create the desired level of air flow against the pellets. In this manner, the flow of air may be used to help defluidize the pellets in lieu of mechanically driving the pellets (e.g., via a rotor in a centrifugal dryer), which may be too rough on the pellets. Further, in another example, the tilt of the drum 60 may change, thereby lengthening or shortening the residence time of the pellets within the drum 60.

After the pellets reach the pellet outlet chute 90, they may be directed to the pellet outlet 132 via the pellet outlet conduit 130, and delivered to a downstream device (e.g., another tumbler used as a second dryer or a coater, a bagging assembly, etc.). To prevent the pellets from undesirably exiting the drum 60 before reaching the pellet outlet 132, the ridges 92 of the pellet outlet chute 90 may, at least partially, wrap around the ring 68 and stop ring 100, which extend from the exterior of the drum 60. In this manner, the ring 68, stop ring 100, and ridges 92 may overlap one another to prevent pellets from escaping from the sides of the pellet outlet chute 90. In some embodiments, multiple rings 68 may be used to decrease the spacing between each ring 68, 100, thereby decreasing the likelihood of pellets undesirably escaping the pellet outlet chute 90.

During operation of the tumbler 10, the drum 60 may be configured to rotate along its longitudinal axis in a clockwise and/or counter-clockwise direction. The motor 140 may rotate the driveshaft 150 and its rollers 152, which in turn cause the drum wheels 66 to rotate. In some embodiments, the drum 60 may be configured to rotate in a single direction (e.g., clockwise or counter-clockwise). In other embodiments, the drum 60 may be configured to rotate in multiple directions, either randomly or in accordance with a predetermined pattern. Additionally, in other embodiments, the rotation speed of the drum 60 may vary based on a number of factors (e.g., the direction of rotation, air flow rate within the tube 70, the material of the pellets, the type of fluid, a measured moisture level on the pellets exiting the pellet outlet 132, etc.) or be fixed. For example, the rotation speed of the drum 60 may be fixed based on preset settings of the motor 140. As the drum wheels 66 and driven to rotate by the rollers 152, the idler rollers 156 may maintain the axial position of the drum 60 regardless of the tilt of the drum 60.

Figure 26:
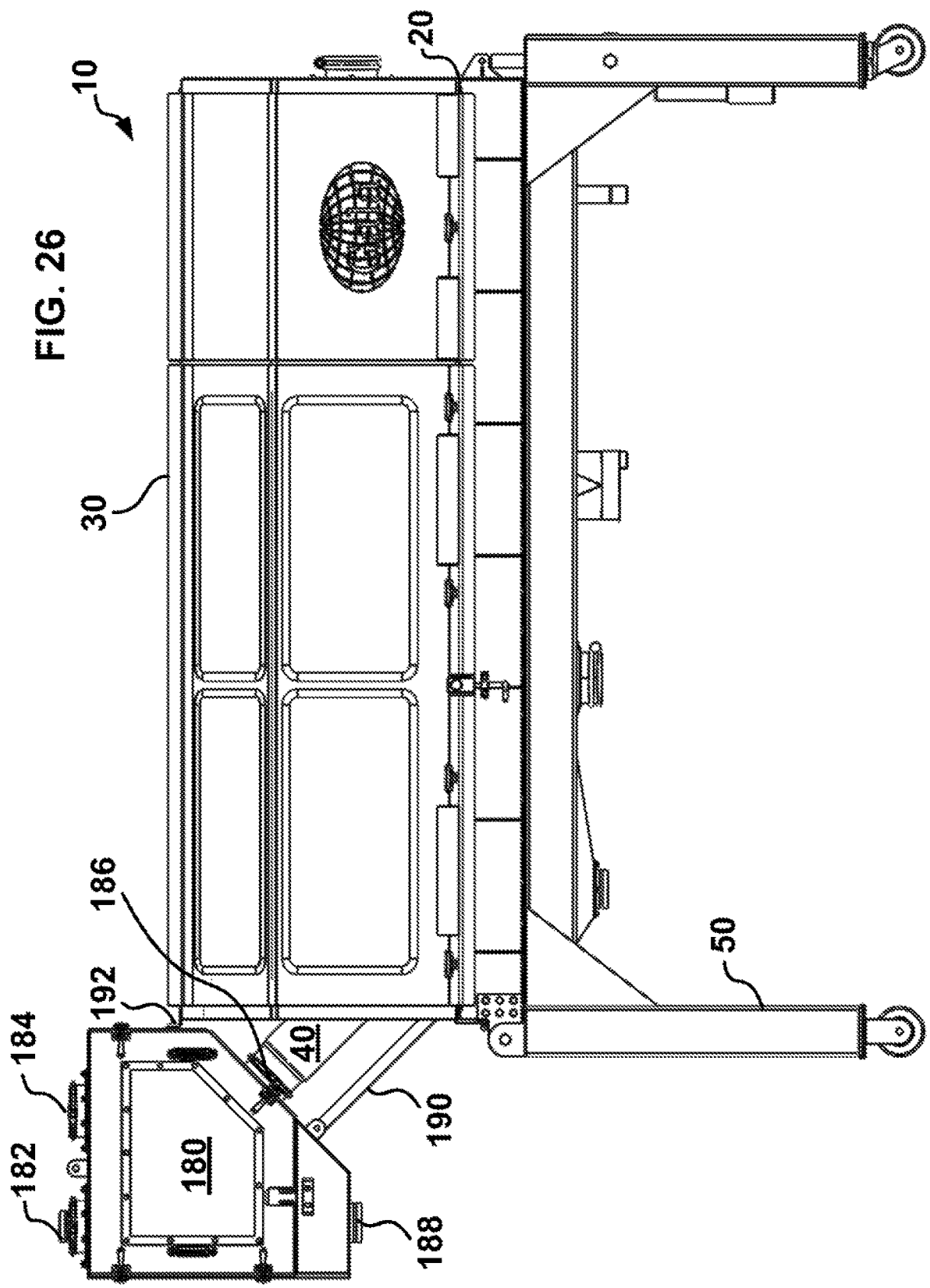
FIG. 26 shows a side view of a tumbler having a dewaterer in accordance with some embodiments of the present disclosure.
Figure 27:
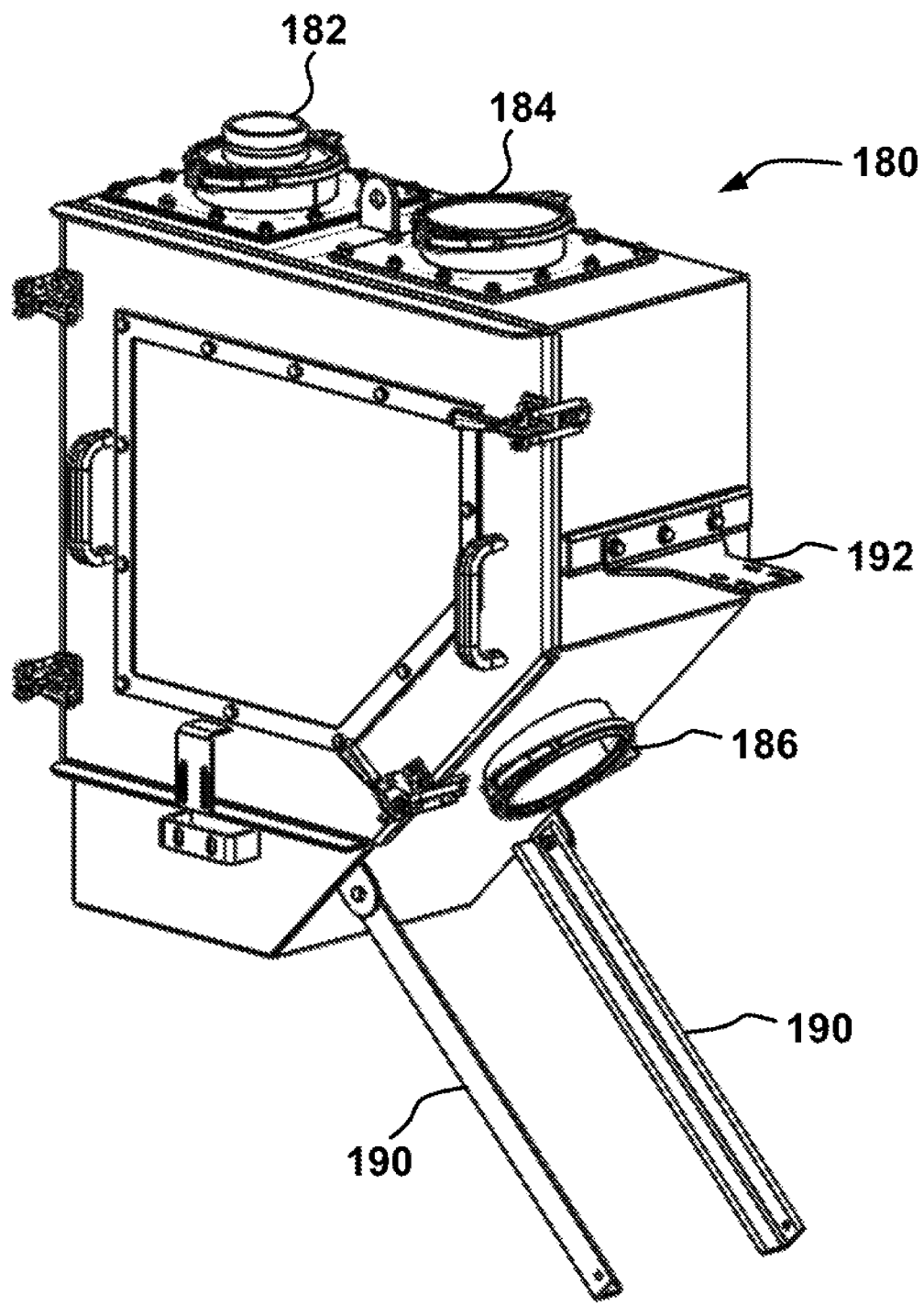
FIG. 27 is an isometric view of a dewaterer in accordance with some embodiments of the present disclosure.

In some embodiments, a dewaterer 180 may be used upstream of the tumbler 10, as shown in FIG. 26. The dewaterer 180 may be attachable to the housing 20 of the tumbler 10 and configured to remove fluid (e.g., water) from the pellet slurry as it enters the pellet inlet chute 40. Shown in more detail in FIGS. 27-30, the dewaterer 180 may include one or more inlets pellet slurry 182, 184, one or more conduits 183, 185, a pellet slurry outlet 186, a fluid outlet 188, one or more attachment arms 190, and an upper attachment 192. In practice, the dewaterer 180 may be configured to remove about 75% to about 99% of the fluid from the pellet slurry, while the tumbler 10 removes at least a portion of the remaining about 1% to about 25% of moisture. The dewaterer 180 may be constructed from any metal, wood, or plastic. For example, in some embodiments, the dewaterer 180 may be constructed from stainless steel, carbon steel, or aluminum.

Figure 28:
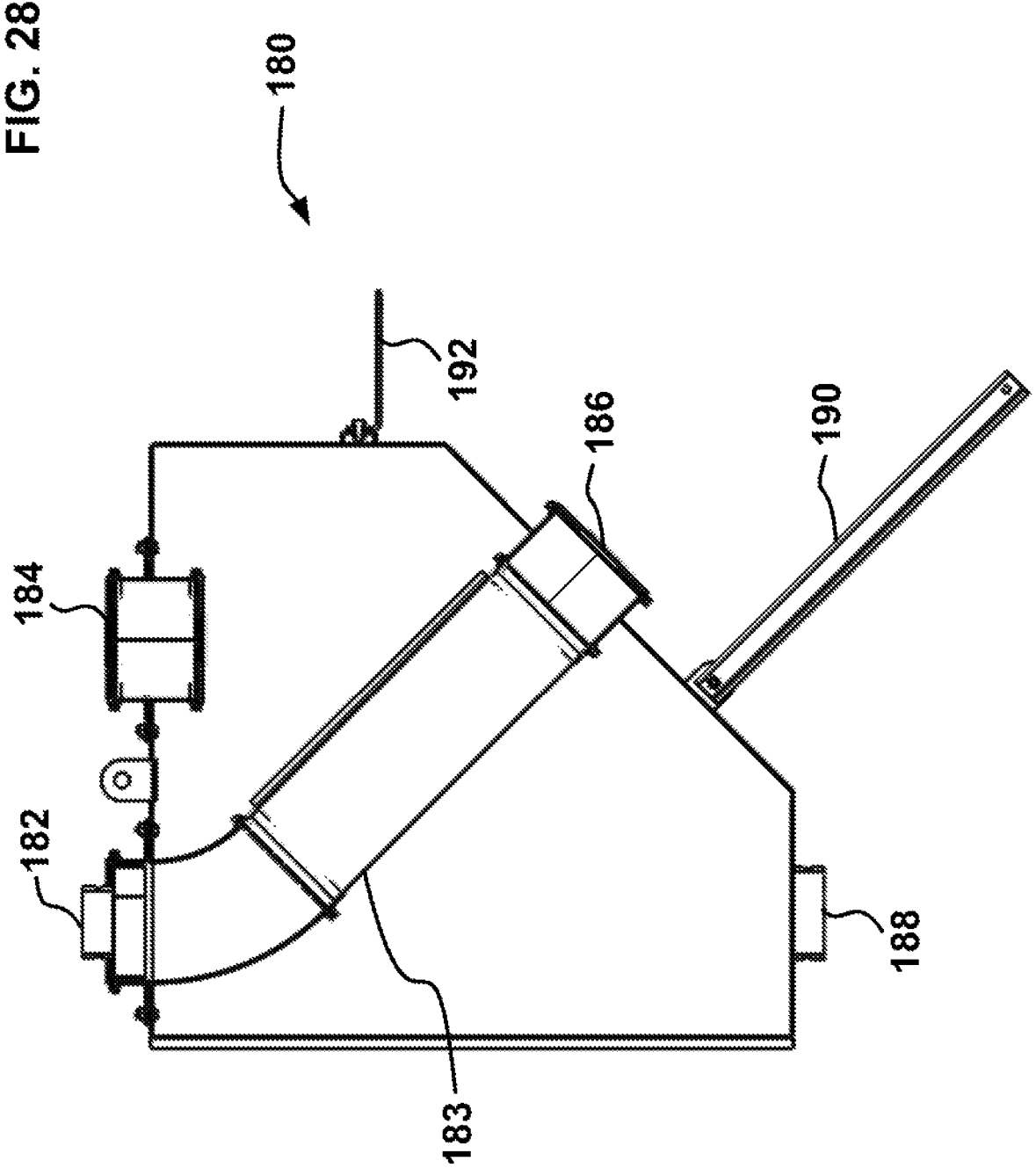
FIG. 28 is a section view of a dewaterer having an angled conduit in accordance with some embodiments of the present disclosure.
Figure 29:
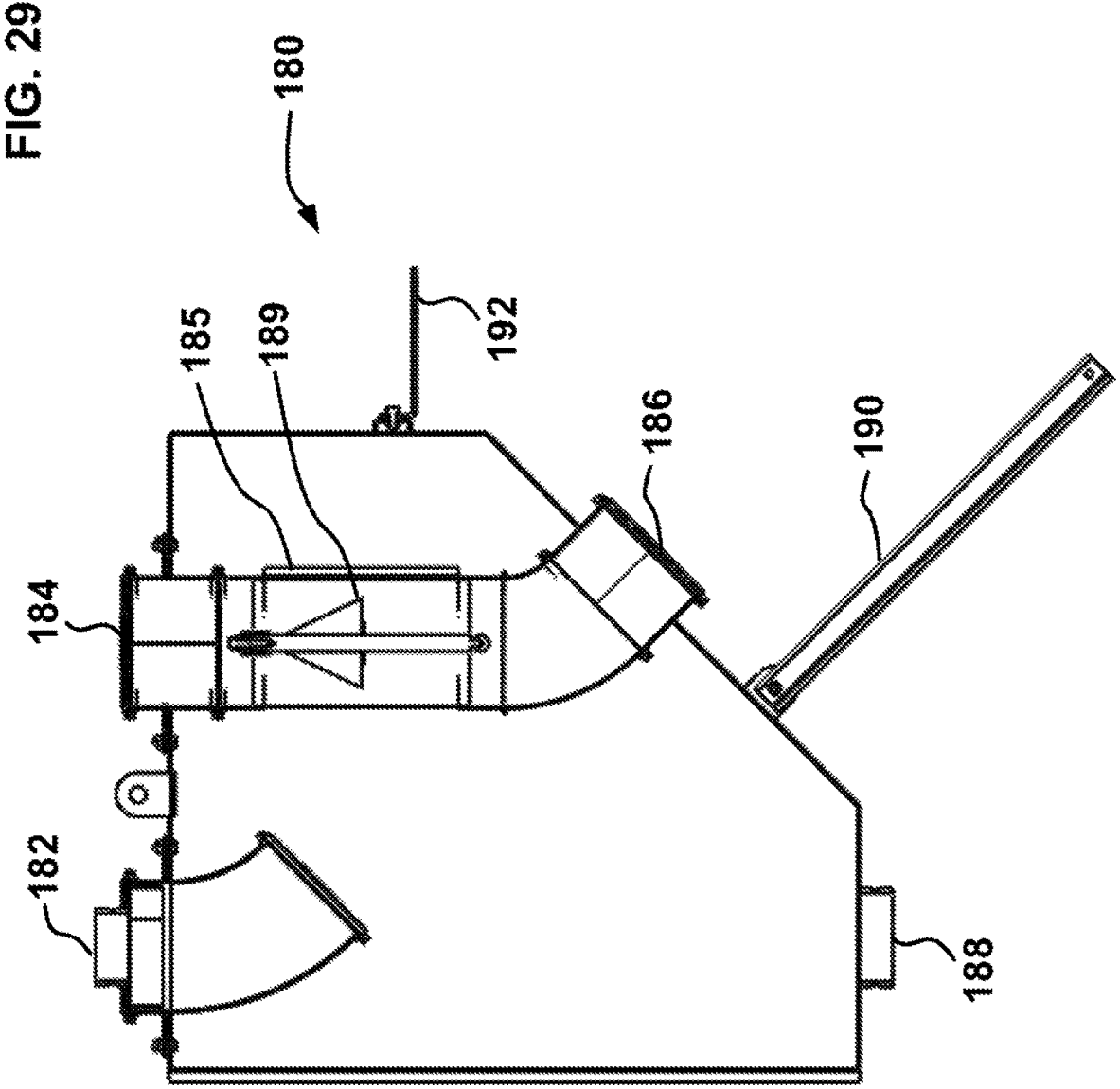
FIG. 29 is a section view of a dewaterer having a deflector in accordance with some embodiments of the present disclosure.
Figure 30:
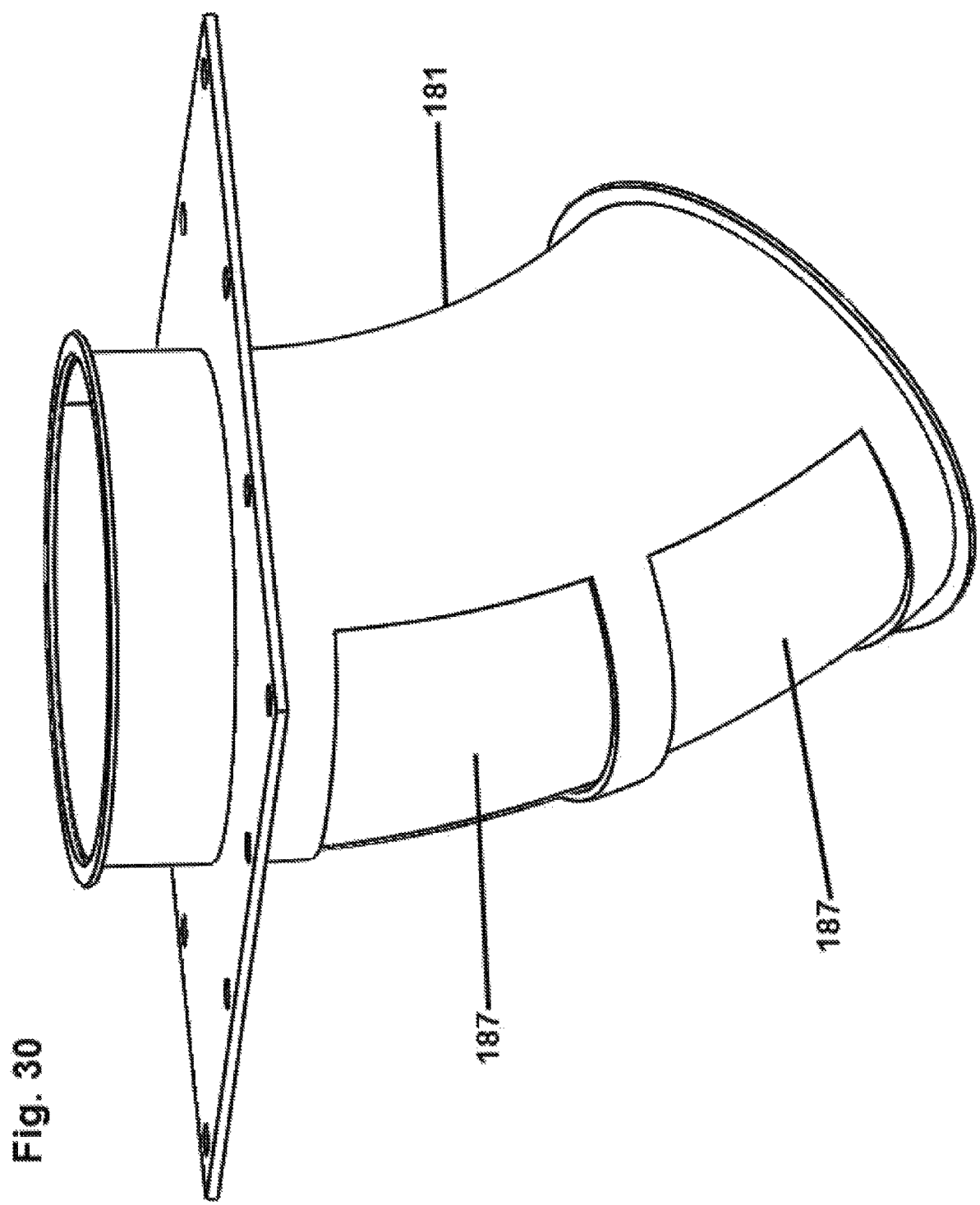
FIG. 30 is an isometric view of a dewaterer element in accordance with some embodiments of the present disclosure.

One or more of the pellet slurry inlets 182, 184 may receive a pellet slurry from an upstream device (e.g., a pelletizer or a dryer). The conduits 183, 185 may then transport the pellets slurry through the dewaterer 180, and direct the defluidized pellet slurry out the pellet slurry outlet 180 and at least a portion of the fluid of the pellet slurry out of the fluid outlet 188. To allow fluid to escape, each conduit 183, 185 may include one or more screens or apertures along its surface to allow fluid to pass through it while containing the pellets. In one embodiment, as shown in FIG. 28, the conduit 183 may be angled from the pellet slurry inlet 182 proximate the top and front of the dewaterer 180 to the pellet slurry outlet 186 proximate the bottom and rear of the dewaterer to allow the fluid to pass downwardly under the force of gravity, while directing pellets toward the pellet slurry outlet 186. An elbow 181 may be connected to the inlet 182 and the conduit 183 and used to effect the change in angle of slurry flow from vertical at the inlet 182 to angled at the outlet 186. Elbow 181 may have one or more screened sections 187 on its outer radius to allow defluidizing of the pellet slurry, as shown in FIG. 30, or alternatively, may be composed of screen material in its entirety. In another embodiment, as shown in FIG. 29, the conduit 185 may include a vertical screened section housing a deflector 189. As the pellet slurry enters the pellet slurry inlet 184, it falls until being deflected by the deflector 189 against the screened walls. After contacting the walls, at least a portion of the fluid escapes the conduit 185 and is collected at the fluid outlet 188, while the pellets are contained within the conduit 185 and directed to the pellet slurry outlet 186. In some embodiments, the deflector 189 may form an isosceles or primary triangle in one or more cross-sections and be positioned to evenly deflect the pellet slurry to the wall(s) of the conduit 185. In other embodiments, the deflector 189 may take on other shapes or sizes as desired. The fluid outlet 188 may be configured to direct fluid to the fluid outlet 112 exiting the tumbler 10 or at another downstream location.

The attachment arms 190 and upper attachment 192 may connect the dewaterer 180 to the tumbler 10 in the desired manner, as shown in FIG. 26. For example, in one embodiment, the dewaterer 180 may be positioned at least partially above and at least partially in front of the tumbler 10, thereby allow linear and gravity-induced flow of the pellet slurry into the tumbler 10. In other embodiments, the attachment arms 190, the upper attachment 192, and other attachment members as needed may be used to position the dewaterer 180 in other arrangements as desired.

It is contemplated that one or more controllers (not shown), which may be computerized controllers having one or more processors, may automatically control operation of one or more components within the tumbler 10. For example, one or more sensors (not shown) may measure the moisture level on pellets exiting the pellet outlet 132 and communicate the measured moisture level to the controller. When the controller determines that the moisture level exceeds a threshold, it may direct one of the components of the tumbler 10 to perform differently. In one embodiment, the controller may direct the tilt mechanism 80 to change the angle of the drum 60, thereby increasing or decreasing the residence time of the pellets. In another embodiment, the controller may direct the motor 140 to change the rotation speed or rotational direction of the drum 60. In another embodiment, the controller may direct the blower(s) directing air through the air tube 70 and/or suctioning air out of the drum 60 and into the air outlet duct 120 to increase or decrease the air flow rate.

The controller may also automatically control the opening and closing of the doors 30 based on an operation mode of the tumbler 10. For example, the controller may direct the doors 30 to close when the motor 140 begins to rotate the drum 60. The controller may direct the doors to open, for example, when the motor 140 is not rotating the drum 60.

In some embodiments, the controller may automate control of one or more features (e.g., tilt angle, spin speed, blower operation, etc.) the tumbler 10. For example, the controller may be in communication with one or more moisture sensors configured to determine the level of moisture at a certain area (e.g., in the pellet outlet conduit 130). In response to receiving a signal from the moisture sensors that the moisture level exceeds a predetermined threshold, the controller may control the tumbler 10 to increase or decrease the moisture level within the tumbler 10 as desired. In some embodiments, the controller may direct the tilt mechanism 80 to increase or decrease the tilt angle of the tumbler 10. In other embodiments, the controller may direct the blower to increase or decrease the air flow rate within the air tube 70. In further embodiments, the controller may direct the motor 140 to increase or decrease the rotation speed of the drum 60.

The controller may be in communication with other sensors to improve operation of the tumbler 10. For example, in some embodiments, one or more flow sensors may measure the pellet flow and/or fluid flow within or exiting the tumbler 10. The controller may control features of the tumbler 10 to achieve a more consistent pellet flow exiting the tumbler 10. Further, the controller may detect blockages within the tumbler 10 disrupting pellet, fluid, or air flow and shut down operation of one or more of the features of the tumbler 10. In other embodiments, the controller may send an alert to an operator (e.g., to a display in communication with the controller or to an operator's mobile phone, computer, or other device via a wireless or wired communication) upon detecting a blockage within the tumbler 10. In other embodiments, the flow sensors may measure the amount of pellets exiting the tumbler 10, which the controller than provide to the operator (e.g., via the display). In further embodiments, the controller may be in communication with flow sensors at the pellet inlet chute 40 and the pellet outlet conduit 130, and configured to compare the measured flow of pellets at each point. When the difference between the measured flow of pellets at the inlet and outlet exceed a predetermined threshold, the controller may shut down operation of the tumbler 10 or alert the operator to a clog or leak. In this manner, the controller may help the operator identify and remove clogs of pellets while they are small, thereby minimizing wasted product and lost machine time.

In other embodiments, the controller may be in communication with one or more thermal sensors configured to measure the temperature at a certain area of the tumbler 10. For example, the thermal sensors may measure the temperature of pellets, fluid, or air entering the tumbler and send a signal indicating the measured temperature to the controller. In response to the signal, the controller may direct the heater or cooling device to increase or decrease the temperature of air entering the tumbler 10. In other embodiments, the thermal sensors may measure the temperature of pellets exiting the pellet outlet conduit 130. If the temperature of the pellets exiting the tumbler 10 exceeds a predetermined threshold, the controller may control one or more features (e.g., direct the heater or cooling device to change the air temperature) of the tumbler 10. Alternatively or additionally, the controller may send an alert to the operator (e.g., to a display in communication with the controller or to an operator's mobile phone, computer, or other device via a wireless or wired communication).

In further embodiments, the controller may be in communication with one or more hazardous material sensors configured to measure the level of hazardous material within or exiting the tumbler 10. For example, when working with hazardous pellets or fluids, the hazardous material sensors may be disposed outside of the drum 60 and within the housing 20 to measure the level of hazardous material escaping the drum 60. In other embodiments, the hazardous material sensors may be disposed outside of the housing 20 to measure the level of hazardous material escaping the tumbler 10. The controller may receive signal(s) from these sensors, and shut down operation of the tumbler 10 and/or alert the operator when levels of hazardous material(s) exceed a predetermined threshold.

In other embodiments, the controller may be in communication with one or more static electricity sensors configured to measure the level of static electricity built up at certain points on the tumbler 10. In this manner, the controller may determine whether the static dissipation brush 29 or other static dissipation device is sufficient to dissipate the static electricity accrued by the tumbler 10, and serve as a safety mechanism to prevent the operator from undesired shocks. When the controller receives a signal from these sensors that the level of static electricity exceeds a predetermined threshold, the controller may respond by shutting down operation of the tumbler 10 and/or alerting the operator.

It is contemplated that, in conjunction with various sensors, the controller may configure the tumbler 10 for one or more modes of operation. In some embodiments, the controller may store the modes of operation on memory, and allow the operator to select a desired mode of operation via the display or another device in communication with the controller. The modes of operation may be directed to different pellet materials, sizes, or shapes, fluids, fluid volume, air/gases, and air flow rate. For example, in one embodiment when using micropellets of a specified plastic, the operator may select a mode of operation configured to handle micropellets of the specific plastic. In response, the controller may direct the motor 140 to spin the drum 60 at a predetermined rotation rate, direct the tilt mechanism 80 to tilt the tumbler 10 at a predetermined angle, direct the blower to direct air through the air tube 70 at a predetermined flow rate, and/or direct the heater or cooling device to heat or cool the air temperature to a predetermined level. The predetermined rotation rate, tilt, air flow rate, and air temperature (or other features of the tumbler 10) may vary for each mode of operation to allow for custom handling of the pellets. For example, tacky pellets may be handled with higher rotation rates than brittle materials.

In addition to the lights 79 illuminating the inside of the drum 60, the windows 36 of the drum door 32 may also advantageously improve visibility of pellet flow within the drum 60 while still shielding the immediate area from sprays and preventing contamination of the pellets. The windows may be arranged based on the position of the tumbler 10 in relation to the operator and/or the position of the drum 60 within the tumbler 10 to increase visibility of the drum 60. In some embodiments, the controller may direct the lights to turn on or off to improve visibility within the tumbler 10.

The tumbler 10 may be configured for different applications, which may be included as modes of operation controlled via the controller. In other embodiments, the tumbler 10 may be used to dry and/or coat defluidized pellets, which have been defluidized by an upstream tumbler or another defluidizer. For example, in one embodiment, the tumbler 10 may be configured to dry the pellets by removing the remaining between about 1% to about 15% of fluid from the pellets. In another embodiment, the tumbler 10 may be configured to remove the remaining about 2% of fluid from the pellets (e.g., after defluidizing the pellets by removing about 98% of the fluid). To dry the pellets, the slurry inlet chute 40 may receive the defluidized pellets rather than a slurry of pellets and fluid. As the pellets move through the drum 60, moisture on the pellets may be removed and exit the drum 60 before the pellets reach the pellet outlet chute 90. To coat the pellets with a powder (e.g., a powder that will help prevent the pellets from adhering to one another or to the tumbler 10 or to help the pellets dry), the tumbler 10 may include a powder feeder (not shown) as part of the slurry inlet chute 40. In one embodiment, the powder feeder may coat the pellets as they enter the slurry inlet chute 40 and before they enter the drum 60. In another embodiment, the powder feeder may release powder into the drum 60, and the pellets may be coated in the powder as they move within the drum 60. It may be advantageous to include one or more non-perforated screens for at least a portion of the drum 60 to prevent powder from prematurely exiting the drum 60 via the perforations before sufficiently coating the pellets. Further, in some embodiments, the tumbler 10 may include a powder pan (not shown), which may take the place of the fluid pan 110, to collect powder that exits the screens 62 for disposal or re-use.

In some embodiments, the tumbler 10 may be used to classify pellets of different sizes. As previously described, the drum 60 may include perforated screens 62 having differently sized apertures. For example, the drum 60 may be configured such that the pellets first contact screens 62 with the smallest apertures upon entering the drum 60 before contacting screens 62 with larger apertures. In this manner, smaller pellets, debris, and/or powders may be classified by size and/or shape and collected in pans or outlets positioned under the corresponding screens 62.

In further embodiments, the tumbler 10 may be used to dynamically filter a fluid (e.g., water). For example, in one embodiment, the slurry inlet chute 40 may receive a flow of fluid, which then travels through the drum 60 to the pellet outlet 132. The screens 62 may have very small apertures that allow filtered fluid to pass through and prevent debris, minerals, and other solids from passing through. The fluid pan 112 may collected the filtered fluid and direct it out of the fluid outlet 112. It is contemplated the that fluid may be filtered several times (e.g. run through the tumbler 10 multiple times, run through multiple tumblers 10, run through the tumbler 10 and other filtration devices, etc.). In one embodiment, the fluid used in the slurry containing pellets may first be filtered via the tumbler 10 being used as a dynamic filter before the slurry is directed to another tumbler 10 being used as a defluidizer.

In other embodiments, the tumbler 10 may be used as a washer (either of pellets/foreign objects or of itself). For example, in one embodiment, the blower may direct air or another fluid (e.g., a cleaning fluid) through the air tube 70 at a high flow rate. In some embodiments, the air tube 70 may include one or more spray nozzles (not shown) for directing the air or fluid to clean certain areas within the tumbler. The baffles 61 may serve as agitators to help make the air or fluid more effective at cleaning the tumbler 10. In some embodiments, the baffles 61 or other components within the drum 60 may be configured to vibrate to help agitate objects and debris within the tumbler 10. For example, the baffles 61 may be connected to one or more battery packs or other power devices and directed to vibrate by the controller when the tumbler 10 enters a cleaning mode.

In other embodiments, the tumbler 10 may be used to finish products or parts (e.g., sand, gravel, plastic, glass, rough metals, corn cobs, etc.). In this manner, the tumbler 10 may make these products smooth and/or separate desired components of the products from undesired components. In some embodiments, the tumbler 10 may rotate the drum 60 without directing a flow of air through the air tube 70. In other embodiments, the air tube 70 may be configured to introduce fluid into the drum 60 to help keep the temperature below a threshold.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A conditioning unit for conditioning materials, the conditioning unit comprising:
   a drum comprising:
      an inlet end;
      an outlet end opposite the inlet end;
      a plurality of frame members extending from the inlet end to the outlet end and defining a plurality of sides, each of the sides housing one or more screens, and one or more of the sides having an opening proximate the outlet end of the drum; and
      one or more annular rings each bordering a side of the opening of the one or more sides proximate the outlet end of the drum;
   an inlet chute in fluid communication with the inlet end of the drum, the inlet chute being configured to direct a flow of materials into the drum; and
   an outlet chute in fluid communication with the opening of the one or more sides proximate the outlet end of the drum, the outlet chute having one or more ridges configured to at least partially overlap with the one or more annular rings of the drum to contain a flow of conditioned materials exiting the drum within the outlet chute.

2. The conditioning unit of claim 1, further comprising:
   a fluid tube at least partially disposed within the drum, the fluid tube being configured to introduce a flow of fluid into the drum,
   wherein the flow of materials comprises pellets and the flow of fluid comprises air.

3. The conditioning unit of claim 1 further comprising one or more screen connectors directly attachable to a first frame member of the frame members, the one or more screen connectors each having a bottom surface configured to, in cooperation with a top surface of the first frame member, slidably receive and secure at least one edge of one or more of the screens to the first frame member.

4. The conditioning unit of claim 1, wherein at least one of the screens is readily attachable and detachable to the drum.

5. The conditioning unit of claim 1, wherein the inlet chute comprises at least one curved portion and houses one or more defluidizing screens disposed within the inlet chute proximate the at least one curved portion.

6. The conditioning unit of claim 2, further comprising:
   a first floating seal formed between the inlet chute and the inlet end of the drum, the first floating seal having one or more dynamic inner walls and one or more static outer walls, wherein the one or more inner walls is connected to, and configured to rotate with, the drum; and
   a second floating seal formed between the fluid tube and the outlet end of the drum, the second floating seal having one or more dynamic inner walls and one or more static outer walls, wherein the one or more inner walls is connected to, and configured to rotate with, the drum.

7. The conditioning unit of claim 2, wherein the fluid tube is aligned such that at least a portion of the fluid tube parallels a central length axis of the drum.

8. The conditioning unit of claim 7, wherein the fluid tube comprises one or more fluid tube openings along a length of the fluid tube inserted into the drum, and positioned away from a central length axis of the fluid tube.

9. The conditioning unit of claim 8, wherein the fluid tube further comprises one or more separators longitudinally extending along at least a portion of the length of the fluid tube and being configured to divide the fluid tube into at least a first section and a second section, the first section being configured to direct a first flow of fluid to a first fluid tube opening of the one or more fluid tube openings and the second section being configured to direct a second flow of fluid to a second fluid tube opening of the one or more fluid tube openings.

10. The conditioning unit of claim 1 further comprising one or more illumination devices disposed within the conditioning unit.

11. The conditioning unit of claim 1 further comprising a frame supporting a base, the base supporting a plurality of rollers, the frame having a tilt mechanism configured to selectively adjust an angle of the drum relative to the frame.

12. A tumbler for conditioning materials, the tumbler comprising:
   a drum having an inlet end, an outlet end, and a plurality of frame members extending from the inlet end to the outlet end and defining a plurality of sides, each of the sides housing one or more screens, one or more of the sides having an opening;
   an inlet chute in fluid communication with the inlet end of the drum, the inlet chute being configured to direct a flow of materials into the drum; and
   an inlet floating seal formed between the inlet chute and the inlet end of the drum, the inlet floating seal having one or more dynamic inner walls and one or more static outer walls, wherein the one or more inner walls is connected to, and configured to rotate with, the drum.

13. The tumbler of claim 12, wherein the flow of materials comprises pellets, and the one or more screens are readily attachable to and detachable from the drum.

14. The tumbler of claim 13 further comprising one or more screen connectors directly attachable to a first frame member of the frame members, the one or more screen connectors each having a bottom surface configured to, in cooperation with a top surface of the first frame member, slidably receive and secure at least one edge of one or more of the screens to the first frame member.

15. The tumbler of claim 12, wherein the inlet chute comprises at least one curved portion and houses one or more defluidizing screens disposed within the inlet chute proximate the at least one curved portion.

16. The tumbler of claim 12 further comprising:
a fluid tube at least partially disposed within the outlet end of the drum and configured to direct a flow of fluid within the drum; and
an outlet floating seal formed between the fluid tube and the outlet end of the drum, the outlet floating seal having one or more dynamic inner walls and one or more static outer walls, wherein the one or more inner walls is connected to, and configured to rotate with, the drum.

17. A method for conditioning materials in a tumbler, the method comprising:
feeding a flow of materials into an inlet end of a drum of the tumbler, the drum having a plurality of sides extending from the inlet end to an outlet end of the drum, each of the sides housing one or more screens, one or more of the sides having an opening;
rotating the drum containing the flow of materials; and
conditioning the flow of materials within the rotating drum, wherein conditioning the flow of materials comprises introducing one or more coating materials into the rotating drum to coat the flow of materials within the drum; and
directing the flow of conditioned materials from the drum through the opening of the one or more sides to exit the tumbler.

18. The method of claim 17, wherein conditioning the flow of materials further comprises at least partially drying the flow of materials by directing at least a portion of moisture in the flow of materials to exit the drum and directing at least a portion of one or more solid particles in the flow of materials through the opening of the one or more sides to exit the drum.

19. The method of claim 17 further comprising:
receiving, in a curved inlet chute of the tumbler, the flow of materials;
defluidizing the flow of materials via one or more defluidizing screens housed in the inlet chute; and
providing a floating seal formed between the inlet chute and the inlet end of the drum, the floating seal having one or more dynamic inner walls and one or more static outer walls, wherein rotating the drum further comprises rotating the one or more inner walls of the floating seal.

20. The method of claim 17 further comprising:
illuminating at least a portion of the flow of materials within the drum via one or more illumination devices disposed within the drum; and
directing a flow of fluid, from a fluid tube at least partially disposed within the drum, through at least one of the one or more screens, at least a portion of the fluid tube extending in parallel to a length of the drum.

21. A method for conditioning materials in a tumbler, the method comprising:
feeding a flow of materials into an inlet end of a drum of the tumbler, the drum having a plurality of sides extending from the inlet end to an outlet end of the drum, each of the sides housing one or more screens, one or more of the sides having an opening;
rotating the drum containing the flow of materials;
conditioning the flow of materials within the rotating drum, wherein conditioning the flow of materials comprises at least partially drying the flow of materials by removing a portion of fluid therefrom and passing at least a portion of fluid removed from the flow of at least partially dried materials through the one or more screens to exit the drum; and
directing the flow of at least partially dried materials from the drum through the opening of the one or more sides.

22. The method of claim 21, wherein conditioning the flow of materials further comprises introducing one or more coating materials into the rotating drum to coat the flow of materials within the drum.

23. The method of claim 21 further comprising:
receiving, in a curved inlet chute of the tumbler, the flow of materials;
defluidizing the flow of materials via one or more defluidizing screens housed in the inlet chute; and
providing a floating seal formed between the inlet chute and the inlet end of the drum, the floating seal having one or more dynamic inner walls and one or more static outer walls, wherein rotating the drum further comprises rotating the one or more inner walls of the floating seal.

24. The method of claim 21 further comprising:
illuminating at least a portion of the flow of materials within the drum via one or more illumination devices disposed within the drum; and
directing a flow of fluid, from a fluid tube at least partially disposed within the drum, through at least one of the one or more screens, at least a portion of the fluid tube extending in parallel to a length of the drum.

* * * * *